US006848297B2

(12) United States Patent
Tilley

(10) Patent No.: US 6,848,297 B2
(45) Date of Patent: Feb. 1, 2005

(54) PORTABLE MULTI-FUNCTION SYSTEM FOR TESTING PROTECTIVE DEVICES

(75) Inventor: Greg Alan Tilley, Monkton, MD (US)

(73) Assignee: Hamilton Associates, Inc., Owings Mills, MD (US)

( * ) Notice: Subject to any disclaimer, the term of this patent is extended or adjusted under 35 U.S.C. 154(b) by 0 days.

(21) Appl. No.: 10/187,380

(22) Filed: Jul. 2, 2002

(65) Prior Publication Data

US 2003/0126911 A1 Jul. 10, 2003

Related U.S. Application Data

(63) Continuation of application No. 09/088,050, filed on Jun. 1, 1998, now Pat. No. 6,435,009.

(51) Int. Cl.[7] .................................................. G01M 3/04
(52) U.S. Cl. ............................................. 73/40; 73/40.7
(58) Field of Search ............................. 73/40, 40.7, 37, 73/37.5

(56) References Cited

U.S. PATENT DOCUMENTS 3,721,117 A * 3/1973 Ford et al. .................... 73/40.7
5,059,348 A * 10/1991 Guelta et al. ............ 252/408.1

OTHER PUBLICATIONS

Instruction Manual for the Installation, Operation and Maintenance of the Tester, Air Leak, Dry Bubble, Q204, Commander, US Army Armament Research and Develeopment Command, Aberdeen Proviing Ground, Maryland 21010, Sep. 1, 1982.*

Instruction Manual for the Installation, Operation and Maintenance of Tester, Air Flow Resistance, Q179, Commander, US Army Armament Research and Develeopment Command, Aberdeen Proviing Ground, Maryland 21010, Sep. 1, 1982.*

* cited by examiner

*Primary Examiner*—C D Garber
(74) *Attorney, Agent, or Firm*—Merek, Blackmon & Voorhees, LLC

(57) ABSTRACT

A multi-function device for testing masks such as NBC masks used in civilian and military applications. In its preferred form, the device is self-contained and can be readily transported to field sites by one or two individuals. The device includes a protective storage and transport case. The case includes an upper portion and a lower portion. The upper portion of the case houses the power unit assembly and includes sufficient storage space to store such things as an aerosol generator reservoir, various headform accessories, a containment shroud, manuals (e.g. installation, operation and maintenance manuals) and nominal tools. The lower portion of the case houses the head assembly and controller unit which are preferably mounted on a cover or top panel. Underneath the top or cover panel of the lower portion of the case are stored the light scattering chamber, flow sensor, pressure transducer, circuit boards and valves. The device can perform multiple tests including: (1) an overall mask leakage test; (2) an outlet valve leakage test; (3) a drink seat test; (4) a drink tube flow test; (5) a drink train leakage test; and, a mask fit test. Further, the device can be programmed for any given test period to perform one or all of the aforementioned tests. The device further can readily create a data log to record results of any given test or series of tests. The device further includes numerous safety features including requiring any operator of the device to reject or retest a defective mask.

17 Claims, 25 Drawing Sheets

FIG. 5
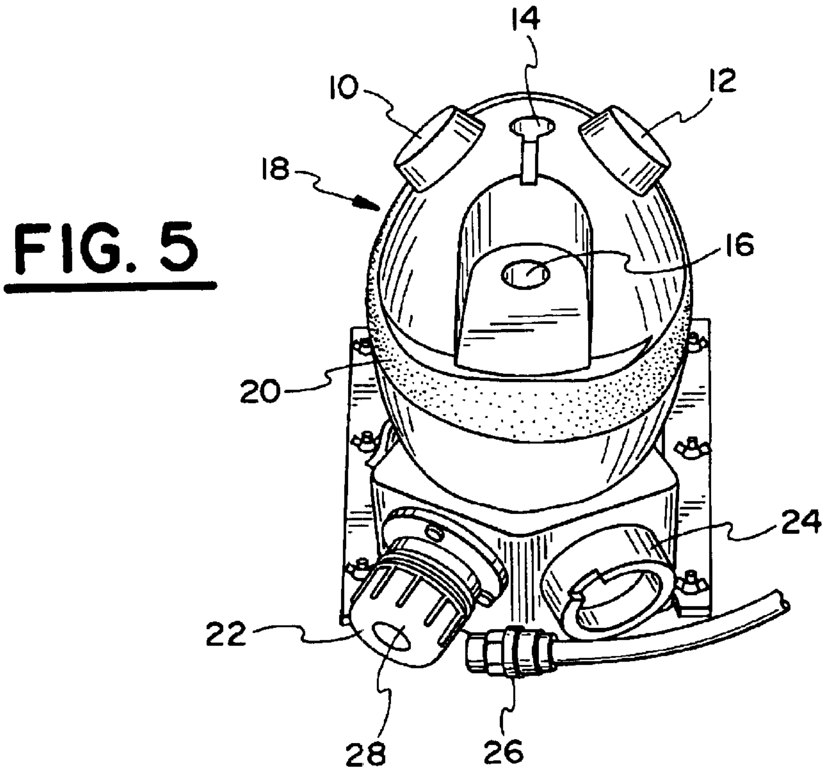
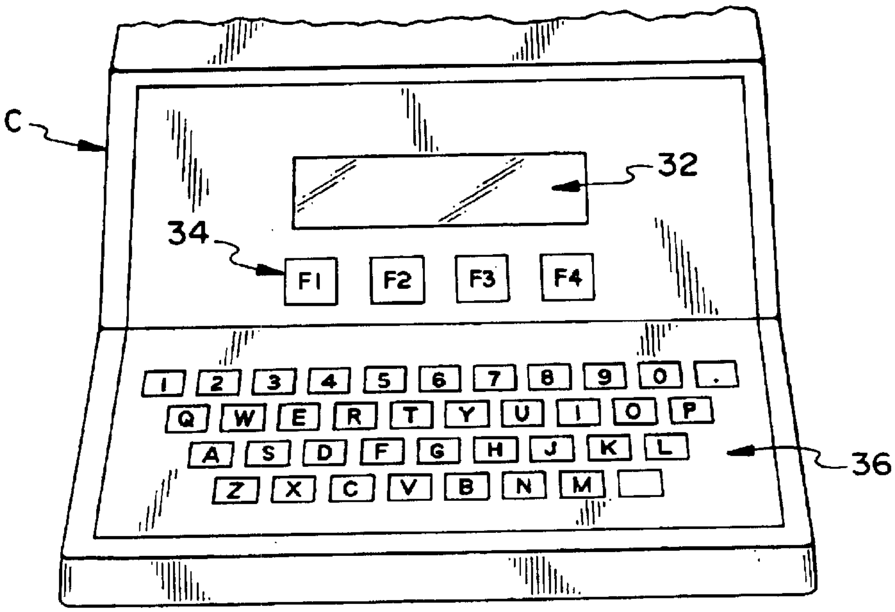
FIG. 6

PORTABLE MULTI-FUNCTION SYSTEM FOR TESTING PROTECTIVE DEVICES

RELATED PATENT APPLICATIONS

The subject patent application is a continuation of U.S. patent application Ser. No. 09/088,050 filed on Jun. 1, 1999 now U.S. Pat. No. 6,435,009.

FIELD OF THE INVENTION

The present invention is directed to a device for testing protective masks used in both civilian and military applications. In particular, the present invention is directed to a portable device that can perform multiple tests on a protective mask (e.g. negative pressure respiratory devices, powered air purifying respirators and self contained breathing apparatus) on site by relatively unskilled individuals. However, the present invention is not limited to portable devices nor is it limited to devices which are used only in on site applications.

BACKGROUND OF THE INVENTION

Protective masks have been used for sometime in both civilian and military applications. These protective masks are designed to protect the wearer from nuclear, biological, chemical agents, fumes, aerosols, gases and other airborne particulate contaminants. Hence, it is extremely important that the mask be properly tested to ensure that it will protect the wearer from these life threatening agents. In military applications, NBC (i.e. nuclear, biological and chemical) protective masks have to undergo a series of tests which include: (1) an overall mask leakage test; (2) an outlet valve leakage test; (3) a drink tube valve seat test; (4) a drink tube flow test; (5) a drink train leakage test; and, (6) a mask fit test. Previously, five separate pieces of equipment were commonly used to perform these tests. These devices are known as the M14, M4A1, Q204, Q179 and M41. These devices have a combined cost of over $50,000.00 and cannot be deployed in field locations without the use of a tractor trailer. Further, these devices had little or no ability to log data regarding the results of the tests performed on the masks. Further, these devices did not have the capability of downloading the data logged in on the test results of the protective masks on a personal computer.

Hence, a significant need existed for a multi-function, self-contained, portable mask testing device which could be readily deployed in field applications by one or two military personnel and perform adequately all the required tests on NBC protective masks. The present invention is designed to satisfy this existing need.

OBJECTS AND SUMMARY OF THE INVENTION

An object of the present invention is to provide a novel and unobvious device for testing protective masks.

An object of the present invention is to provide a multi-functional, portable, self-contained device for testing protective masks which can be readily deployed in field locations by one or two military personnel.

Another object of the present invention is to provide a single device which can perform the required mask leakage-test; drink tube seat test; drink flow rate test; drink train test; exhaust valve test; and, fit test on protective masks.

A further object of the present invention is to provide a security feature which insures that the operator of the device is fully qualified to perform the tests.

Yet another object of the present invention is to provide a testing device which requires the operator to reject or retest a defective mask before testing any additional protective masks.

Yet a further object of the present invention is to provide a testing device which creates a data log for the results of the various tests performed on the protective masks.

Still a further object of the present invention is to provide a testing device which allows an operator to readily down load onto a personnel computer the data logged in regarding the test results.

These and other objects of the invention will be readily apparent upon a review of the following detailed description of the preferred form of the invention and accompanying drawings. These objects are not to be construed as limiting the scope of the claimed invention.

In summary, the present invention is directed to a multi-function device for testing masks, for example, NBC masks used in civilian and military applications. In its preferred form, the device is self-contained and can be readily transported to field sites by one or two individuals. The device includes a protective storage and transport case. The case includes an upper portion and a lower portion. The upper portion of the case houses the power unit assembly and includes sufficient storage space to store such things as an aerosol generator reservoir, various headform accessories, a containment shroud, manuals (e.g. installation, operation and maintenance manuals) and nominal tools. The lower portion of the case houses the head assembly and controller unit which are preferably mounted on a cover or top panel. Underneath the top or cover panel of the lower portion of the case are stored the light scattering chamber, flow meters, pressure transducer, circuit boards and valves.

The device can perform multiple tests including (1) an overall mask leakage test; (2) an outlet valve leakage test; (3) a drink seat test; (4) a drink tube flow test; (5) a drink train leakage test; and, a mask fit test. Further, the device can be programmed for any given test period to perform one or all of the aforementioned tests. The device further can readily create a data log to record results of any given test or series of tests. The device further includes numerous safety features including requiring any operator of the device to reject or retest a defective mask. In addition, the device can be readily set up to limit the information available in on site testing to reduce the likelihood of theft or sabotage of protective devices such as NBC masks.

The above summary describes a preferred form and is not in any way to be construed as limiting the claimed invention to the preferred form.

BRIEF DESCRIPTION OF THE DRAWINGS

FIG. 5 is a perspective view of the headform.

FIG. 6 is a perspective view of the controller unit.

DETAILED DESCRIPTION OF THE PREFERRED EMBODIMENT OF THE INVENTION

The preferred form of the invention will now be described with reference to FIGS. 1–16. The appended claims are not limited to the preferred embodiment and no term used herein is to be given a meaning other than its ordinary meaning unless accompanied by a statement that the term "as used herein is defined as follows".

FIGS. 1 Through 16

Figure 1:
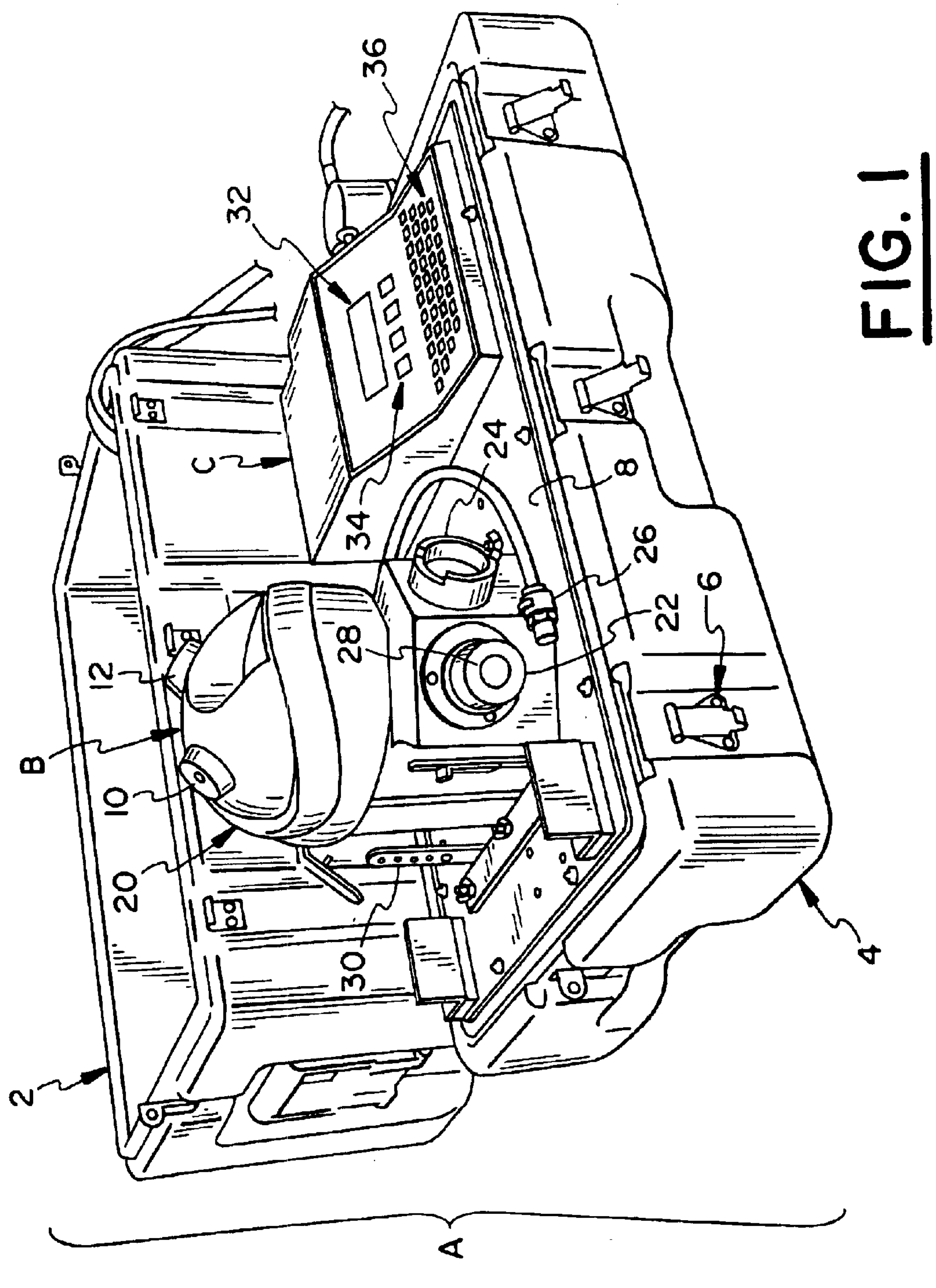
FIG. 1 is a front perspective view of the preferred embodiment of the present invention with the protective case opened.
Figure 2:
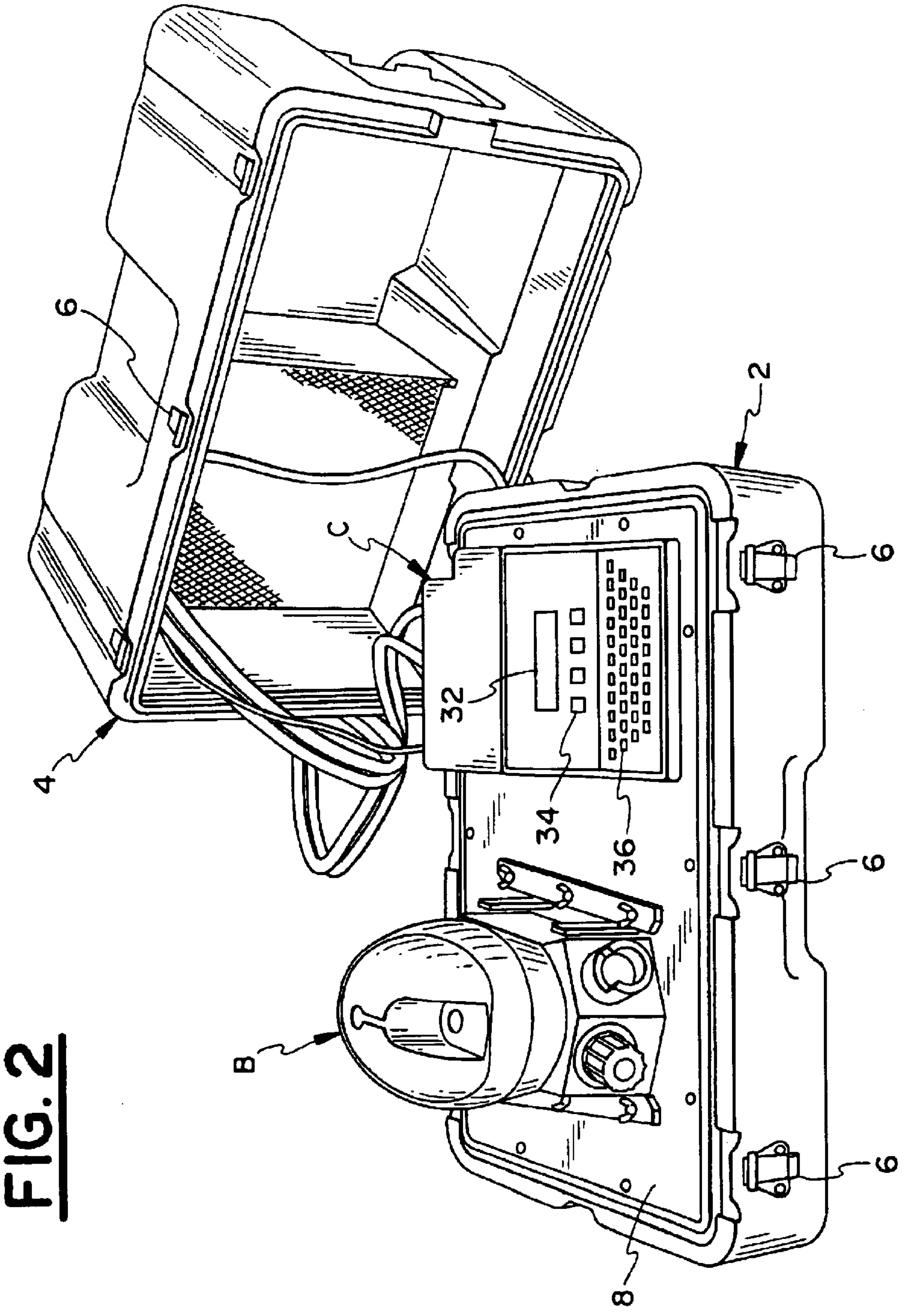
FIG. 2 is a front perspective view of the preferred embodiment of the present invention with the protective case opened and the upper portion thereof turned on its side.
Figure 3:
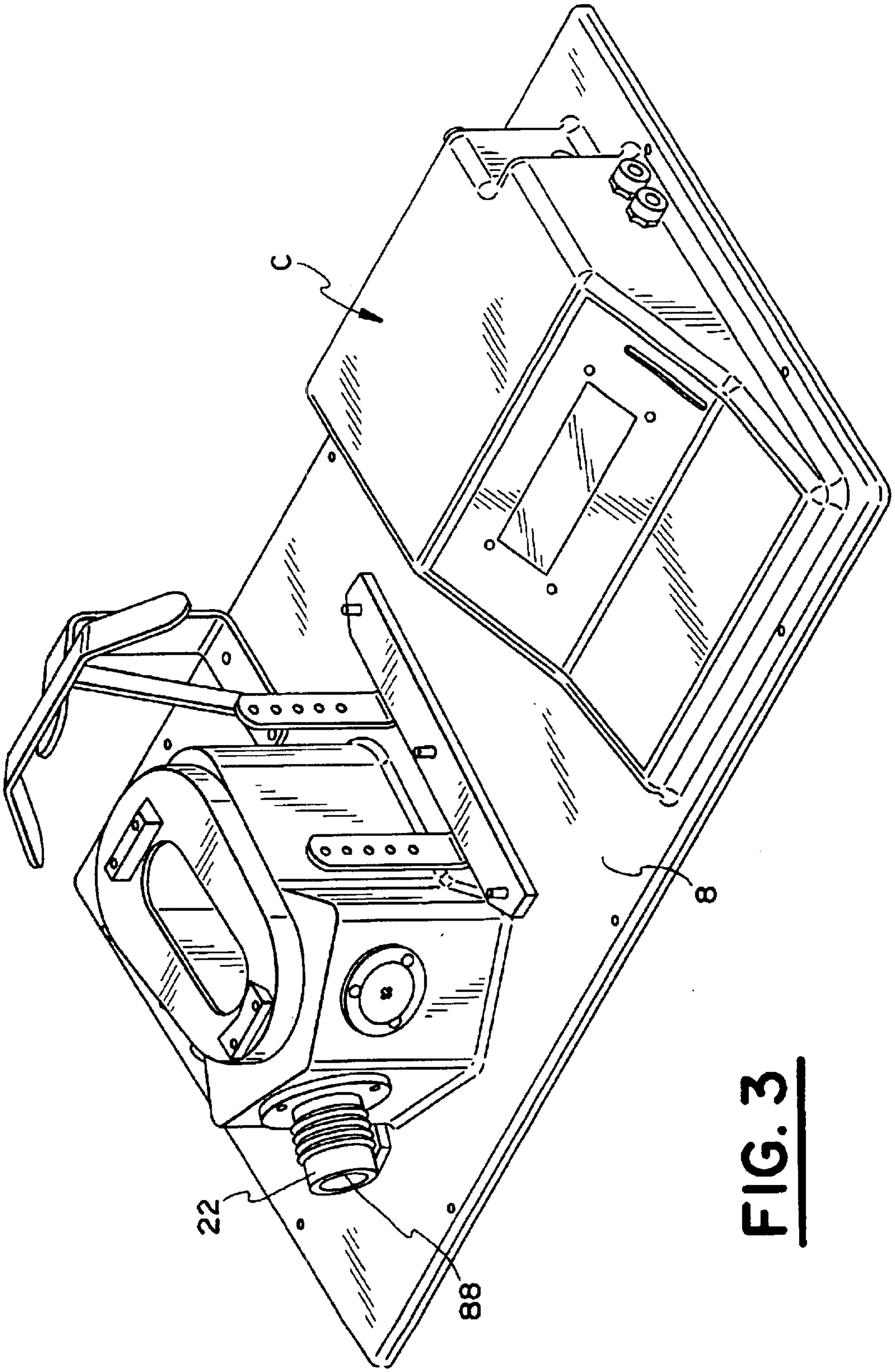
FIG. 3 is a perspective view of the top or cover panel with various elements such as the headform removed.
Figure 4:
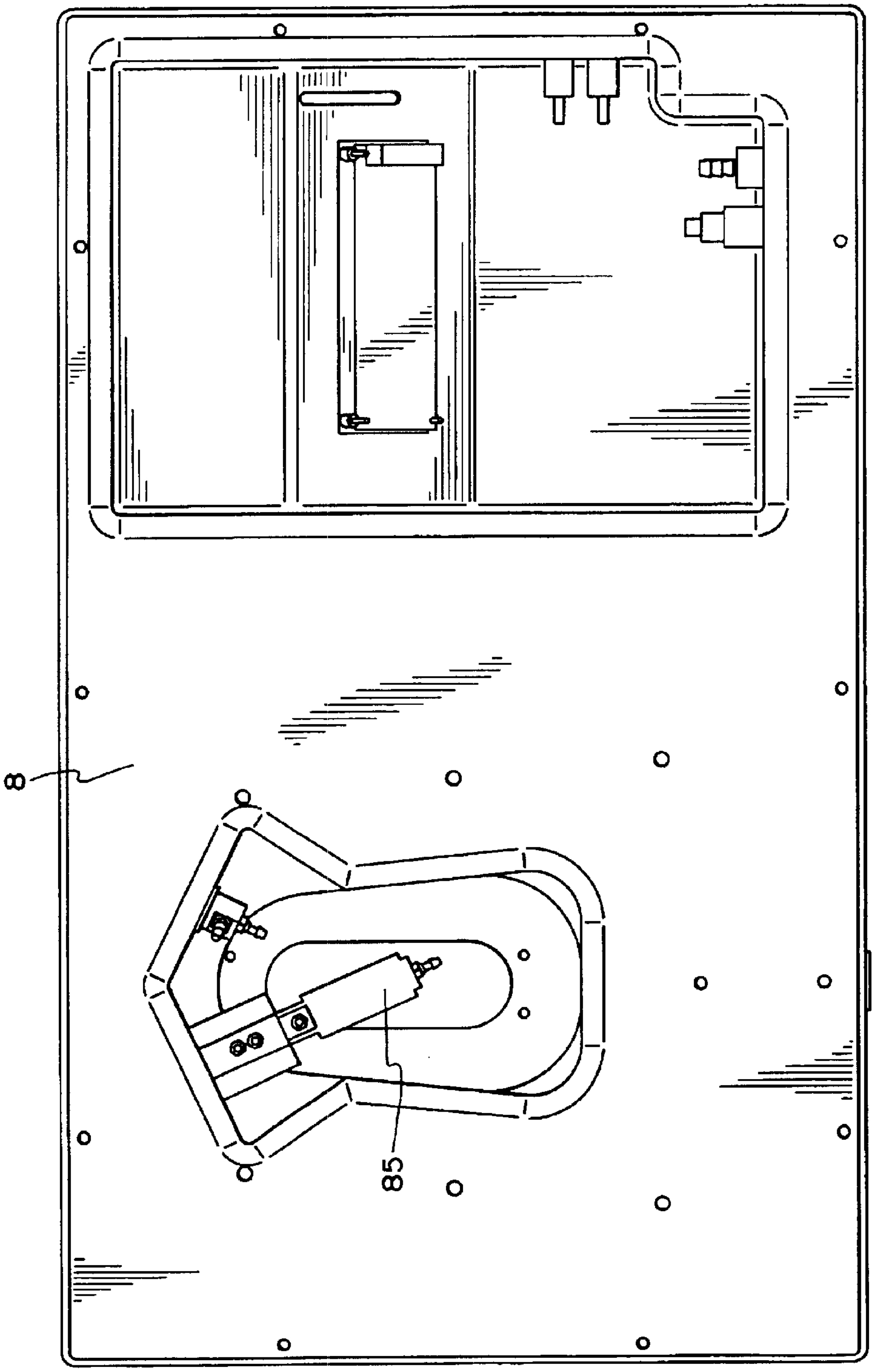
FIG. 4 is a bottom view of the top or cover panel depicted in FIG. 3.

Referring to FIGS. 1 through 3, the portable, multi-function testing system includes a protective transport and storage case A having an upper portion 2 and a lower portion 4. Preferably, case A is formed from a polyethylene resin. As such, case A is extremely durable and provides an excellent protective shell for the testing system. In its preferred form, case A is 15 by 16 by 26 inches. It will be readily appreciated that the size of case A and the material it is formed from may be readily varied to meet the particular needs of the user. The upper and lower portions 2 and 4 have mating fasteners 6 for detachably securing together the two sections of case A. The weight of the unit should be such that one individual can readily transport it to a given field site without difficulty. Preferably, the unit is approximately 60 lbs. Approximately as used herein in connection with a weight measurement expressed in pounds is defined as plus or minus 5 pounds. The unit may range any where from 0 to approximately 120 lbs. Where the unit exceeds approximately 60 lbs. it is expected that two individual will be necessary to readily transport the device. It should be noted that the case A can be provided with numerous different types of handles or strap/harness type arrangements to make transport easier.

A top or cover panel 8 is secured to the outer periphery of the lower portion 4, as seen in FIGS. 1 and 2. L-shaped brackets 7 (See FIG. 11A) are mounted to the front, rear, left side and rear side walls of the lower portion 4 to support the top or cover plate 8. A headform assembly B and a control unit C are mounted on the cover or top panel 8. Preferably, the headform B is formed from polyurethane. However, it will be readily appreciated that the material of the headform B can be readily varied.

Figure 5A:
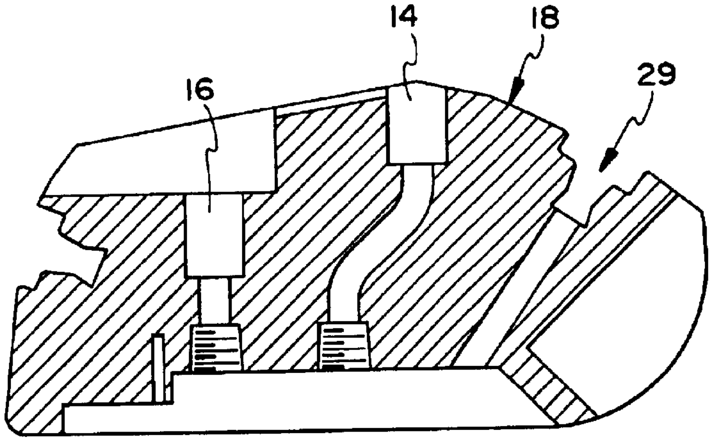
FIG. 5A is a cross-sectional view of the headform taken through the center thereof.

Referring to FIG. 5, the headform B includes removable eyelens supports 10 and 12, a first head test port 14, a second head test port 16, a headform 18, an inflatable seal 20, a canteen fixture 22, an outlet valve test fixture 24 and an M42/43 series mask hose connection 26. While headform 18 is for a full, face seal type mask, other headforms may be readily used to accommodate half, face seal type or full, neck seal type protective devices. As depicted in FIGS. 1 and 5, a canteen cap 28 is threaded on the canteen fixture 22. A plurality of brackets 30 are mounted on the top or cover panel 8 in order that an NBC mask or other type of protective device may be readily mounted over the headform 18. It will be readily appreciated that additional mounting brackets may be provided for mounting a "dog house" on the top or cover panel 8 to perform flex testing on an NBC mask or similar protective device. Inflatable seal 20 includes a conventional fill port through which pressurized air is directed to inflate seal 20. The fill port (not shown) is positioned in recess 29 in headform 18, see FIG. 5A.

Referring to FIG. 6, the control unit C houses the microcontroller that monitors and controls the testing system. Preferably, the microcontroller is an Intel 8051 series controller. The microcontroller is connected to conventional interface circuits, e.g. analog to digital converters to read the sensors and a pulse width modulator to control the flow control solenoid. It will be appreciated that the microcontroller could be replaced by other control units e.g. a personal computer or an industrial type control board. The control unit C also includes a front panel vacuum florescent display 32 for displaying system parameters and operator prompts, as seen in FIG. 6. It will be readily appreciated that various other displays may be used including LED displays. The control unit C further includes function keys 34 (e.g. F1 through F4) and an alphanumeric keyboard 36. The function keys 34 permit the operator to respond to a given operator prompt. The alphanumeric keyboard 36 allows the operator to enter information such as his ID number, date and time of the test, serial number of an NBC mask, etc.

Figure 7:
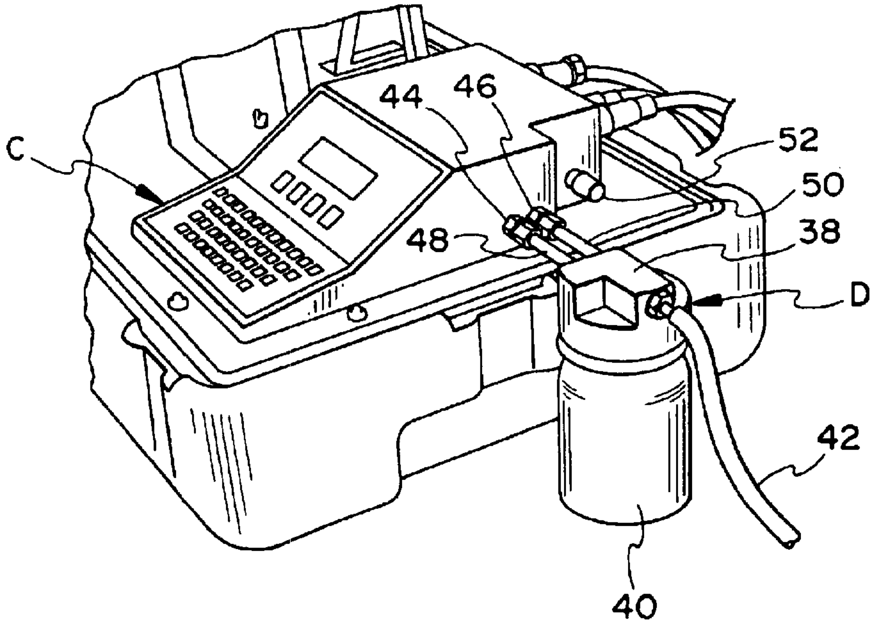
FIG. 7 is a perspective view of the aerosol generator assembly connected to the controller unit.
Figure 8:
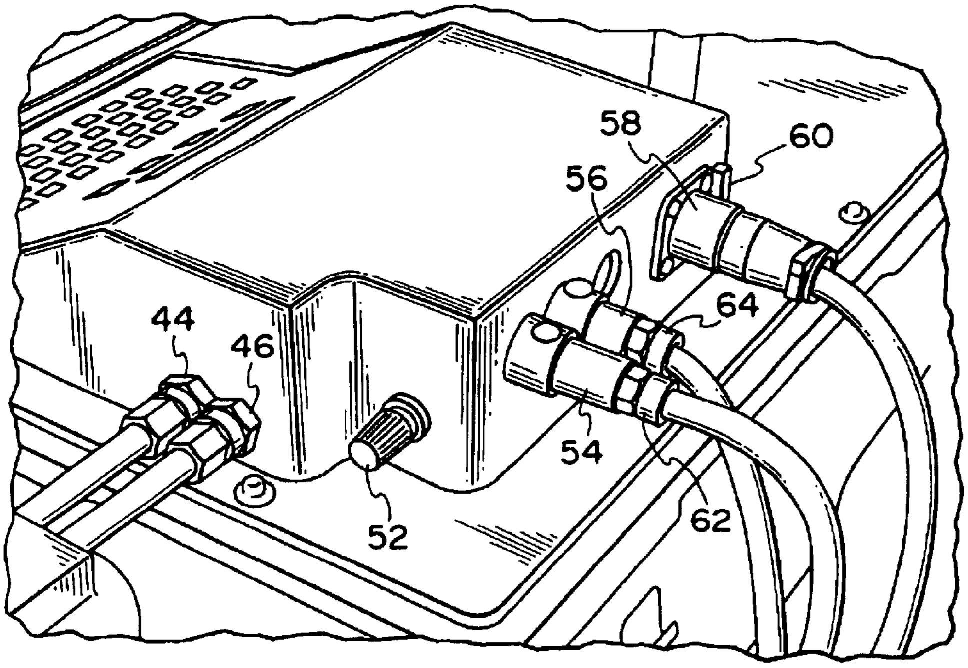
FIG. 8 is a perspective view of the controller unit depicting the various connections to the power assembly and the aerosol generator.

Referring to FIG. 7, aerosol generator assembly D includes an aerosol generator 38, a liquid reservoir 40, aerosol line 42, and a pair of quick disconnect valves 44 and 46. The aerosol generator 38 preferably includes an oil aerosol generator nozzle. The quick disconnect valves 44 and 46 connect the diluent air supply conduit 48 and the pressure conduit 50 to the control unit C, respectively. An external control knob 52 is provided on the control unit C to permit adjustment of the aerosol concentration, as seen in FIGS. 7 and 8. Preferably, the test agent is polyalphaolefin (PAO) which has been approved by the U.S. Army Surgeon General, the Department of the Energy and the Federal Food and Drug Administration. However, it will be readily appreciated that if detection other than photometry is used e.g. condensate nuclei counting (CNC), the test agent may be varied.

Referring to FIG. 8, the control unit C includes connectors 54, 56, 58 and 60. Connector 54 connects the vacuum line

62 to the control unit C. Connector 56 connects the pressure line 64 to the control unit C. Connector 58 provides the electrical connection between the power assembly and the control unit C. Connector 60 is a RS-232 connection for serial data. Connector 60 permits downloading of the data log to a personal computer.

The pneumatic controls will now be described in connection with FIGS. 9 through 13. Dual head rotary pump 66 is housed in the upper portion 2 of the case A, as seen in FIG. 13. The vacuum side of the dual head rotary pump 66 is identified by element 68 while the pressure side is identified by element 70 (See FIG. 9). The pressure line 72 connected to element 70 includes a HEPA filter 74. Pressure line 72 branches off into two lines to connect to solenoid valves 76 and 78. In the position illustrated in FIG. 9 (i.e. the off position), solenoid valve 76 is exhausted to atmosphere. Solenoid valve 76 is connected to solenoid valves 80 and 82 via lines 84 and 86.

Solenoid valves 76 and 82 together regulate the operation of the canteen/drink test fixture 22. This fixture 22 includes a pin 88 (see FIG. 9) which is extended and retracted to unseat and reseat, respectively the drink tube quick-disconnect valve of the drink train (i.e. the tubing and corresponding valves connecting an individual's canteen to an NBC mask) of an NBC mask. Pin 88 is connected to a reciprocating piston (not shown) positioned in cylinder 85. Lines 87 and 89 direct air under pressure to opposite ends of cylinder 85 to extend and retract pin 88. The tests performed on the drink train by the present invention will be more fully discussed below in the operation section. Solenoid valve 80 is connected to solenoid valve 90 via line 92. Line 94 connects the solenoid valve 90 to the inflatable seal 20 of the headform assembly B. Hence, the inflation and deflation of the inflatable seal 20 is controlled by the operation of solenoid valves 76, 80 and 90. A pressure switch 95 having a rating of 6 psi is connected to line 94.

Figure 9:
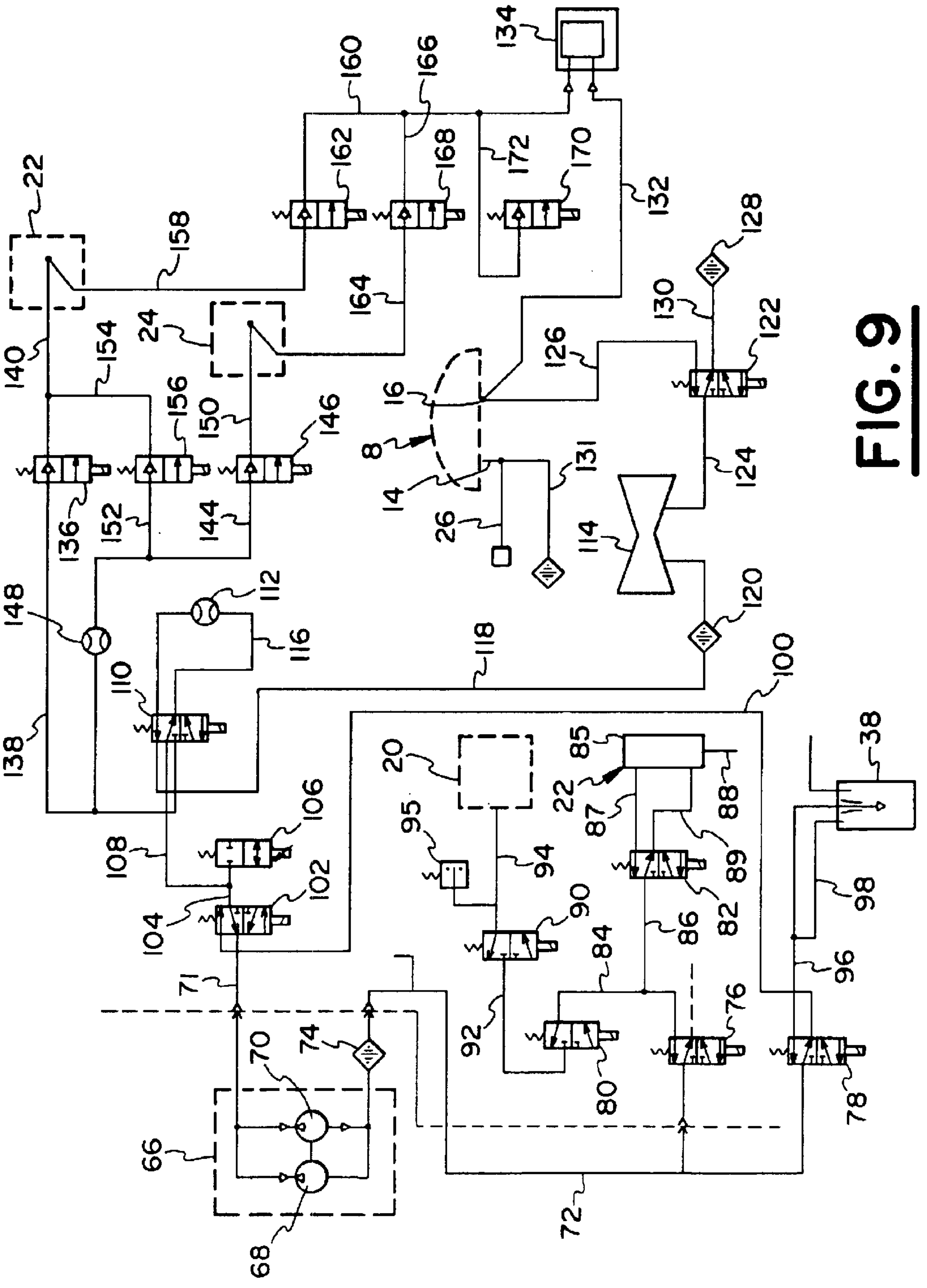
FIG. 9 is a schematic diagram of the pneumatic controls of the preferred embodiment of the present invention.
Figure 10:
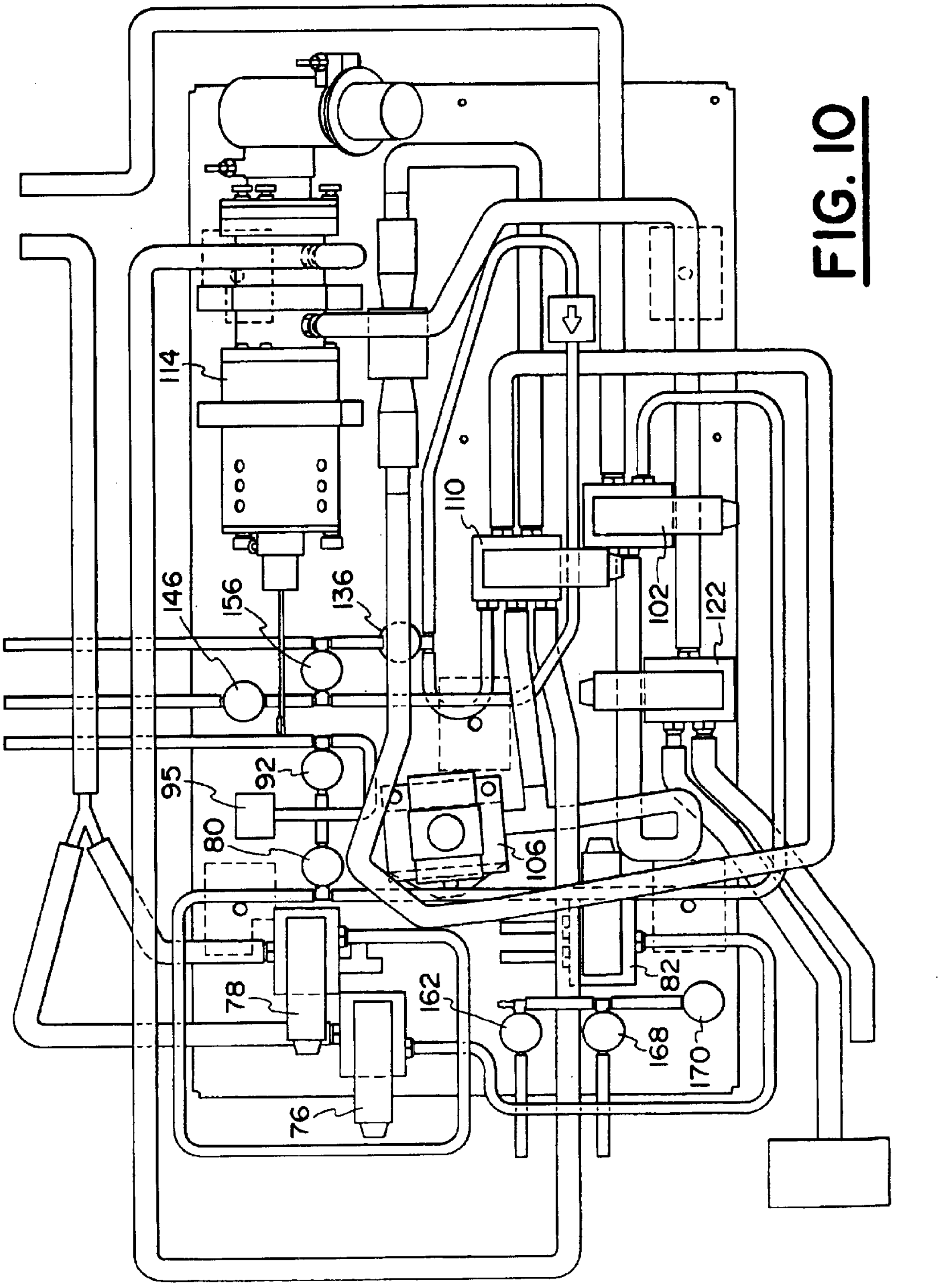
FIG. 10 is a perspective view of various portions of the pneumatic controls including the connecting tubing.

Line 96 supplies air under pressure from the solenoid valve 78 to the aerosol generator 38 when the solenoid valves 76 and 78 are in the on position. Solenoid valves 76 and 78 are illustrated in FIG. 9 in the off position. A flow control valve 98 is provided to enable an operator to adjust the aerosol concentration. The flow control valve 98 is connected to control knob 52 in a conventional manner. Line 100 supplies air under pressure to solenoid valve 102 when solenoid valve 78 is in the off position and solenoid valve 76 is in the on position.

Solenoid valve 102 is illustrated in FIG. 9 in the off position. In this position, solenoid valve 102 connects vacuum line 71 to line 104. In the on position, solenoid valve 102 connects pressure line 100 to line 104. Line 104 is connected to the flow control solenoid valve 106. Solenoid valve 106 is exhausted to atmosphere in the full on position. As the solenoid valve 106 begins to close, so that it is not fully exhausted to atmosphere, a vacuum is created in line 104. The strength of the vacuum is directly dependent on the position of the flow control solenoid valve 106.

Line 108 connects solenoid valve 102 to solenoid valve 110. Solenoid valve 110 is connected to flow meter 112 and photometer 114 through lines 116 and 118, respectively. Although a photometer is preferably used as the detection unit, CNC devices as well as other particulate detection technology may be used. Flow meter 112 is a 0 to 20 lpm flow meter. A HEPA filter 120 is positioned in line 118 adjacent the photometer 114. The photometer 114 is connected to solenoid valve 122 via line 124. Solenoid valve 122 is connected to the headform assembly B via line 126 and to a HEPA filter 128 via line 130. Line 126 is connected to port 16 in headform 18 via a conventional fastener. HEPA filter 129 is connected to port 14 of headform 18 via line 131 and a conventional fastener. Line 131 is also connected to M42/43 series mask hose connection 26.

Figure 5B:
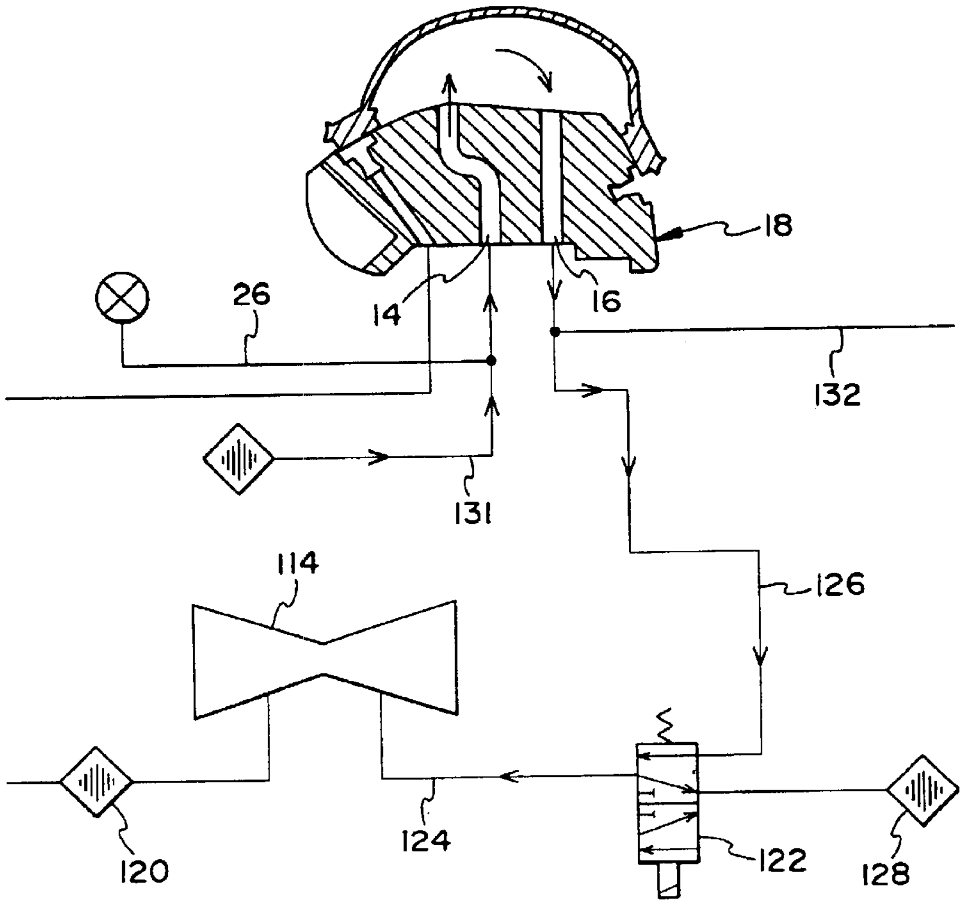
FIG. 5B is a portion of the schematic diagram of the pneumatic controls depicting the air flow when the M42/43 adapter is not used.

Solenoid valve 122 as depicted in FIG. 9 is in the off position and therefore is connected to filter 128. A vacuum is pulled through line 126 when solenoid valve 122 is in the on position, solenoid valves 102 and 110 are in the off position and solenoid valve 106 is at least partially closed so that it is not fully exhausted to atmosphere. In this scenario, the NBC mask mounted on the headform assembly B experiences negative pressure due to the vacuum force. Typically, the connection 26 is plugged at its free end. In this case, the air flow when the mask is placed under negative pressure is as depicted in FIG. 5B.

Line 132 is connected at one end to port 16 of the headform 18 and at the other end to a pressure transducer 134 so that the force of the vacuum can be monitored and if necessary altered to a desired setting. Air under pressure is supplied to headform B when solenoid valves 78 and 110 are in the off position and solenoid valves 76, 102 and 122 are in the on position. The pressure of the air supplied to the headform 18 is monitored by transducer 134 in the same fashion as the vacuum.

Solenoid valve 136 is connected to solenoid-valve 110 via line 138. Line 140 connects solenoid valve 136 to the canteen fixture 22. Line 144 is connected at one end to line 138 and at the other end to solenoid valve 146. A flow meter 148 is positioned in line 144. Flow meter 148 is a 0 to 30 mlpm flow meter. Solenoid valve 146 is connected to the outlet valve test fixture 24 via line 150. Lines 152 and 154 connect solenoid valve 156 to lines 144 and 140, respectively.

The canteen fixture 22 is connected to the pressure transducer 134 via lines 158 and 160 and solenoid valve 162. Outlet valve test fixture 24 is connected to the pressure transducer 134 via lines 164 and 166 and solenoid valve 168. In this manner, the system can monitor the air pressure delivered to the canteen fixture 22 and the outlet valve test fixture 24. The pressure transducer 134 is connected to solenoid valve 170 via line 172. Solenoid valve 170 is open to atmosphere during the mask and fit tests. Otherwise solenoid valve 170 is in the off position illustrated in FIG. 9 (i.e. not vented to atmosphere).

Figure 11:
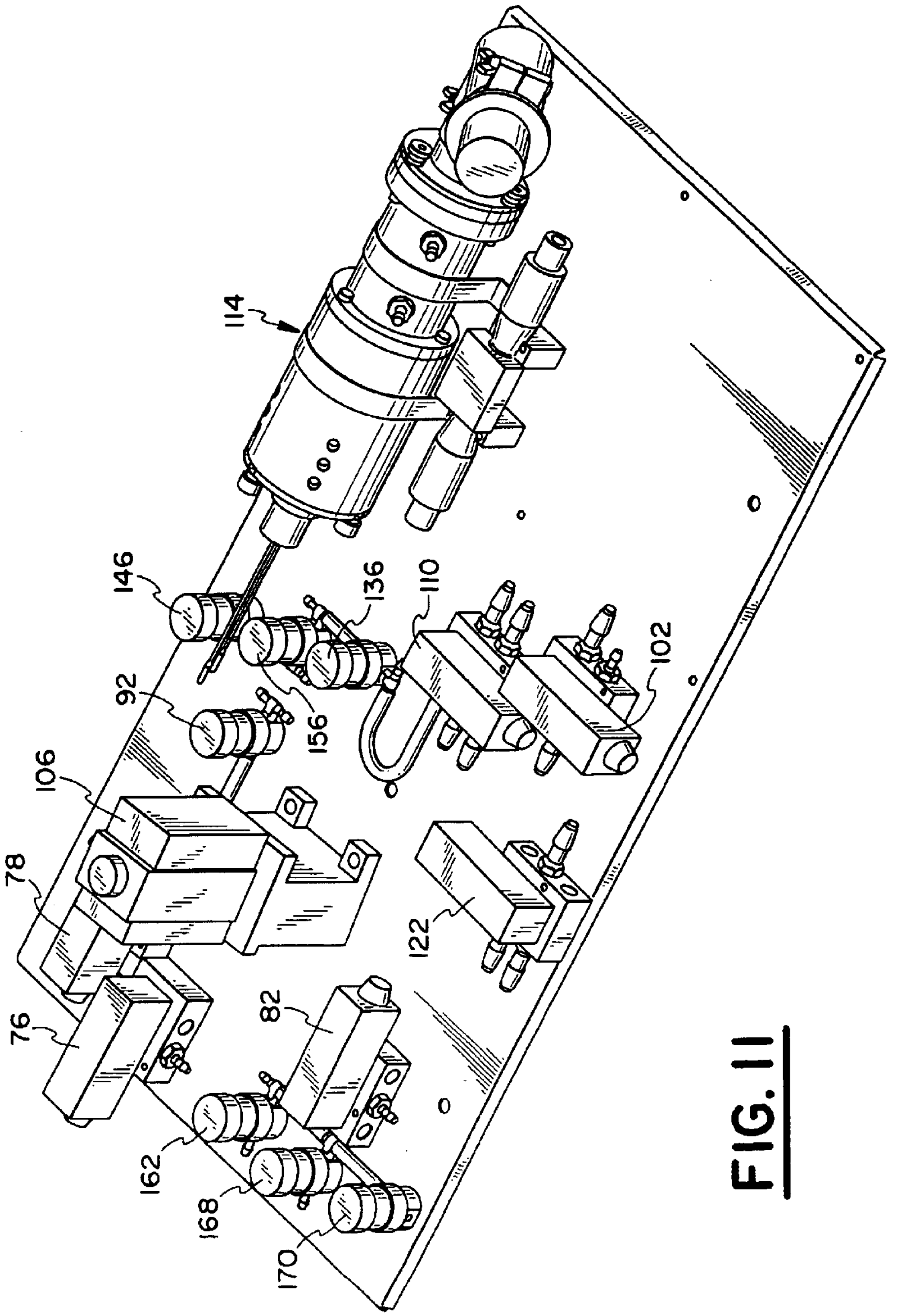
FIG. 11 is a perspective view of various portions of the pneumatic controls.
Figure 11A:
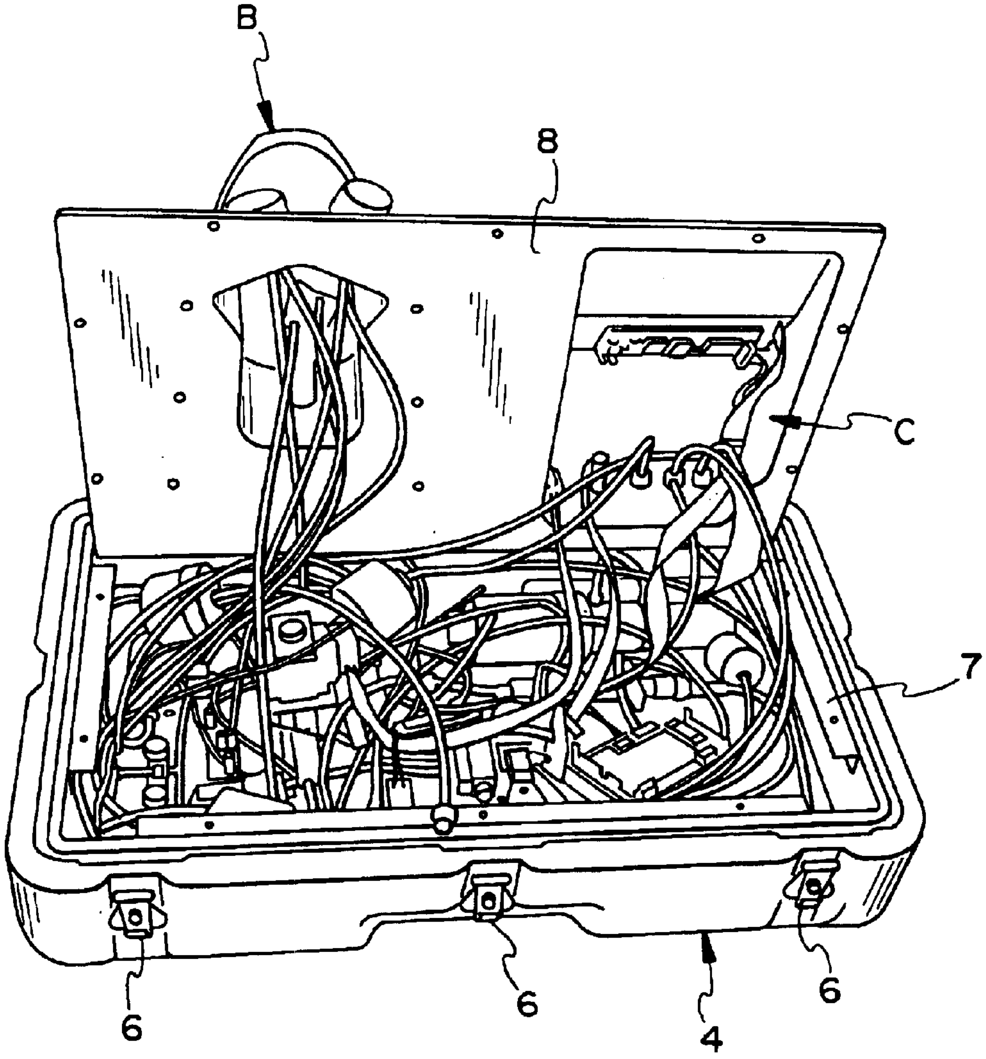
FIG. 11A is a perspective view of the pneumatic controls located beneath the top or cover panel of the lower portion of the storage and transport case.

Referring to FIG. 11, various components of the pneumatic controls discussed above are illustrated. Each of the elements is positioned in the lower portion 4 beneath the top or cover panel 8 (See FIG. 11A).

Figure 12:
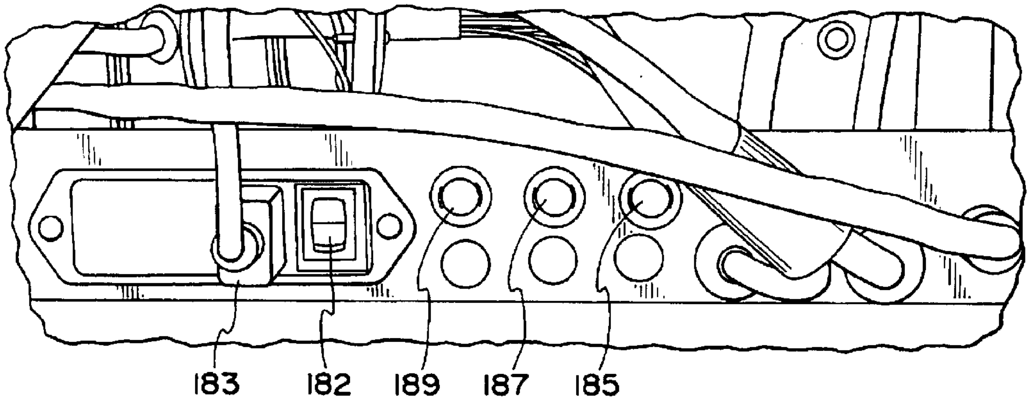
FIG. 12 is an enlarged perspective view of a portion of the power unit assembly.
Figure 13:
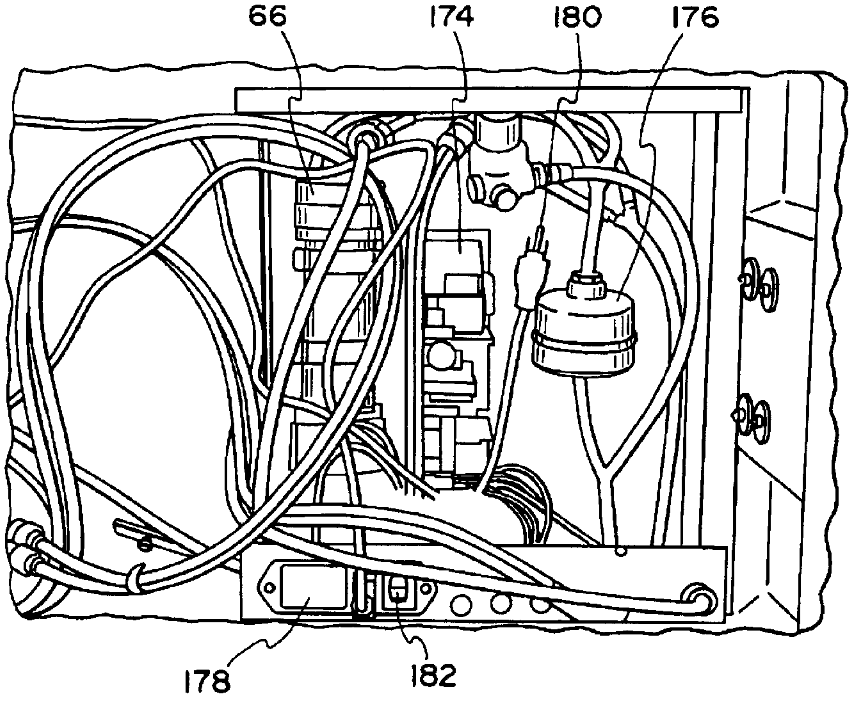
FIG. 13 is a perspective view of the upper portion of the storage and transport case housing the power unit assembly.

Referring to FIGS. 12 and 13, the power unit assembly D will now be explained. The power unit assembly includes a power supply board 174 with quad output (+5V,+24V,+12V and −12V), a dual head rotary pump 66, HEPA filter 176, electrical panel/box 178 and a site power connection 180. The electrical box 178 includes an on-off switch 182, a standard IEC electrical connector 183 and three fuses 185 (2A, 250V), 187 (4A, 250V), 189 (2.5A, 250V).

Figure 5C:
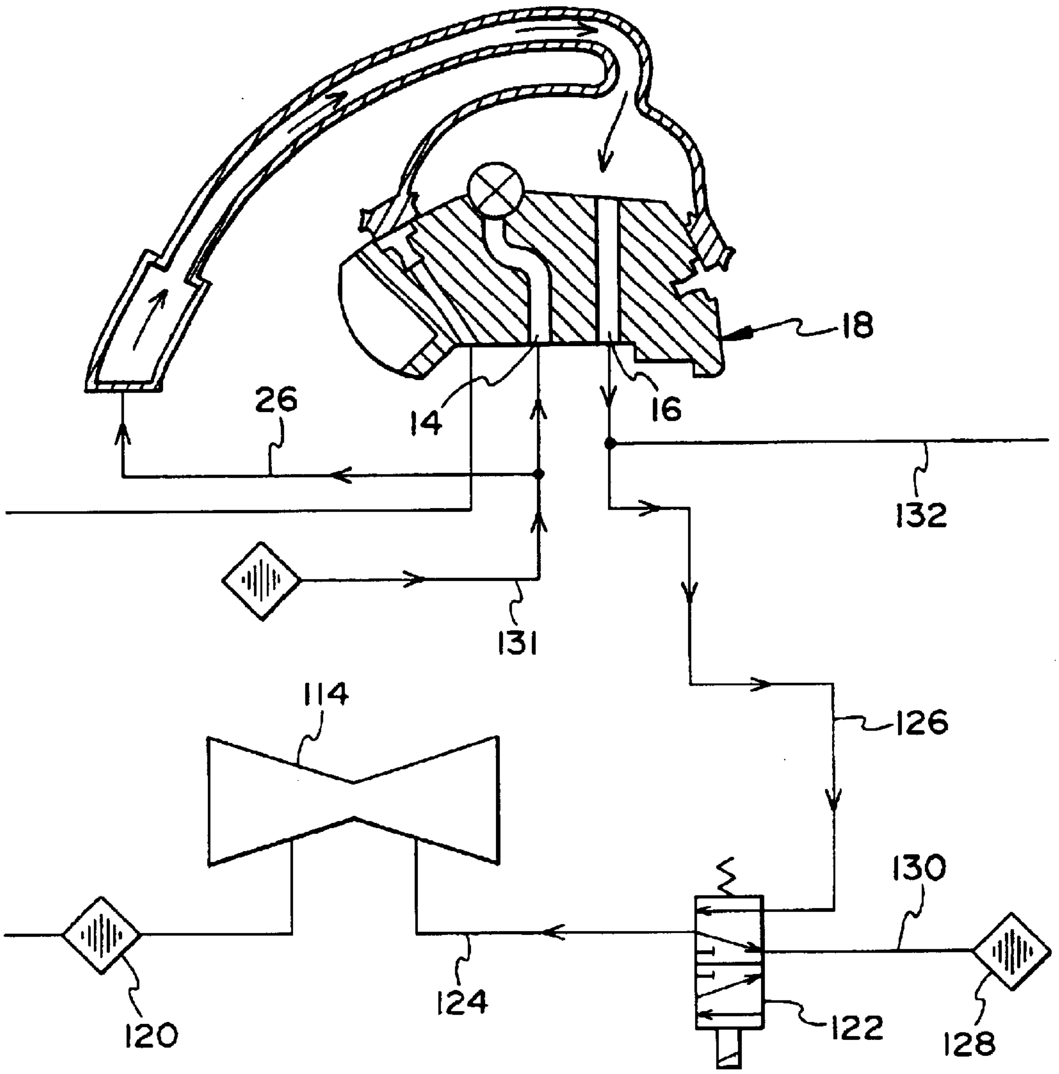
FIG. 5C is a portion of the schematic diagram of the pneumatic controls depicting the air flow when the M42/43 adapter is used.
Figure 14:
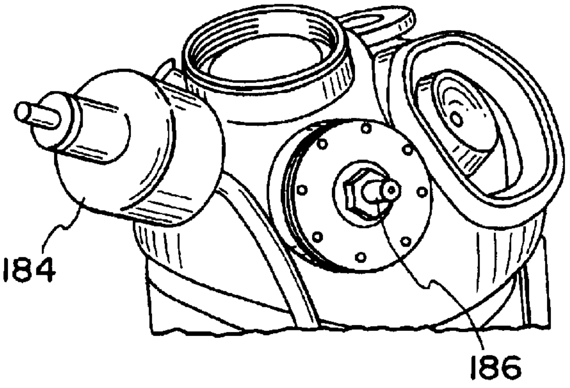
FIG. 14 is a perspective view of two headform/mask accessories, namely, an outlet valve plug and a canister inlet plug.
Figure 15:
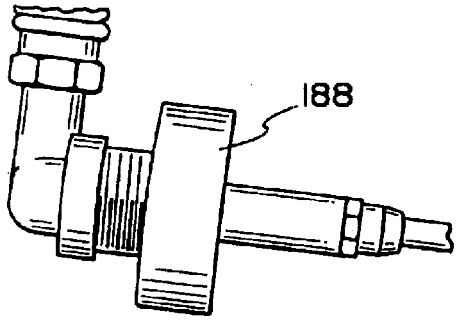
FIG. 15 is a perspective view of another headform/mask accessory, namely an M42/43 test adapter.

Referring to FIG. 14, two headform accessories are illustrated. These accessories are the outlet valve plug 184 and canister inlet plug 186. Referring to FIG. 15, a M42/43 test adapter 188 is illustrated as an additional headform accessory. Adapter 188 is employed to test series M42/43 masks. The right end of adapter 188 is connected to the free end of connection 26 after any plug therein is removed. The other end of adapter 188 is connected to the free end of the breathing hose of the mask being tested. A plug is placed in port 14 and the air flow when the mask is placed under negative pressure is as depicted in FIG. 5C. As is readily evident upon comparing the air flow in FIGS. 5B and 5C adapter 188 permits the vacuum to be pulled through the breathing hose.

Figure 16:
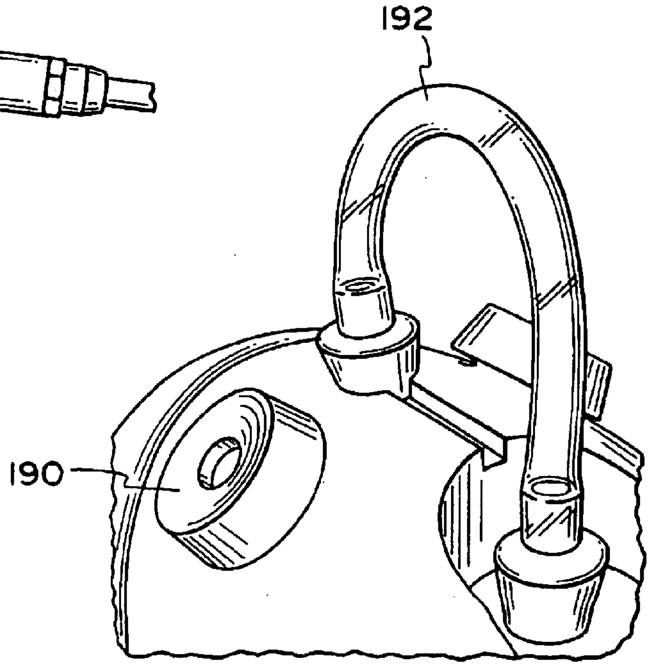
FIG. 16 is a perspective view of two more headform/mask accessories, namely, removable eyelens caps and a jumper hose for self diagnostics.

Referring to FIG. 16, two further headform accessories are illustrated, namely, eyelens support cap 190 and jumper hose 192 for self diagnostics.

Operation

The operation of the preferred form of the invention will now be described with reference made to the operational flow chart depicted in FIGS. 17 through 39 as well as to the structure of the testing system depicted in FIGS. 1 through 16. The following is a key for the operational flow chart:

| SYMBOL | EXPLANATION OF SYMBOL |
|---|---|
| 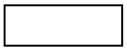 | Menu displayed to operator on the display screen 32. |
| 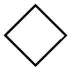 | Software or user decision block. |
| 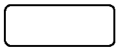 | Note box provides additional information to user. |
|  | Used to link program activity. |
|  | Used to link user activity. |
| 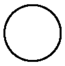 | Same figure flow chart connection: Mates with matching number in same figure. |
| 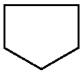 | Other figure flow chart connection: Mates with matching letter on preceding or subsequent figures. |

Figure 17:
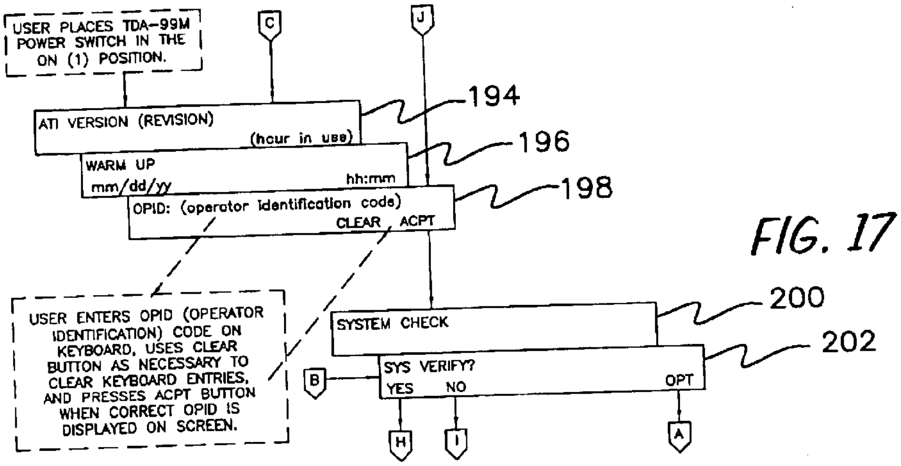
FIGS. 17 THROUGH 39 are portions of the operational flow chart of the preferred embodiment of the present invention.
Figure 18:
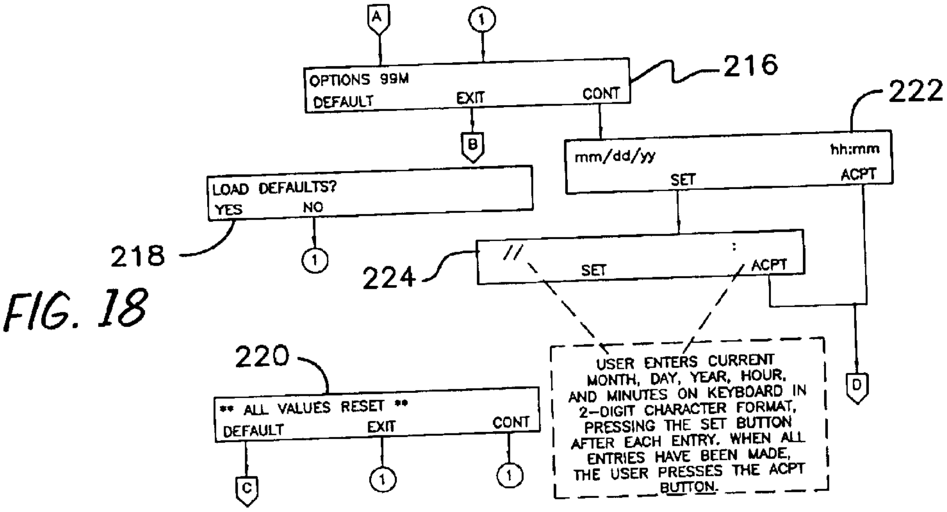
Figure 19:
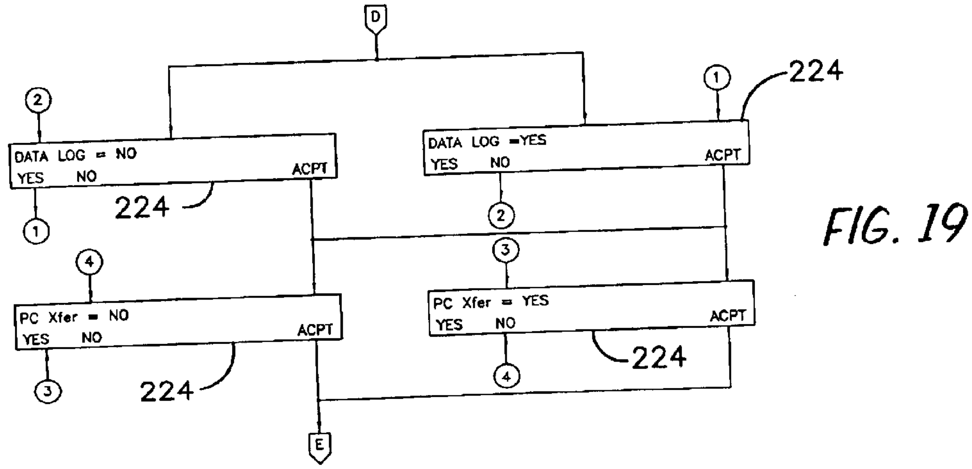

Referring to FIG. 17, the operator/user turns on the system via the power switch 182. Three initial screens 194, 196 and 198 are displayed to the operator. Screen 194 identifies the version of software being run and the hours the system has been in operation. Screen 196 displays the date and time. Screen 198 prompts the user to enter his or her operator identification number. The operator ID is entered using the alphanumeric keyboard 36. Once the operator ID has been properly entered, the operator presses the function key (i.e. F4) corresponding to the abbreviation ACPT on screen 198. If the operator ID does not correspond to the ID of an authorized individual, the system can be designed such that it is shut down or alternatively notifies the individual of the input error and queries him for a correct ID. The operator ID is also how the systems is able to readily restrict the information available to the operator regarding the tests being performed. Various different levels of operator IDs can be readily created. The system then determines the particular level from the operator ID and provides that operator with the necessary information for that particular level. The fourth screen 200 indicates to the operator/user that a system check is being performed. Screen 202 provides the operator with the option of performing the system check or presetting certain options. If the operator desires to perform the system check, he or she presses the function key (F1) corresponding to the word "YES".

Figure 23:
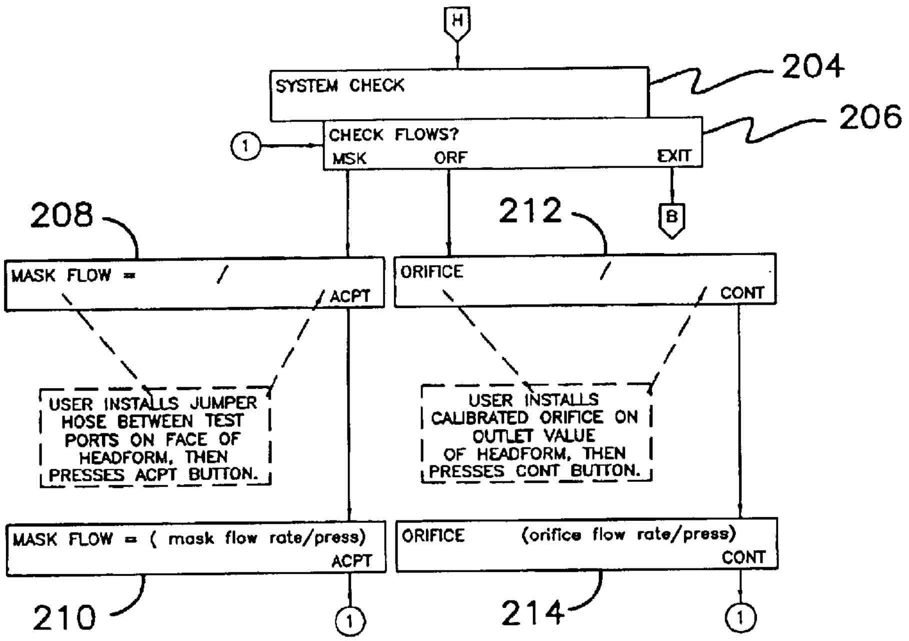
Figure 24:
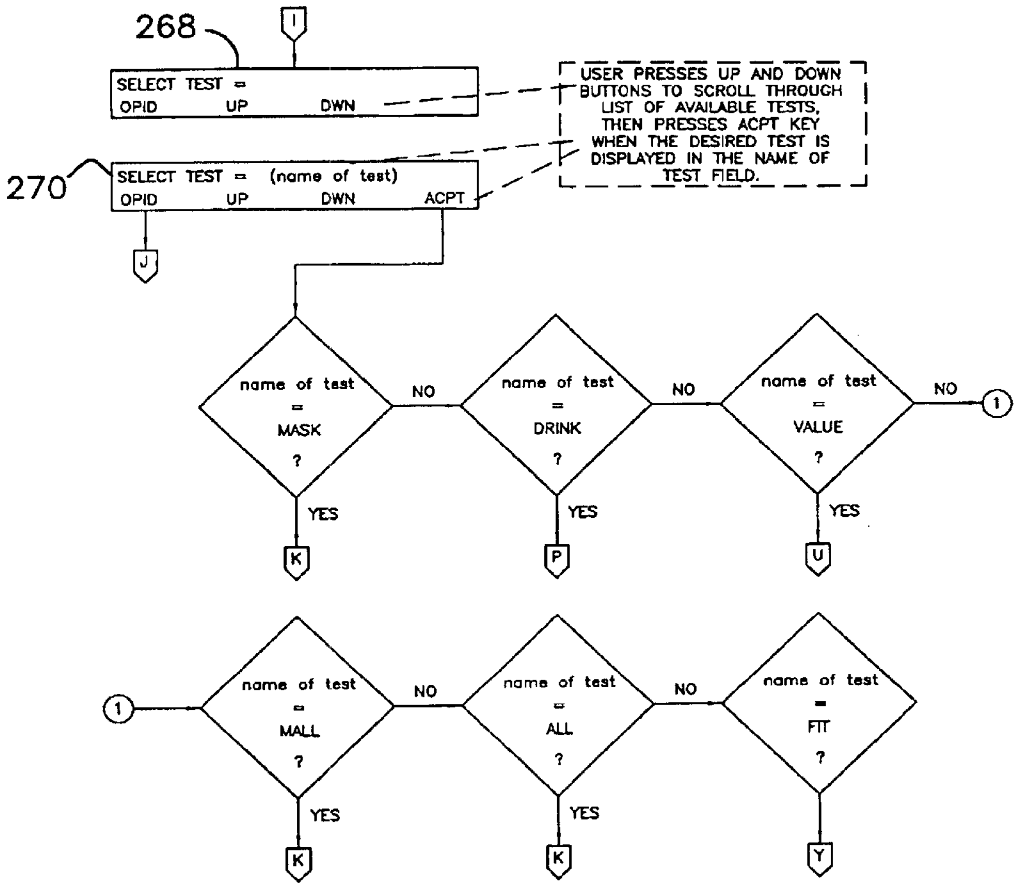

In this event, the display screens corresponding to the system check will appear (see FIG. 23). The first system check screen 204 is an identification screen. The second screen 206 allows the operator to check the flows of the mask and the orifice. Alternatively, screen 206 enables the user to exit the system check by pressing F4. To check the mask flow, the user presses the F1 function key corresponding to the abbreviation "MSK" for mask. Screen 208 is displayed. At this time, the user connects the jumper hose 192 between the test ports 14 and 16 (See FIG. 16). The user then presses the Function key F4 corresponding to ACPT. Screen 210 is displayed to identify the flow rate for the mask. The operator presses the prompt ACPT and is returned to screen 206 depicted in FIG. 23 and provided the option of checking the orifice flow rate. If so desired, the operator presses F2 corresponding to the abbreviation "ORF". Screen 212 appears and the user installs the calibrated orifice on the outlet valve 24 of the headform assembly B. Once this has been completed, the operator presses F4 corresponding to the abbreviation "CONT" Screen 214 is displayed to identify the orifice flow rate. By pressing F4 again, the operator is returned to display screen 206. The user exits the system check by pressing F4 of screen 206 and is returned to screen 202 (See FIG. 17). The operator is then able to set various options by pressing F4 or proceed directly to the selection of the specific test or tests to be performed by pressing F2.

In the event that the user presses F4 of screen 202, a series of sets of screens depicted in FIGS. 18 through 22 may be displayed depending upon the operator's selections. Screen 216 (See FIG. 18) is first displayed and provides the user with the option of selecting one of the following prompts: DEFAULT, EXIT or CONT. In the event that the user selects the prompt EXIT by pressing F3, he will be returned to display screen 202 (See FIG. 17).

In the event the user presses F1, a screen 218 will be displayed seeking to determine if the default settings should be loaded. The default settings are those settings set by the manufacturer. If the user desires to have the default settings loaded, he or she presses F1 which will lead to the display of screen 220 providing the user with three options. The first is to reboot the system which will return the user to screen 194 (See FIG. 17). The user can alternatively exit by pressing F3 or continue by pressing F4. In either event, the user is returned to screen 216 (See FIG. 18) from which he can exit or continue. In the event that the user selects F4 from screen 216, screen 222 will appear displaying the date and time. The user is given the option to reset these values by pressing F2 or accepting the displayed data by pressing F4. If the user presses F2, the user is displayed an additional screen 224 which will allow him to set the desired date and time. In any event, the user is directed to the next set of screens depicted in FIG. 19. Screens 226 through 232 enable the operator to select the data log feature and/or the PC transfer feature. Once the user has made his selections regarding these features, he is next shown the series of screens 234 through 240 depicted in FIG. 20.

Figure 20:
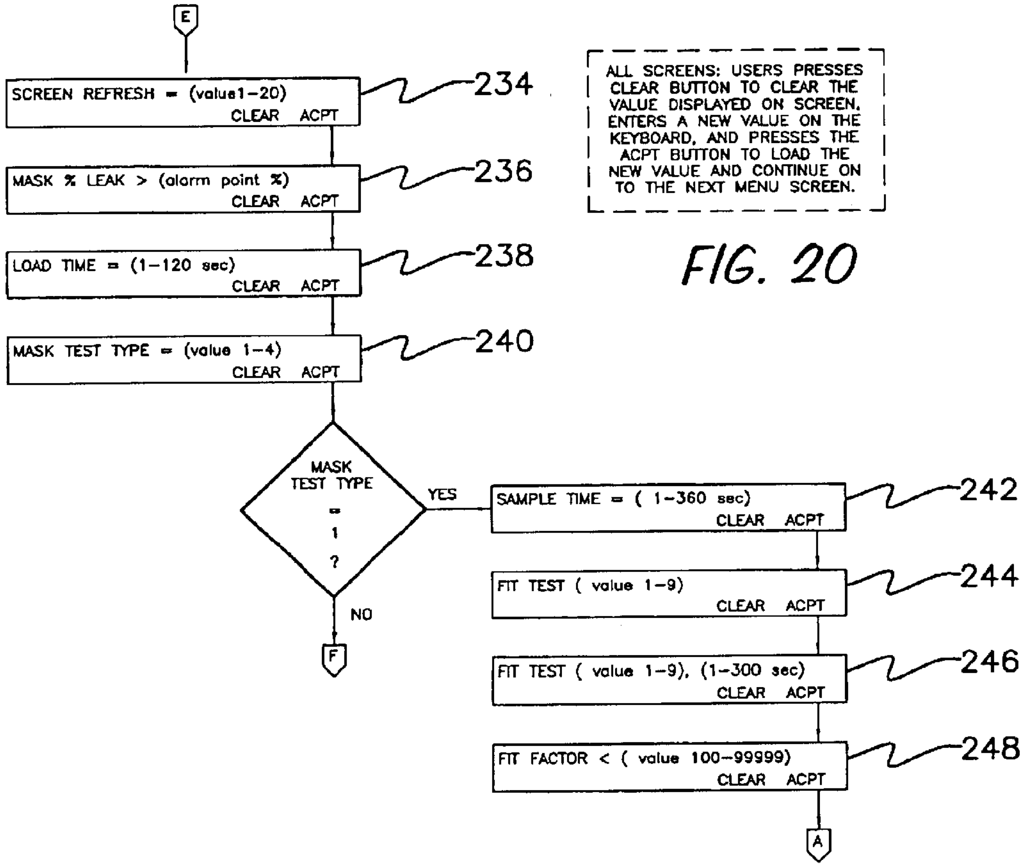

Referring to FIG. 20, the first screen 234 concerns the screen refresh feature. This setting determines how fast a new value is displayed on the display 32 when the system is in the probe mode to determine the precise location of a leak in the NBC mask. The value is set by pressing F3 to clear the displayed value, entering the desired value through the alphanumeric keyboard and then pressing F4. The next screen 236 concerns the percentage of leakage of the mask to signal a defect in the mask. This parameter is set in the same fashion as the screen refresh feature. The next screen 238 permits the user to set the load time, i.e. the period for stabilization of the aerosol. This parameter is set in a similar fashion to the others. The fourth display screen 240 prompts the user to select the particular type of mask test. The four mask tests are as follows: (1) continuous vacuum and automatic termination; (2) flex test; (3) vacuum/relax; and (4) vacuum/pressure. It will be readily appreciated that other tests may be performed, e.g. a test that simulates human breathing by controlling the flow control solenoid valve 106 with a sine wave signal replicating human breathing pattern. In addition a stepper motor or other equivalent device may be used in place of solenoid valve 106.

In the event that the operator selects mask test 1, the second series of four screens 242 through 248 depicted in FIG. 20 are displayed through which the user sets the sample time, the fit test parameters and the fit factor. The sample time is the period of time the test is run. Up to nine different fit tests may be run corresponding to values 1 through 9. For each fit test the individual wearing the protective mask performs a different physical activity for a specified period of time. Preferably, the time period is the same for each fit test. The fit factor represents the threshold concentration of aerosol that can be detected without the mask being determined defective.

Figure 21:
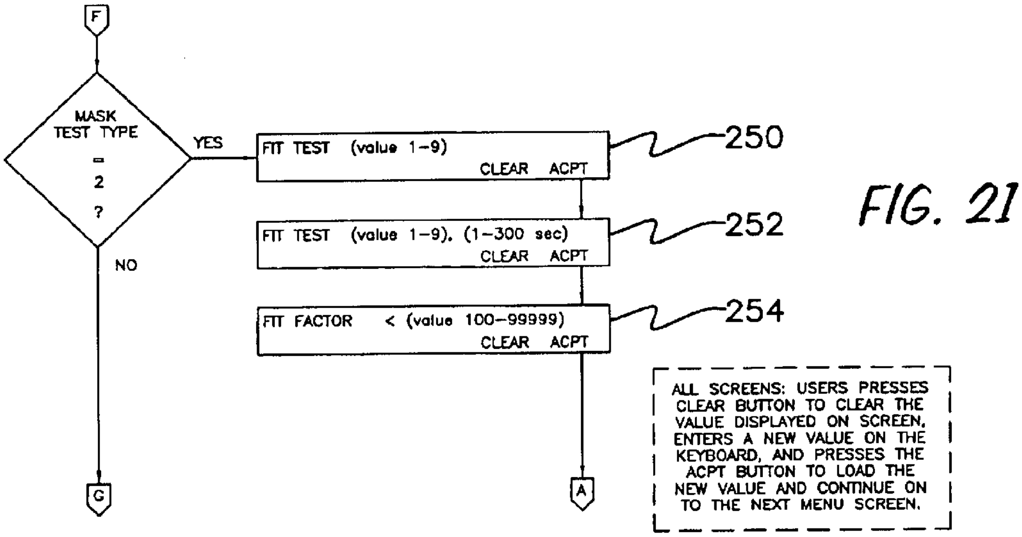
Figure 22:
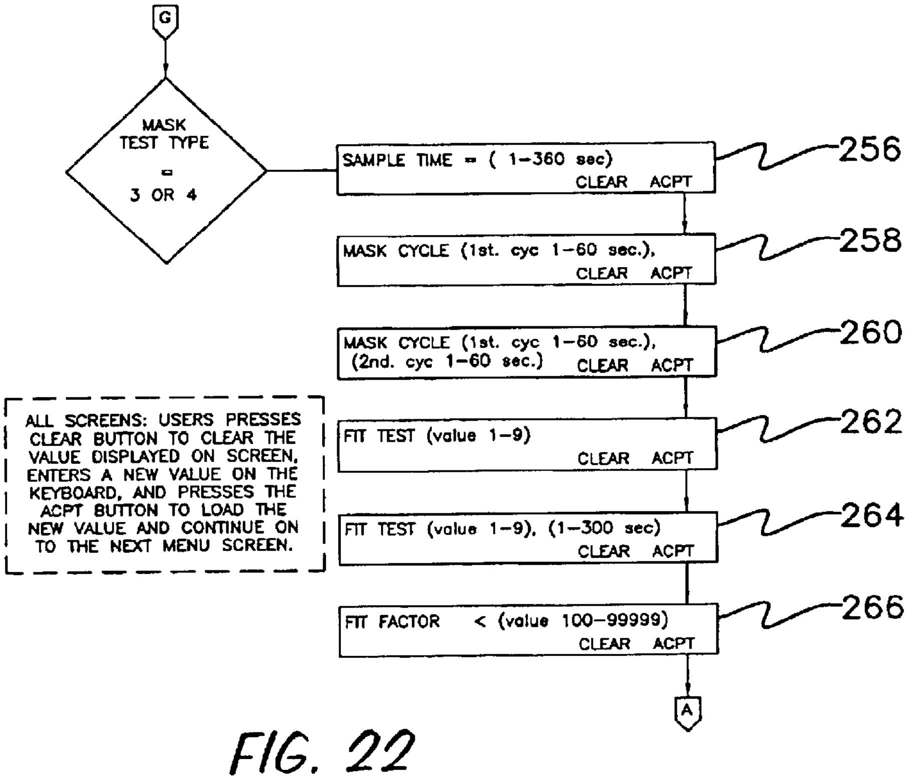

In the event that the user selects test type 2, the screens 250, 252 and 254 depicted in FIG. 21 are displayed sequentially so that the operator can set the parameters regarding fit test and fit factor. A sample time is not entered for mask test 2 because this test is run (i.e. a continuous vacuum is pulled) until failure or the operator discontinues the test. Screens 256 through 266 depicted in FIG. 22 are displayed if test type 3 or 4 is chosen. The operator then uses these screens to set the sample time, the mask cycle parameters, the fit test parameters and the fit factor. Two mask cycles exist for tests 3 and 4 because two different periods exist for each test. In the case of mask test 3, the first period is a continuous vacuum while the second period the vacuum is relaxed. For test 4, the first period is vacuum and the second period is pressure. Through solenoid valve 102, the system is able to switch between vacuum and pressure being exerted on the mask. It should be noted that the aerosol generation is interrupted during the pressure period. If continuous aerosol generation is needed the system can be readily modified. Once the parameters have been set for the desired mask test type, the user is returned to screen 216 depicted in FIG. 18. The user can then proceed to the test selection screens by pressing the EXIT prompt on screen 216 and then NO on subsequent screen 202 (See FIG. 17). When the user has done so, he is displayed screens 268 and 270 depicted in FIG. 24.

Screens 268 and 270 enable the operator to select the specific test or tests to be performed. The initial screen 268 displays the available tests through which the operator can scroll using the function keys corresponding to UP and the abbreviation DWN. The testing system provides six types of tests: (1) MASK-tests only the mask for leakage; (2) DRINK-performs three tests on the drink train; (3) VALVE-tests only the exhaust valve of the mask for leakage; (4) FIT-performs fit test only; (5) MALL-performs MASK, VALVE and DRINK tests; (6) ALL-performs MASK, VALVE, DRINK and FIT tests.

Once the given test is selected, four screens are displayed sequentially provided the operator has selected the data log feature. The first screen requires the operator to enter the serial no. of the mask being tested. The second screen requires the operator to enter the particular type of mask. The third screen requires the operator to enter the size of the mask. The fourth screen allows the operator to enter other miscellaneous information. These screens are repeatedly displayed as each new mask is tested. It will be readily appreciated that the data regarding the masks tested may be varied and include numerous other information depending upon its use.

Figure 25:
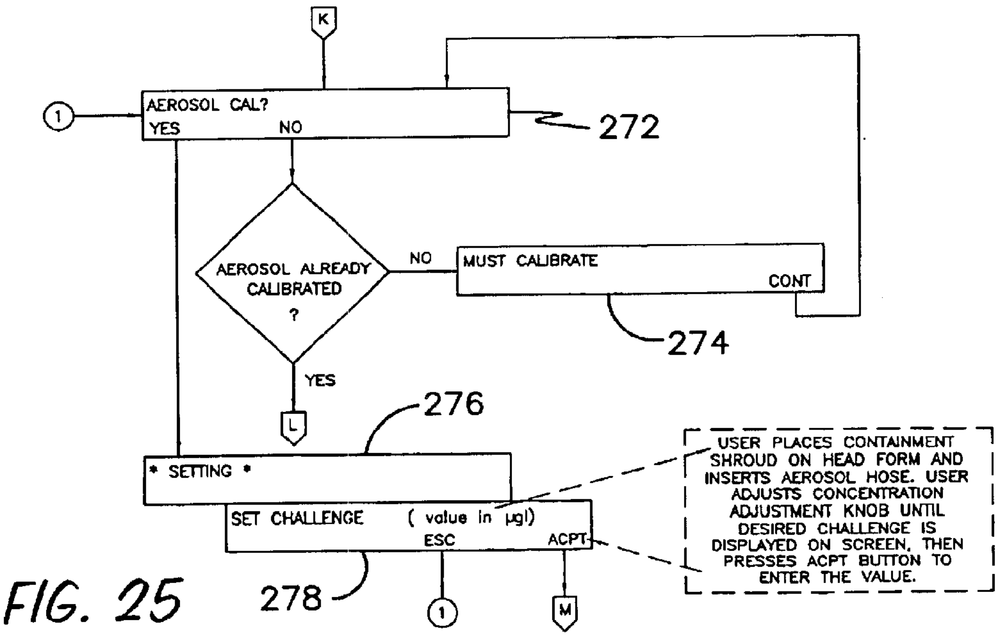
Figure 26:
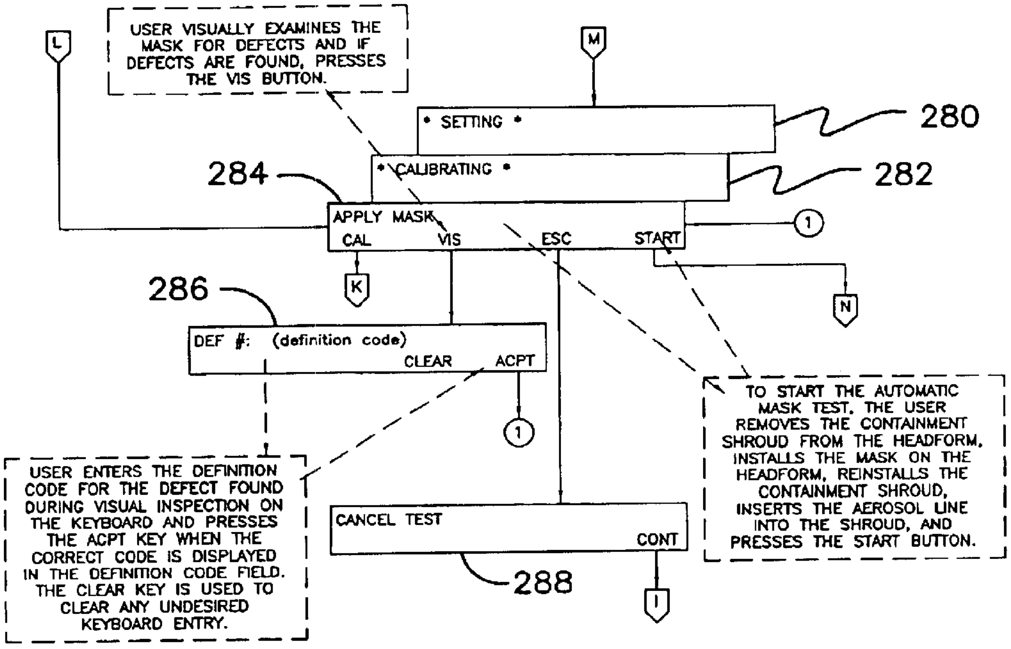
Figure 36:
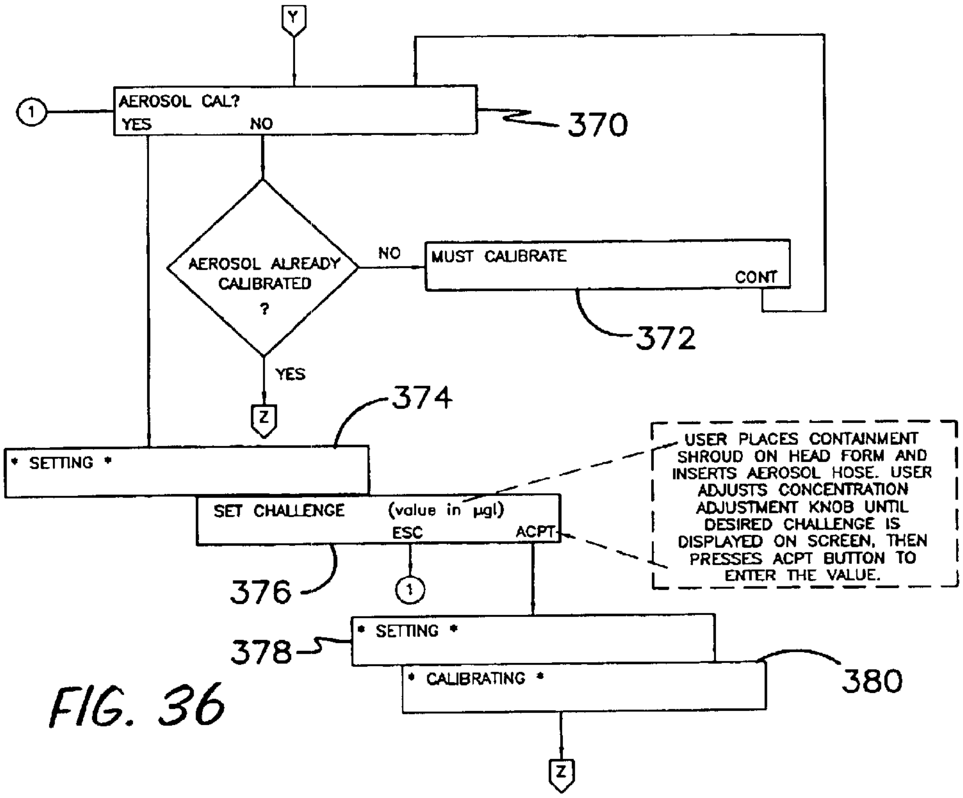
Figure 37:
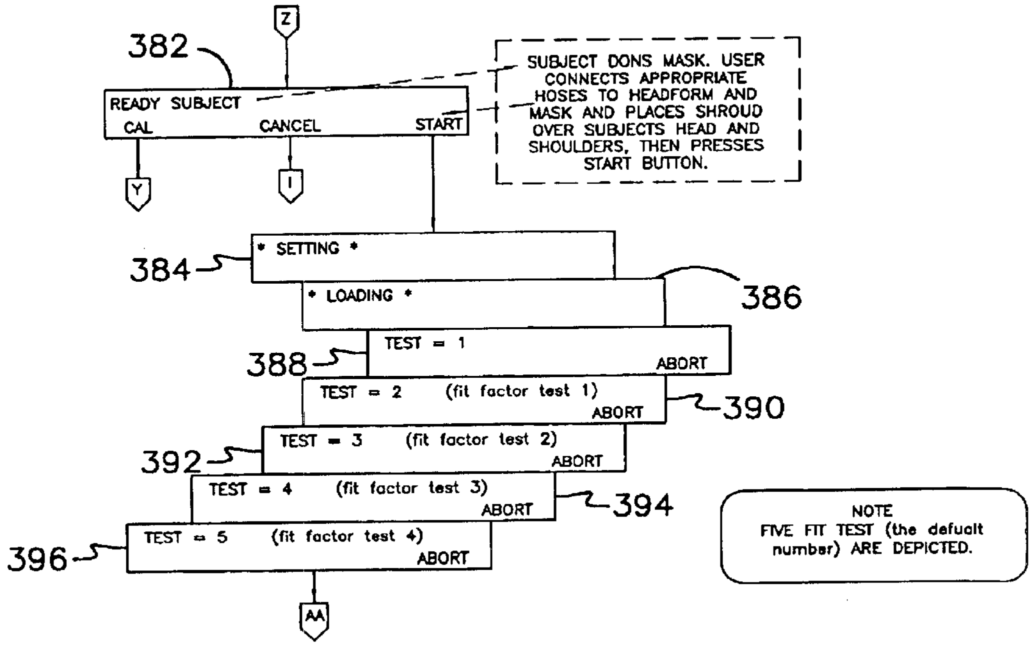
Figure 38:
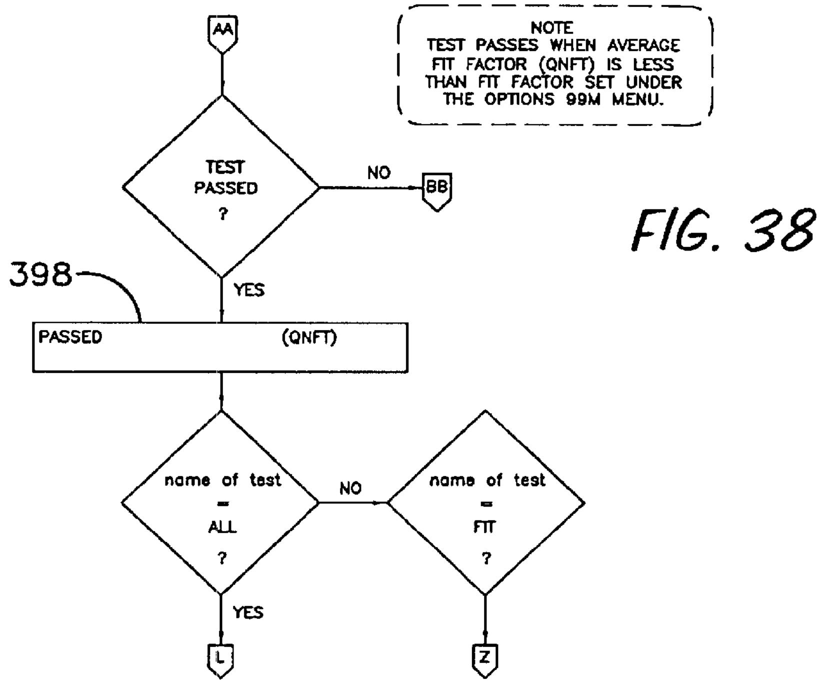
Figure 39:
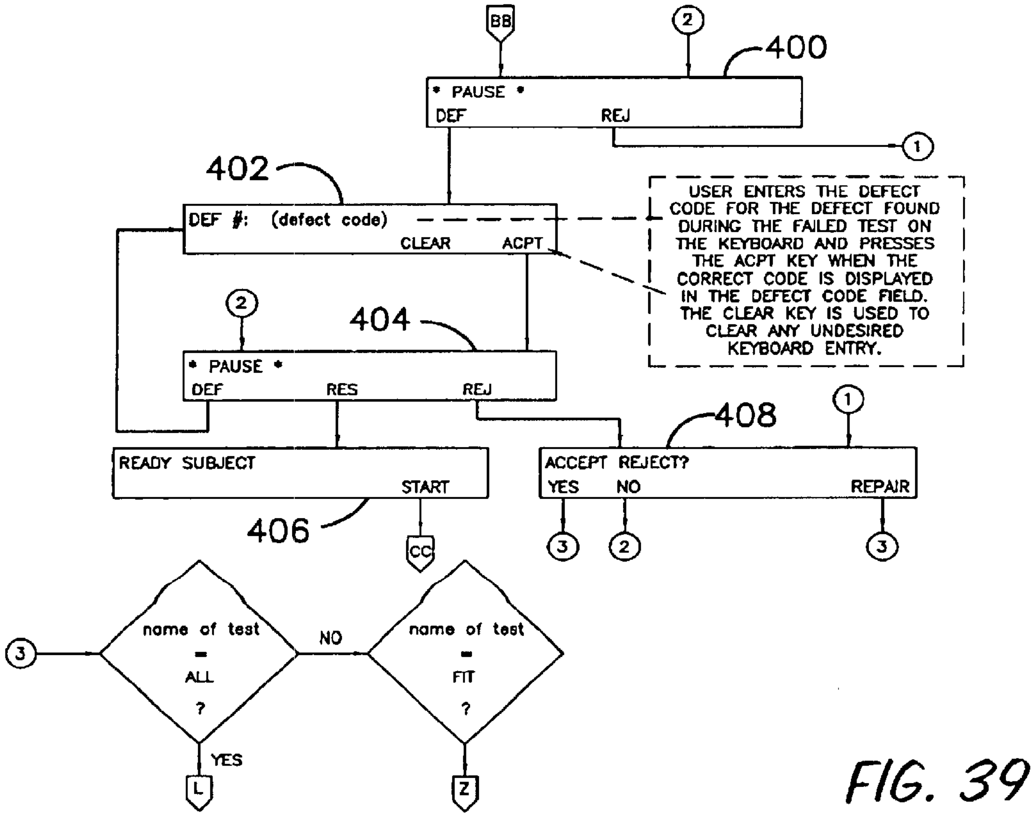

The following discussion will assume that the operator has selected ALL, since it performs all of the possible tests on the mask. It is also assumed that the operator has entered the necessary-information regarding the data log feature described above. The screens depicted in FIG. 25 are displayed. Through these series of screens the operator can readily calibrate the aerosol generator. It should be noted that these series of screens would be displayed if the operator had selected MALL or MASK as the type of test to be performed. A similar series of screens are displayed to the user in the event that the fit test is selected. These screens are depicted in FIG. 36. Referring to FIG. 25, screen 272 queries the operator regarding calibration. In the event that the operator chooses not to calibrate the aerosol generator by pressing F2, the system automatically checks to see if it has already been calibrated. In those instances where the system has not been calibrated, screen 274 appears informing the operator that he must calibrate the aerosol generator. The operator then presses CONT which directs him back to the initial calibration screen 272. The operator then must select calibration or once again be informed that calibration is required. Upon selection of calibration, two screens 276 and 278 are sequentially displayed. Screen 276 includes the message “setting”, while screen 278 enables the operator to set the desired concentration.

To calibrate the aerosol generator, the operator places a conventional containment shroud over the headform assembly B and inserts the aerosol hose 42 (see FIG. 7) through an opening in the containment shroud. The user then uses the adjustment knob 52 (see FIG. 7) to adjust the concentration of the aerosol until the value displayed on screen 278 is the desired value. The operator then presses F4 to accept the displayed value. The operator is then displayed the series of screens 280 through 288 in FIG. 26.

Figure 27:
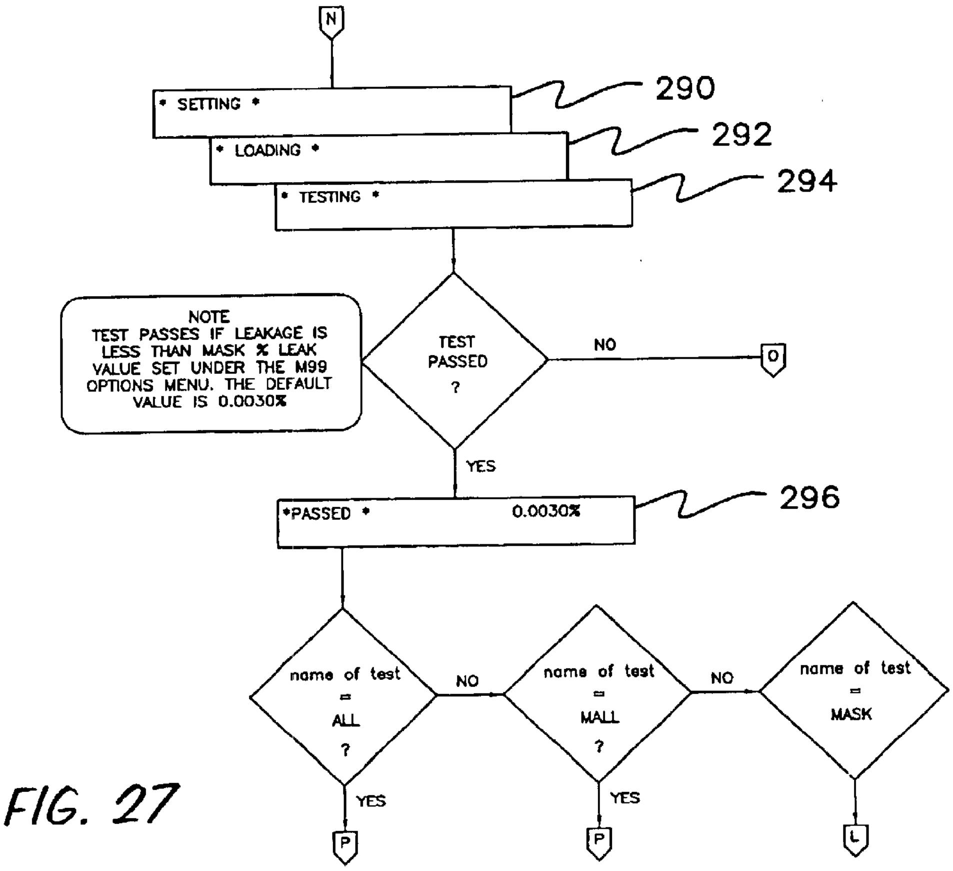

The first two screens 280 and 282 inform the operator that the selected parameter is being set and that the generator is being calibrated. The third screen 284 instructs the user to apply the mask to the headform assembly B and provides the user with four options: (1) CAL-if chosen returns the user to the calibration process; (2) VIS-the operator selects this prompt if upon visual inspection it is determined that the mask is defective; (3) ESC-this prompt cancels the test; and, (4) START-if chosen the series of display screens 290 through 294 depicted in FIG. 27 are displayed. As previously noted, if visual inspection reveals that the mask is defective, the operator presses F2 and screen 286 is displayed requiring the operator to input the code corresponding to the given defect. Upon entry of the defect code on screen 286 via keyboard 36, the operator presses ACPT which returns him to screen 284. The operator then selects the START prompt for screen 284 to initiate the mask test. The series of screens 290 through 294 depicted in FIG. 27 are displayed indicating that the test is being performed.

During the testing process, the seal 20 is inflated and the mask is tested in conformance with the particular type of test selected (i.e. 1 to 4). Seal 20 is inflated by turning on solenoid valves 76, 80 and 92. In the event that mask test 1 is selected, a continuous vacuum is created for the specified period (i.e. sample time). Hence, the mask is subjected to negative pressure. This is accomplished by placing solenoid valves 102 and 110 in the off position, closing solenoid valve 110 sufficiently to created the desired vacuum and turning solenoid valve 122 on. Simultaneously, aerosol is directed to the mask via line 42 by turning on solenoid valves 76 and 78. If test 2 is selected, the testing process is the same as test 1 with the exception that the test is run until failure or it is discontinued by the operator. The vacuum cycle during test 3 is the same as test 1. To accomplish the relax cycle for test 3, solenoid valve 106 is opened to atmosphere for the prescribed cycle time. Aerosol is continuously generated during the vacuum and relax cycles. The vacuum cycle for test 4 is performed in the same manner as test 1. The pressure cycle is performed by turning on solenoid valve 102 and turning off solenoid valve 78. During the pressure cycle aerosol is no longer generated. It will be readily appreciated that the pneumatic controls can be reconfigured to have continuous aerosol generation if necessary.

When a mask passes, the operator is so informed by screen 296. Further, since the test being performed is ALL the next series of screens displayed are those depicted in FIG. 29 to initiate the three drink train tests. The same thing is true if the test selected is MALL. In the event that the selected test is MASK, the system is returned to the screen 284 depicted in FIG. 26 so that another mask can be tested. This process would be continued until all masks have been tested.

Figure 28:
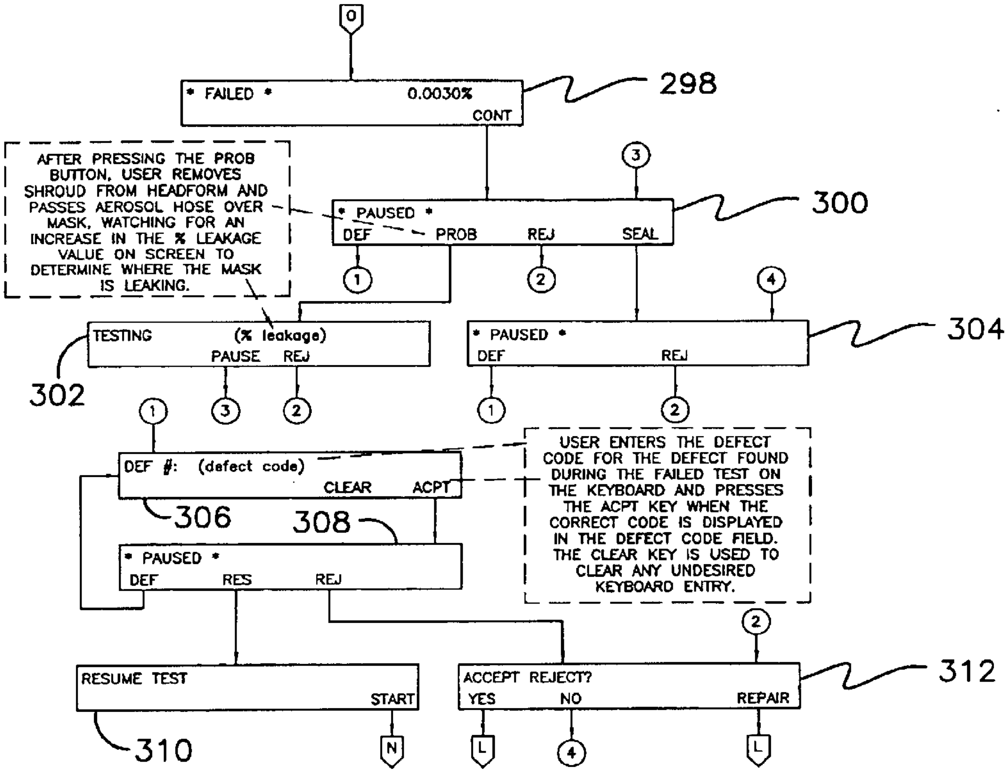

When a mask fails (i.e. a leak in the mask is detected), the operator is displayed a series of screens 298 through 312 depicted in FIG. 28. Screen 298 informs the operator of the failure. The operator presses F4 to have the next screen 300 displayed. This screens provides the operator with four options. The first is the prompt DEF corresponding to a defect. If this prompt is selected, the operator is then displayed two additional screens 306 and 308. Screen 306 requires the operator to enter the defect code. The next screen 308 provides the operator with the choice of rejecting the mask (REJ) or retesting the mask (RES). Additionally, the operator can return to the defect code entry screen 306 through the selection of prompt DEF. Screen 300 also enables the operator to select the probe mode, by pressing the function key corresponding to the prompt PROB. In the probe mode, the operator removes the containment shroud and passes the aerosol hose 42 over the mask. The operator simultaneously watches the display screen 302 for an increase in the percentage of leakage in the mask to isolate the leak. Upon completion of the probe mode, the operator is prompted to select REJ to reject the mask or PAUSE to return to the screen 300. The third option provided the operator by screen 300 is the selection of the REJ prompt. If this prompt is selected by the operator, screen 312 is displayed providing the operator with the choice of rejecting the mask, designating the mask for repair or returning to screen 304. It should be noted that screen 304 requires the operator to select the prompt REJ or DEF. Screen 312 is also displayed in the event the operator selects the REJ prompt from any one of screens 302, 304 or 308. The fourth option provided the user by screen 300 is the prompt SEAL which will result in the display of screen 304.

Regardless of the prompts selected from the screens depicted in FIG. 28, the operator has only three options for a failed mask, i.e. reject, repair or retest. Thus, the system is able to prevent a failed mask from inadvertently being passed.

Figure 29:
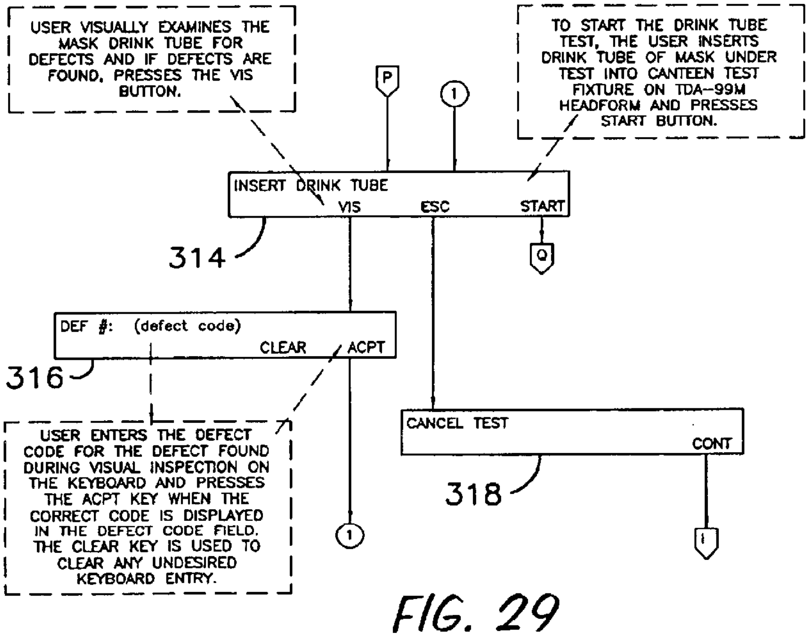
Figure 30:
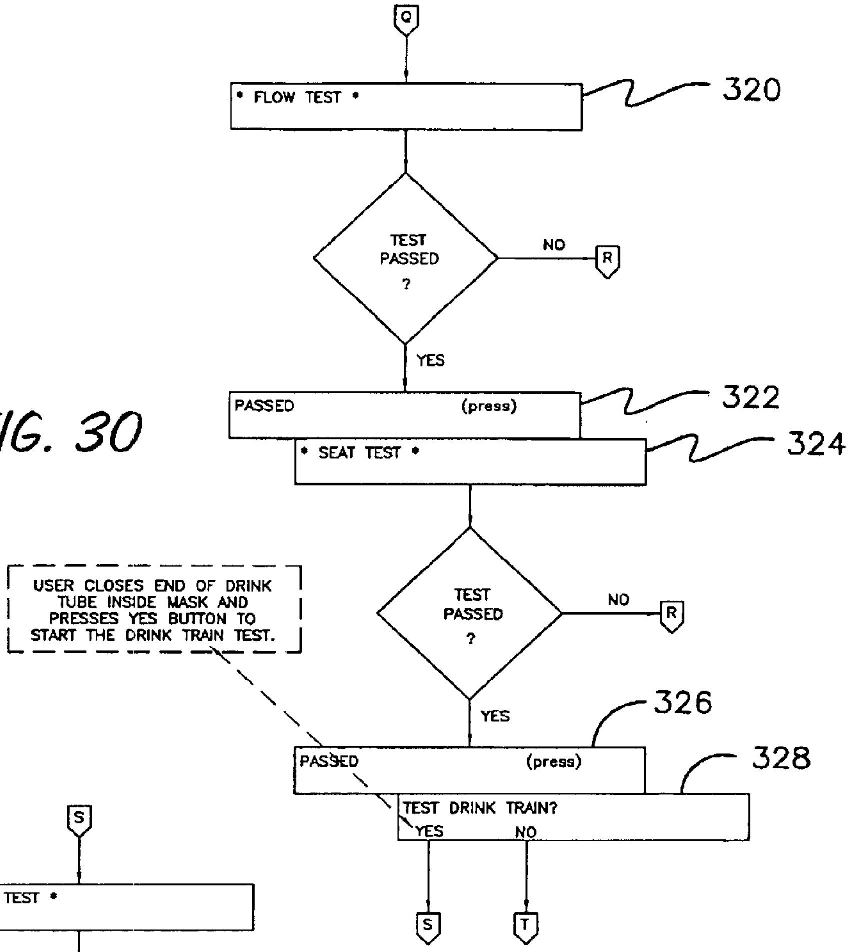
Figure 31:
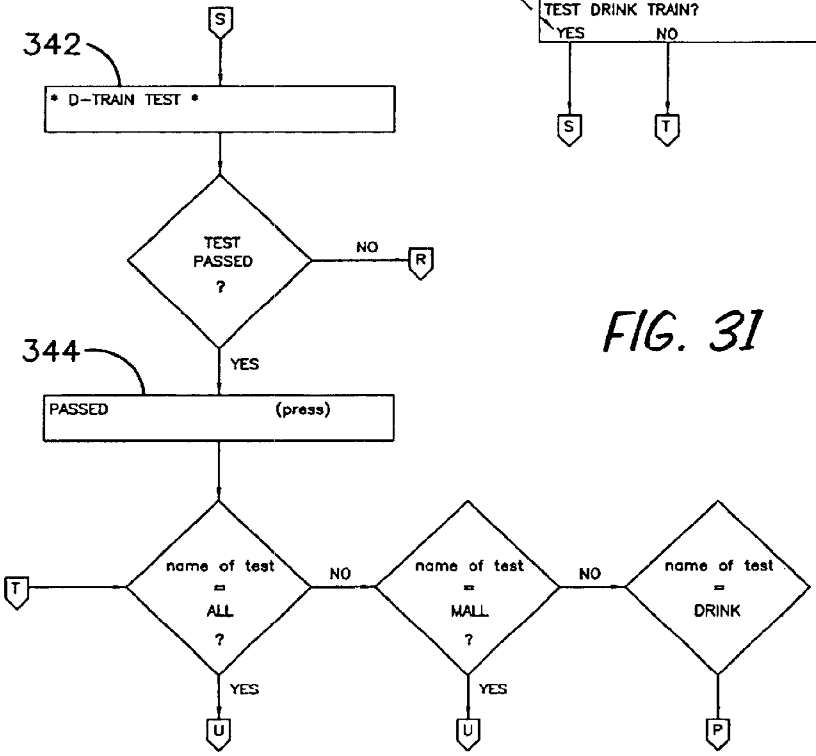

For a mask that has successfully passed the mask leakage test, screens 314, 316 and 318 depicted in FIG. 29 are displayed to initiate the drink train testing. The user first visually inspects the drink train which includes the drink tube and the quick-disconnect valve to determine if there are any defects. If a defect is detected through visual inspection, the user presses the function key corresponding to the prompt VIS of screen 314. Screen 316 will be displayed so that the operator can input the appropriate defect code. Once the operator has done so, he presses the ACPT prompt and is returned to screen 314. The drink tube is then connected to the canteen fixture 22. To start the tests on the drink train the operator selects the prompt START and is displayed the screen 320 depicted in FIG. 30. This screen informs the operator that the flow test is being performed to ascertain if any blockage is present in the drink tube which would prevent an individual wearing a protective mask from obtaining liquid from his canteen through the drink tube.

To perform this test, the quick-disconnect valve of the drink train must be unseated so that air can be directed into the drink tube. This is accomplished by turning on solenoid valves 76 and 82 to extend pin 88 to unseat the quick disconnect valve. As is readily understood, the pin 88 is connected to an air cylinder with a reciprocating piston. As the piston is moved forward by the air pressure delivered from solenoid valve 82, when in the on position, pin 88 is extended. Similarly, as the piston is moved in the opposite direction resulting from solenoid valve 82 being moved to the off position depicted in FIG. 9, the pin 88 is retracted.

The air pressue passing through the drink tube is monitored by the pressure transducer 134 to determine if there is a rise in pressure indicating an obstruction in the drink tube. In the event that no obstruction is present in the drink tube, screen 322 is displayed informing the operator that the mask has passed the flow test. Should an obstruction be detected (i.e. the mask failed) the operator is displayed the screens 330 through 340 depicted in FIG. 32. These screens are very similar to those displayed when a mask fails the leakage test and hence will not be described in detail (See FIG. 28). Once again, regardless of the operator's selections he or she must reject the mask, designate the mask for repair or retest the mask.

Once the mask has been either rejected or designated for repair through the selection of the corresponding prompt from any of screens 332, 336 or 340, the system determines which test is being performed and returns the operator to the appropriate set of screens to continue the test. In the case of the test ALL, the operator is returned to screen 284 and instructed to apply a mask to the headform for testing. It should be noted that in the event that the operator chooses to retest a mask which has failed the flow test, the flow test will be run again and if passed will continue to the drink seat test. If the mask still fails, the screens depicted in FIG. 32 will be displayed.

Figure 32:
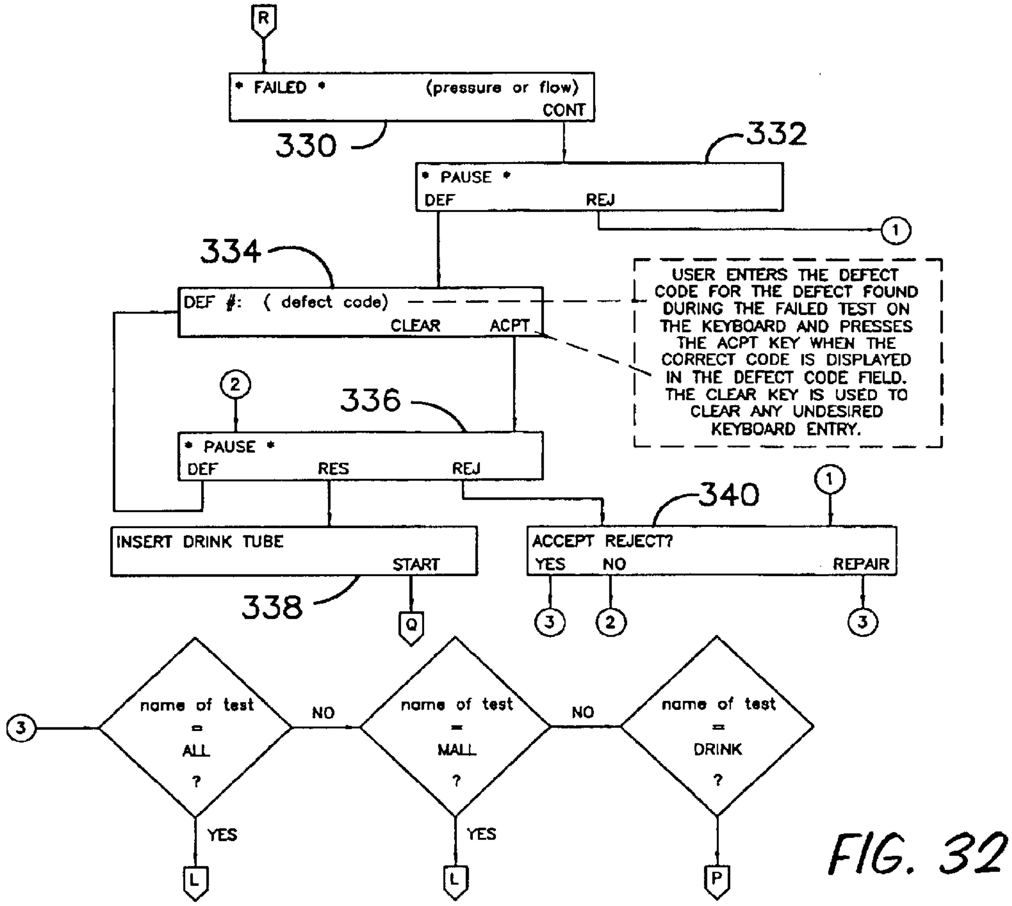

After passing the flow test, screen 324 is displayed to inform the operator that the seat test is being performed. This test determines whether the quick-disconnect valve is properly seated. The quick-disconnect valve is initially unseated and reseated. This is accomplished by turning on solenoid valves 76 and 78 to extend pin 88 to unseat the valve and then turning off solenoid valve 82 to retract pin 88. Once this has been done, air at a lower pressure than that used in the flow test is provided to the fixture 22. The air flow is monitored by the flow meter 148 while the air pressure is monitored by the transducer 134. If there is an unacceptable increase in air flow for a given air pressure, the valve is defective. If the valve passes, screen 326 is displayed to inform the operator. In the event of a failure, the screens depicted in FIG. 32 are displayed.

Figure 33:
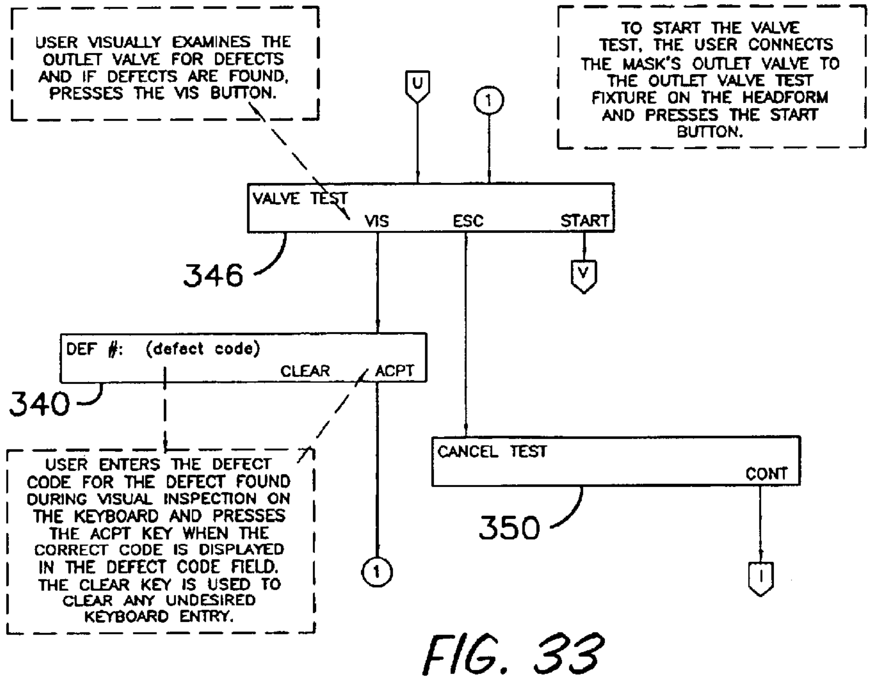
Figure 34:
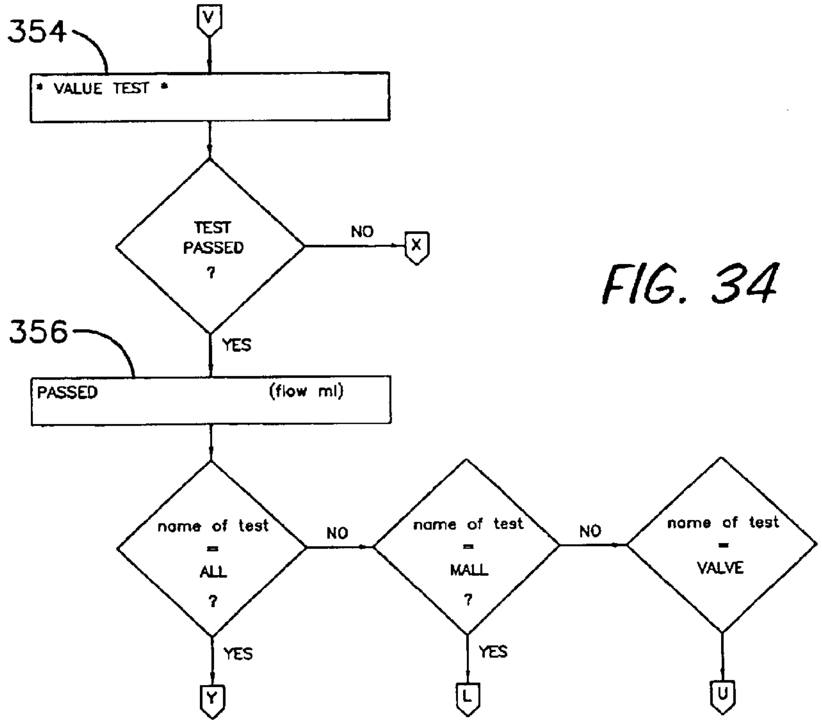
Figure 35:
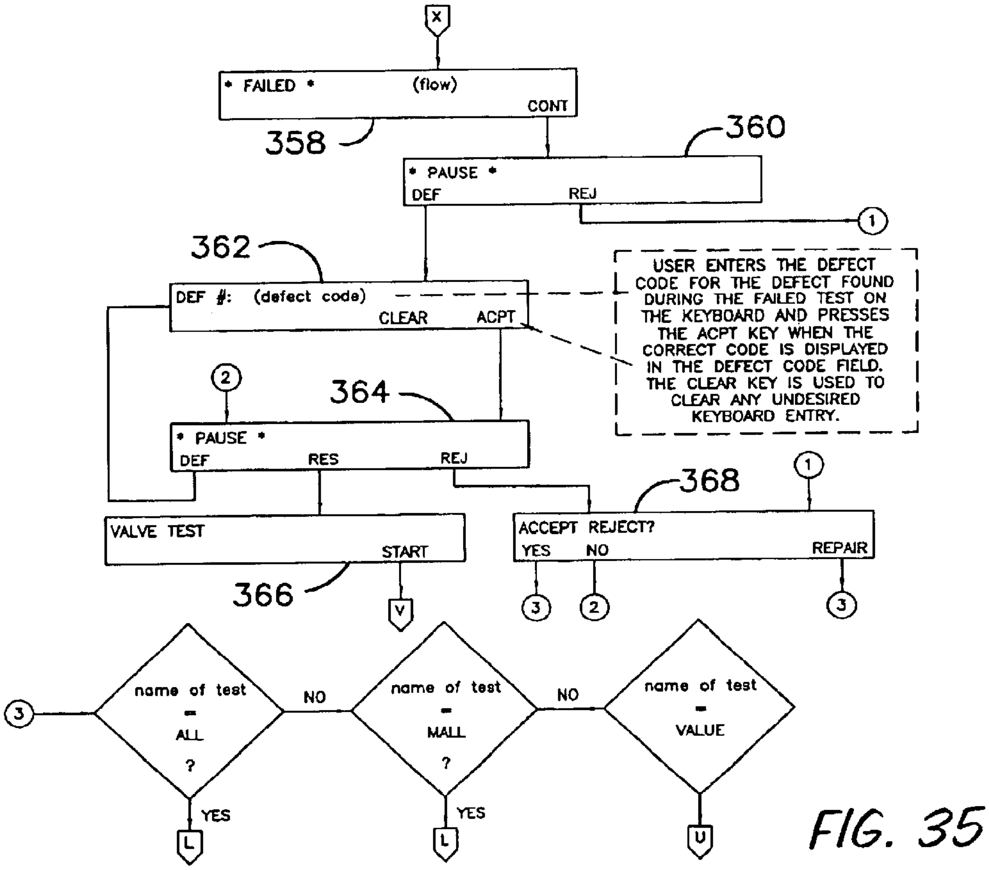

A mask passing the seat test is then tested to see if any leaks exist in the drink train. Screen 342 is displayed to inform the operator that this test is being performed. This test is exactly the same as the seat test with the sole exceptions that the operator blocks the port of the drink tube adjoining the mask and the quick disconnect valve is unseated during the test. If the mask passes this test the operator is so informed by the display of screen 344. In the event that the mask fails this test, the screens depicted in FIG. 32 are displayed. After the mask passes this test, the system checks to determine which overall test is being performed and then displays the next appropriate screen so that the test may continue without interruption. In the case of ALL, the screen 346 depicted in FIG. 33 is displayed. This screen identifies the test to the operator, i.e. outlet valve, and provides her with three options. The operator selects the prompt VIS, if she has determined through visual inspection that a defect exists. Screen 348 is subsequently displayed so that the operator can enter the appropriate defect code. If the user selects ESC, screen 350 is displayed. If the operator selects the prompt START, screen 354 depicted in FIG. 34 is displayed.

In the outlet valve test, air under pressure is directed to the outlet valve fixture 24. This is accomplished by turning on solenoid valves 76, 102, 110 and 146. The air flow is monitored by flow meter 148 while the air pressure is monitored by pressure transducer 134. Solenoid valve 168 is turned on so that the pressure transducer 134 is connected to outlet valve fixture 24. In the event of an unacceptable increase in air flow for the predetermined air pressure, the screens 358 through 368 (See FIG. 35) are displayed. These screens are very similar to those depicted in FIG. 32. Once again, the operator must reject, designate the mask for repair or retest.

Once the mask passes the outlet valve test the user is so informed by screen 356 and the system checks to determine the overall test being performed to display the next appropriate screen. In the case of ALL, screen 370 depicted in FIG. 36 is displayed. Screens 370 through 380 enable the system to ensure that the aerosol generator has been calibrated prior to initiation of the fit test. These screens are similar to screens 272 through 282 (See FIGS. 25 and 26). Once the calibration process has been completed, screen 382 is displayed informing the operator to ready the individual. This simply means that the individual puts on his mask and the containment shroud is placed over his head. The aerosol hose is placed in an opening in the shroud and the operator selects the prompt START to start the test. Aerosol is then generated and the system checks for leaks. If the mask passes, the operator is so informed by screen 398. In the event of a failure, screens 400 through 408 are displayed. It should be noted that the operator is forced to reject, designate the mask for repair or retest. During the fit test, a continuous vacuum is pulled for the specified sample time. While a photometer 114 is used to detect the presence of the test agent, other detection devices may be used including but not limited to CNC devices.

While this invention has been described as having a preferred design, it is understood that it is capable of further modifications, uses and/or adaptions of the invention following in general the principle of the invention and including such departures from the present disclosure as come within the known or customary practice in the art to which the invention pertains and as maybe applied to the central features hereinbefore set forth, and fall within the scope of the invention of the appended claims.

10187380.070202

COMPUTER PROGRAM LISTING 10181380.070202

99-3a82

```
{RESTART}
        LCH_A%=13H:LCH_B%=2001H
        XBY(0E000H)=LOW(LCH_A%) ;LCH_A%=13H Set *RFS,*TFS, active low,Set FAULT
        XBY(0C900H)=LOW(LCH_B%) ;LCH_B%=01H Set *ADC, active low
        XBY(0CC00H)=HIGH(LCH_B%)
        STRING 316, 20
        $(0)=" "
        $(1)=" "
        $(2)=" "
        $(3)="                 CONT"
        $(4)="                 ACPT"
        $(5)="          CLEAR"             ;UP ARW 252 DWN ARW 250
        $(6)=""                            ;OPID TEMP
        $(7)="YES    NO"
        $(8)="                START"
        $(9)="           ESC"
        $(10)="          ABORT"
        $(11)=" "                          ;This is TEMP location
        $(12)="* SETTING *"
        $(13)=" "                          ;This is TEMP location used in VF
        $(14)=" "                          ;This is TEMP location used in VF
        DEFVAR HOURMETER@702H,CAL_100@708H,XXX%@736H,CAL_DAC%@738H
        DEFVAR CMASKDAC%@750H,FITDAC%@752H,CVALDAC%@754H,SMPTIME%@756H
        DEFVAR LOADTIME%@762H,CONFIG%@768H,CYCLETIME%@76AH,CYCLETIME1%@76CH
        DEFVAR FIT_MAX@76EH,SCAN%@774H,FITNUM%@780H,FLOWTYPE%@782H,FITSEC%@784H
        DEFVAR DEFTEST@786H,LSC_LOW_SET@78CH,LSCDAC%@792H,CLDNKDAC%@794H
        DEFVAR MASKFLOW@73AH,MASKPRES@740H,PEN_MAX@75CH,CHDNKDAC%@796H
        DEFVAR CALTEST@70EH,CALTEMP%@6E8H
        DEFVAR CALFLOW16%@6F8H,CALFLOW2%@6F6H,CALPRES1%@6F4H,CALFLOW15M%@6F2H
        DEFVAR CALFLOWR5M%@6F0H,CALNULH%@6EEH,CALNULL%@6ECH,CALNULP%@6EAH

        XBY(07F9H)=00H
        FOR Z%=1 TO 60: NEXT Z%
```

Page 1

10187380.070202

99-3a82

```
        XBY(07F8H)=80H
        FOR Z%=1 TO 60: NEXT Z%
        XBY(07FCH)=00H
        FOR Z%=1 TO 60: NEXT Z%
        XBY(07F8H)=00H
        FOR Z%=1 TO 60: NEXT Z%
;INITIAL SETTING --------------------------------
        WARMTIME%=15
        DACMAX%=0E20H           ; MAXIMUM DAC OUTPUT
        XBY(06000H)=LOW(LSCDAC%)
        XBY(0CA00H)=0EH                       ;Set bleeder DAC OPEN
        XBY(0CB00H)=00H                      ;Set bleeder DAC OPEN
        INC%=0
        KEYS%=0000H
        LCH_D%=XBY(0CD00H)              ;Read System Settings
        FLAG1%=00H
        FLAG%=00H
        FLAG2%=00H
        FLAGTST%=00H
        LASTSTRING%=0   ;Used for del leading nums no decreased values
        CONTIME%=0
        IF HOURMETER > 99000 THEN HOURMETER=0 ;Ya this might happen?
        ONERR {ERROR1}                          ;Set error Kill system
        TIME=0 :CLOCK1
        ONTIME 360,{HOUR}
;CONSTANTS --------------------------------
        LDNKFLOW=.5:LDNKPRES=6          ;ccm, WC
        HDNKFLOW=2:HDNKPRES=2           ;ccm, WC
        VALFLOW=15:VALPRES=1            ;ccm, WC
        FITFLOW=4:FITPRES=7.5           ;LPM, WC
        MASKFLOW=16:MASKPRES=6          ;LPM, WC
        CONMAX=33386659         ;9.95volts
MASKDAC%=CMASKDAC%+100H:HDNKDAC%=CHDNKDAC%+100H:LDNKDAC%=CLDNKDAC%+100H
VALDAC%=CVALDAC%+100H:FITDAC%=DACMAX%-100H:TRNDAC%=DACMAX%-100H
```

10187380.070202

```
;|------------------------------------------------------------------
;|      Initalize
;-------------------------------------------------------------------
        XBY(0A000H)=16H                   ;ESC
        FOR Z%=1 TO 200: NEXT Z%
        $(0)="ATI Version 99M-3A82"
        VFLINE%=0: VFLOC%=00H: GOSUB {VF_CLEAR}
        DTMP1=HOURMETER:VFLOC%=20H:INC%.5=1:GOSUB{VFWRITE2}
        XTIME=TIME+10
;;      XTIME=TIME+1
{INFOA}
        IF XTIME> TIME THEN {INFOA}
        IF CALTEST=1234567890 THEN {INFOB}
        $(0)="** CAL UNIT ** ":$(1)=$(3)
        VFLINE%=1: VFLOC%=00H: GOSUB {VF_CLEAR}
        LCH_A%.7=1: XBY(0E000H)=LOW(LCH_A%)          ;SETS ALARM
{INFOAA}
        GOSUB {GETKEY}
        IF KEYS%.3=1 THEN {INFOBB};CONT
        GOTO {INFOAA}
{INFOBB}
        LCH_A%.7=0: XBY(0E000H)=LOW(LCH_A%)          ;CLEARS
        GOSUB {DEFAULTCAL}
{INFOB}
        IF DEFTEST<>1234567890 THEN GOSUB {DEFAULT0A}
{INFO}
        GOSUB{CLICK}
        $(0)= "WARM UP"
        VFLINE%=0: VFLOC%=00H: GOSUB {VF_clear}

        VFLOCTMP%=00H
        FOR X%=0 TO 12
        GOSUB {TIMEGET}
        FLAG2%.14=1:GOSUB{TIMEDSPL}
```

```
        XTIME=TIME+5
;;      XTIME=TIME+.5
{INFO1}
        IF XTIME> TIME THEN {INFO1}
        VFLOC%=VFLOCTMP%
        $(11)= " WARM UP": GOSUB{VFWRITE}
        VFLOCTMP%=VFLOCTMP%+1
        NEXT X%
        IF PORT1#.4=0 THEN FLAG%.10=1
{INFO5}
        GOSUB {PROMPT}
{ACCESS}
        $(0)="OPID:"
        $(1)=$(4): $(2)=$(5):VFLOC%=00H: VFLINE%=2: GOSUB {VF_CLEAR}
        VFLOC%=06H: NUMENTRY%=5: FLAG%.12=0
        GOSUB {KEYIN}
;-------- Look for valid Access of $(13)
        USETMP%=ASC($(13),1)
        IF USETMP%>39H {ACCESS}
        USETMP1%=ASC($(13),5)
        IF USETMP1%<41H THEN {ACCESS}
        USETMP%=(OFH.AND.USETMP%)
        USETMP1%=(OFH.AND.USETMP1%)
        IF USETMP%=USETMP1% THEN SECUR%=USETMP%
;       SECUR%=VAL(RIGHT$($(13),1))
        IF SECUR% >5 THEN {ACCESS}
        IF SECUR% <1 THEN {ACCESS}
;-------- Sett sensor zeros
        FLAG%.0=1
        IF SECUR%<=3 THEN {ACCESS1}
        IF FLAG%.10=1 THEN {MAINTEN}
{ACCESS1}
        GOSUB {CAL}
        FLAG%.0=0
```

10187_80.070202

```
;-------------------------------------------------------------------
;       Run-
;-------------------------------------------------------------------
{RUN}
        IF SECUR%=01H THEN {BEGIN}
{RUN0}
        $(0)="SYS VERIFY ?"
        $(2)=$(7): $(1)="                    OPT": VFLINE%=2: VFLOC%=00H:
        GOSUB {VF_CLEAR}
{RUN1}
        GOSUB {GETKEY}                                  ;Check for keys
        IF KEYS%.0=1 THEN GOSUB {CAL}: GOTO {RUN0}      ;Goto CAL
        IF KEYS%.3=1 THEN GOSUB {SETUP}: GOTO {RUN0}    ;Goto SETUP
        IF KEYS%.1=1 THEN {BEGIN}
        GOTO {RUN1}
;-------------------------------------------------------------------
;       Begin routine-
;-------------------------------------------------------------------
{CANCELBEGIN}
        IF TEST%=4 THEN FLAGTST%.13=1   ;ESC from M-ALL after mask
        IF TEST%=6 THEN FLAGTST%.13=1   ;ESC ALL after mask
{CANCELBEGIN0A}
;//check if from cancel test >> all data lost for this test sequence ??
;if data logger on
        GOSUB{PROMPT}
        IF FLAGTST%.12=1 THEN {CANCELBEGIN0}
        IF FLAGTST%.13=1 THEN {CANCELBEGIN0}
        IF CONFIG%.1=1 THEN {CANCELBEGIN0}
        DEFECT%=999: GOSUB{PRNT}        ;Terminate link
        GOTO {BEGIN}
{CANCELBEGIN0}
        $(0)="CANCEL TEST":$(1)=$(3)
        VFLINE%=1: VFLOC%=00H: GOSUB {VF_CLEAR}
{CANCELBEGIN1}
```

10187380.070202

99-3a82

```
        GOSUB {GETKEY}
        IF KEYS%.3=1 THEN {CANCELBEGIN2}
        GOTO {CANCELBEGIN1}
{CANCELBEGIN2}
        IF FLAGTST%.12=1 THEN DEFECT%=252: GOSUB{PRNT}
        IF FLAGTST%.13=1 THEN DEFECT%=252: GOSUB{PRNT}
        FLAGTST%.12=0:FLAGTST%.13=0
{BEGIN}
        GOSUB{PROMPT}
        $(0)="SELECT TEST=":$(1)="OPID  UP  DWN"
        VFLINE%=1: VFLOC%=00H: GOSUB {VF_CLEAR}
        GOSUB{DACSETOPEN}
        LCH_B%=2001H :GOSUB{OUTPUT}
{BEGIN1}
        GOSUB,{GETKEY}
        IF KEYS%.2=1 THEN TEST%=6:GOTO {BEGIN2}
        IF KEYS%.1=1 THEN TEST%=1:GOTO {BEGIN2}
        IF KEYS%.0=1 THEN {ACCESS}       ;{RUN}
        GOTO {BEGIN1}
{BEGIN2}
        $(1)=$(4):$(2)="OPID  UP  DWN"
        VFLINE%=2: VFLOC%=00H: GOSUB {VF_CLEAR}
{BEGIN3}
;add somthing for is this a retest?
        IF TEST%=7 THEN TEST%=1
        IF TEST%=0 THEN TEST%=6
        IF TEST%=1 THEN $(11)=" MASK":GOTO {BEGIN4}
        IF TEST%=2 THEN $(11)="DRINK":GOTO {BEGIN4}
        IF TEST%=3 THEN $(11)="VALVE":GOTO {BEGIN4}
        IF TEST%=4 THEN $(11)="M ALL":GOTO {BEGIN4}
        IF TEST%=5 THEN $(11)="  FIT":GOTO {BEGIN4}
        IF TEST%=6 THEN $(11)="  ALL":GOTO {BEGIN4}
{BEGIN4}
        VFLOC%=0DH:GOSUB {VFWRITE}
```

10187380.070202

```
{BEGIN4A}
        GOSUB {GETKEY}
        IF KEYS%.3=1 THEN {BEGIN5}
        IF KEYS%.2=1 THEN TEST%=TEST%-1:GOTO {BEGIN3}
        IF KEYS%.1=1 THEN TEST%=TEST%+1:GOTO {BEGIN3}
        IF KEYS%.0=1 THEN {ACCESS}       ;{RUN}
        GOTO {BEGIN4A}
{BEGIN5}
        DEFECT%=0
        FLAG2%.13=0:FLAG%.9=0:FLAG%.3=0          ;Reset for info / retest
        TEST1%=0
        IF TEST%=4 THEN {BEGIN9}
        IF TEST%=6 THEN {BEGIN9}
        FLAGTST%=00H             ;Clear new test
        IF TEST%=1 THEN {MASKSTART}
        IF TEST%=2 THEN {TUBE}
        IF TEST%=3 THEN {EXV}
        GOTO {FITSTART}
{BEGINNEW}
        FLAG2%.13=0:FLAG%.9=0:FLAG%.3=0          ;Reset for info / retest
        IF TEST%=4 THEN {BEGIN7}
        IF TEST%=6 THEN {BEGIN6}
        GOSUB {PRNT}
        DEFECT%=0: FLAGTST%=00H          ;Clear new test
        IF TEST%=1 THEN {MASK}
        IF TEST%=2 THEN {TUBE}
        IF TEST%=3 THEN {EXV}
        GOTO {FIT}
{BEGIN6}
        DEFECT%=0
        IF TEST1%=0 THEN FLAGTST%=00H            ;Clear new test
        TEST1%=TEST1%+1
        IF TEST1%> 4 THEN {BEGIN8}
        ON TEST1% GOTO {BEGIN6},{MASK},{TUBE},{EXV},{FIT}
```

```
{BEGIN7}
        DEFECT%=0
        IF TEST1%=0 THEN FLAGTST%=00H           ;Clear new test
        TEST1%=TEST1%+1
        IF TEST1%> 3 THEN {BEGIN8}
        ON TEST1% GOTO {BEGIN7},{MASK},{TUBE},{EXV}
{BEGIN8}
        TEST1%=0
        GOSUB {PRNT}
        GOTO {BEGINNEW}
{BEGIN9}
        TEST1%=1: FLAGTST%=00H
        GOTO {MASKSTART}
;---------------------------
;       Drink Tube
;---------------------------
{TUBE}
        IF CONFIG%.1=0 THEN {TUBE00}
        IF FLAG%.9=1 THEN {TUBE00}
        GOSUB{DATAINPUT}
{TUBE00}
        FLAG2%.5=0
        LCH_B%=0E001H: GOSUB {OUTPUT}
        $(0)="INSERT DRINK TUBE"
        $(1)=$(8): $(2)="     VIS  ESC"
        IF FLAG%.3=1 THEN VFLINE%=1 ELSE VFLINE%=2
        VFLOC%=00H: GOSUB {VF_CLEAR}
{TUBE1}
        GOSUB {GETKEY}
        IF KEYS%.3=1 THEN {TUBE1A};START
        IF FLAG%.3=1 THEN {TUBE1};retest only
        IF KEYS%.2=1 THEN {CANCELBEGIN};EXIT
        IF KEYS%.1=1 THEN GOSUB{VISUALDEFECT}:GOTO {TUBE00}
        GOTO {TUBE1}
```

10187380.070202

10187380.070202

99-3a82

```
{TUBE1A}
;cyl
        FLAG2%.10=1:FLAGTST%.12=0
        LCH_B%.5=1: LCH_B%.4=1: GOSUB {OUTPUT}  ;cyl out
;;      LCH_B%.10=0: XBY(0CC00H)=HIGH(LCH_B%)   ;bleed air
        $(0)="* FLOW TEST *"
;       $(1)=$(10)
        VFLINE%=0: VFLOC%=00H:GOSUB {VF_CLEAR}
        LCH_B%.7=1:LCH_B%.11=1:LCH_B%.13=0
        FLAG1%.8=1: GOSUB {OUTPUT}      ;flow/pres hdrnk
        DACTMP%=HDNKDAC%+50H
        GOSUB{DACSETLONG}
        SETTMP=HDNKFLOW:TOLP=.15:TOLN=.05:TTOL=.1
        VFLOCTMP%=13H:GOSUB{VFMOVE}:XBY(0A000H)=15H
{CHECKDFLOW}
        FOR X%=1 TO 15:NEXT X%  ;delay *993A82
        FLAG1%.10=0
        PUSH 08EH, 0AEH: L%=3: GOSUB {LTC_READ1}        ;pres hflow
        USETMP=(LTC_VAR-OFFSETH)*FACTORH
        CHKTMP=((LTC_VAR1-OFFSETP)*FACTORP)
                        ;if flow <=hdnkflow and hdnkpres >2 fail
        IF FLAG1%.10=1 THEN DTMP1=8 :GOTO{TUBE2A}
        IF USETMP> HDNKFLOW {TUBE2}
        IF CHKTMP> HDNKPRES THEN DTMP1=CHKTMP:GOTO{TUBE2A}
{TUBE2}
        GOSUB{DACADJ}
        IF FLAG1%.2=1 THEN {CHECKDFLOW}
        XBY(0A000H)=16H         ;cursor box off
        IF CHKTMP> HDNKPRES THEN DTMP1=CHKTMP:GOTO{TUBE2A}
        HDNKDAC%=DACTMP%
        GOSUB{DACSETOPEN}
;CYL
        LCH_B%.7=0:LCH_B%.5=0:GOSUB {OUTPUT}    ;hflow/cyl off
        FOR X%=1 TO 750:NEXT X%
```

10187380.070202

```
        LCH_B%.4=0: XBY(0C900H)=LOW(LCH_B%)       ;bleed air
        DTMP1=CHKTMP
        IF LCH_D%.0=0 THEN PRINT"P-HDNK",USING(0),USETMP,CHKTMP,HDNKDAC%
        FLAGTST%.1=1              ;Pass flow
        FLAG2%.0=1:GOSUB {IPASSED}: FLAG2%.0=0
        GOTO {TUBE3}
{TUBE2A}        ;failed
        LCH_B%.5=0: XBY(0C900H)=LOW(LCH_B%)       ;cyl in
        FOR X%=1 TO 750:NEXT X%
        GOSUB{DACSETOPEN}
        XBY(0A000H)=16H           ;cursor box off
        LCH_B%=0E001H: GOSUB {OUTPUT}
        IF LCH_D%.0=0 THEN PRINT"F-HDNK",USING(0),USETMP,CHKTMP,HDNKDAC%
        FLAGTST%.1=0              ;Fail flow
        FLAG2%.4=1:GOSUB {IFAILED}:FLAG2%.4=0
        GOTO {FAILPAUSE}
{TUBE3}
        FLAG2%.10=0
        IF FLAG2%.5=1 THEN LCH_B%.5=1:LCH_B%.4=1:GOSUB{OUTPUT} ;cyl on
        LCH_B%.10=0: XBY(0CC00H)=HIGH(LCH_B%)     ;bleed air
        IF FLAG2%.5=1 THEN $(0)="*D-TRAIN TEST*" ELSE $(0)="* SEAT TEST *"
        $(1)=$(10)
        VFLINE%=0: VFLOC%=00H: GOSUB {VF_CLEAR}
        LCH_B%.9=1: GOSUB {OUTPUT}
{TUBE3A}
        IF FLAG2%.5=1 THEN DACTMP%=TRNDAC%+60H ELSE DACTMP%=LDNKDAC%+60H
        GOSUB{DACSETLONG}
        VFLOCTMP%=13H:GOSUB{VFMOVE}:XBY(0A000H)=15H
        SETTMP=LDNKPRES:TOLP=.5:TOLN=.2:TTOL=1.5
        FOR X%=1 TO 250:NEXT X% ;delay *993A82
{CHECKDSEAT}
        FOR X%=1 TO 20:NEXT X%  ;delay *993A82
        FLAG1%.10=0
        PUSH 0AEH, 09EH: L%=3: GOSUB {LTC_READ1}        ;pres hflow
```

10182380 .070202

99-3a82

```
        USETMP=(LTC_VAR-OFFSETP)*FACTORP
        CHKTMP=(LTC_VAR1-OFFSETL)*FACTORLL
                        ;if flow <=hdnkflow and hdnkpres >2 fail
        IF FLAG1%.10=1 THEN DTMP1=40: GOTO{TUBE4A}
        IF USETMP> LDNKPRES THEN {TUBE4}
        IF FLAG2%.5=1 THEN {TUBE3B}
        IF DACTMP%>(LDNKDAC%+70H) THEN DTMP1=USETMP:GOTO{TUBE4A} ;flow failed
        GOTO {TUBE4}
{TUBE3B}
        IF DACTMP%>(TRNDAC%+70H) THEN DTMP1=USETMP:GOTO{TUBE4A} ;flow failed
{TUBE4}
        GOSUB{DACADJ}
        IF FLAG1%.2=1 THEN GOTO{CHECKDSEAT}
        FOR X%=1 TO 2500: NEXT X%
        FLAG1%.10=0
        USETMP=0:CHKTMP=0
        FOR X%=1 TO 4
        PUSH 0AEH, 09EH: L%=3: GOSUB {LTC_READ1}          ;pres hflow
        USETMP=USETMP+(LTC_VAR-OFFSETP)*FACTORP
        CHKTMP=CHKTMP+(LTC_VAR1-OFFSETL)*FACTORLL
        NEXT X%
        IF CHKTMP/4> LDNKFLOW THEN DTMP1=CHKTMP/4:GOTO{TUBE4A}
        IF CHKTMP<0 THEN CHKTMP=0
        XBY(0A000H)=16H          ;cursor box off
        IF FLAG2%.5=1 THEN TRNDAC%=DACTMP% ELSE LDNKDAC%=DACTMP%
        GOSUB{DACSETOPEN}
;CYL
        LCH_B%.9=0:LCH_B%.5=0:GOSUB {OUTPUT}     ;hflow/cyl off
        FOR X%=1 TO 750:NEXT X%
        LCH_B%.4=0: XBY(0C900H)=LOW(LCH_B%)     ;bleed air
        IF CHKTMP<0 THEN CHKTMP=0
        DTMP1=CHKTMP/4
IF LCH_D%.0=0 THEN PRINT"P-LDNK",USING(0),USETMP/4,CHKTMP/4,LDNKDAC%,TRNDAC%
        IF FLAG2%.5=1 THEN FLAGTST%.3=1 ELSE FLAGTST%.2=1
```

10187380.070202

```
        FLAG2%.0=1:GOSUB {IPASSED}: FLAG2%.0=0
        GOTO {TUBE5}
{TUBE4A}        ;failed
        LCH_B%.5=0: XBY(0C900H)=LOW(LCH_B%)      ;cyl in
        FOR X%=1 TO 750:NEXT X%
        GOSUB{DACSETOPEN}
        XBY(0A000H)=16H          ;cursor box off
        LCH_B%=0E001H: GOSUB {OUTPUT}
IF LCH_D%.0=0 THEN PRINT"F-LDNK",USING(0),USETMP/4,CHKTMP/4,LDNKDAC%,TRNDAC%
        IF FLAG2%.5=1 THEN FLAGTST%.3=0 ELSE FLAGTST%.2=0
        FLAG2%.3=1:GOSUB {IFAILED}:FLAG2%.3=0
        GOTO {FAILPAUSE}
{TUBE5}
        IF FLAG2%.5=1 THEN {TUBE8}
        $(0)="TEST DRINK TRAIN ?"
        $(1)=$(7):VFLOC%=00H: VFLINE%=1: GOSUB {VF_OUT}
{TUBE6}
        GOSUB {GETKEY}
        IF KEYS%.1=1 THEN {TUBE8}
        IF KEYS%.0=1 THEN {TUBE7}
        GOTO {TUBE6}
{TUBE7}
        FLAG2%.5=1
        FLAGTST%.11=1    ;Train test run
        GOTO {TUBE3}
{TUBE8}
        LCH_B%.11=0:LCH_B%.13=1:XBY(0CC00H)=HIGH(LCH_B%)
        GOTO {BEGINNEW}
;---------------------------------------
{EXV}
        IF CONFIG%.1=0 THEN {EXV00}
        IF FLAG%.9=1 THEN {EXV00}
        GOSUB{DATAINPUT}
{EXV00}
```

10122580.070202

```
        LCH_B%=0EC01H: GOSUB {OUTPUT}
        $(0)="VALVE TEST"
        $(1)=$(8): $(2)="     VIS  ESC"
        IF FLAG%.3=1 THEN VFLINE%=1 ELSE VFLINE%=2
        VFLOC%=00H: GOSUB {VF_CLEAR}
{EXV1}
        GOSUB {GETKEY}
        IF KEYS%.3=1 THEN {EXV1A};START
        IF FLAG%.3=1 THEN {EXV1};retest only
        IF KEYS%.1=1 THEN GOSUB{VISUALDEFECT}:GOTO {EXV00}
        IF KEYS%.2=1 THEN {CANCELBEGIN};EXIT
        GOTO {EXV1}
{EXV1A}
        FLAGTST%.12=0
        VFLINE%=0: VFLOC%=00H: GOSUB {VF_CLEAR}
{EXV2}
        XTIME=TIME+3
{EXV3}
        IF XTIME >TIME THEN {EXV3}
        GOSUB {PROMPT}
        FOR X%=1 TO 400: NEXT
        GOSUB {PROMPT}
        XTIME=TIME+1
{EXV4}
        IF XTIME >TIME THEN {EXV4}
        LCH_B%.12=1:LCH_B%.13=0:XBY(0CC00H)=HIGH(LCH_B%)
        $(0)="* VALVE TEST *"
        VFLINE%=0: VFLOC%=00H: GOSUB {VF_CLEAR}
        DACTMP%=VALDAC%+100H
        GOSUB{DACSETLONG}
        VFLOCTMP%=13H:GOSUB{VFMOVE}:XBY(0A000H)=15H
        FOR X%=1 TO 3500 :NEXT X%
        SETTMP=VALPRES:TOLP=.06:TOLN=-.02:TTOL=.3
{CHECKVAL}
```

10187_80.070202

99-3a82

```
        FOR X%=1 TO 10:NEXT X%  ;delay *993A82
        FLAG1%.10=0
        PUSH 0AEH, 09EH: L%=3: GOSUB {LTC_READ1}        ;pres hflow
        USETMP=(LTC_VAR-OFFSETP)*FACTORP
        CHKTMP=(LTC_VAR1-OFFSETL)*FACTORL
        IF FLAG1%.10=1 THEN DTMP1=40 :GOTO{EXV5A}
        IF USETMP> VALPRES {EXV5}
        IF CHKTMP> VALFLOW THEN DTMP1=CHKTMP:GOTO{EXV5A}
{EXV5}
        GOSUB{DACADJ}
        IF FLAG1%.2=1 THEN {CHECKVAL}
;;      FOR X%=1 TO 1500 :NEXT X%
        IF CHKTMP> VALFLOW THEN DTMP1=CHKTMP:GOTO{EXV5A}
        XBY(0A000H)=16H         ;cursor box off
        VALDAC%=DACTMP%
        GOSUB{DACSETOPEN}
        LCH_B%.12=0:LCH_B%.13=1:XBY(0CC00H)=HIGH(LCH_B%)
        IF CHKTMP<0 THEN CHKTMP=0
        DTMP1=CHKTMP
        IF LCH_D%.0=0 THEN PRINT"P-XVAL",USING(0),USETMP,CHKTMP,VALDAC%
        FLAGTST%.4=1            ;Pass exv
        FLAG2%.0=1:GOSUB {IPASSED}: FLAG2%.0=0
        GOTO {BEGINNEW}
{EXV5A} ;failed
        GOSUB{DACSETOPEN}
        XBY(0A000H)=16H
        LCH_B%=0E001H: GOSUB {OUTPUT}
        IF LCH_D%.0=0 THEN PRINT"F-XVAL",USING(0),USETMP,CHKTMP,VALDAC%
        FLAGTST%.4=0            ;Fail exv
        FLAG2%.3=1:GOSUB {IFAILED}:FLAG2%.3=0
        GOTO {FAILPAUSE}

;-------------
;       CAL
```

99-3a82

```
;-------------
{CAL}
        $(0)="SYSTEM CHECK"
        VFLINE%=0: VFLOC%=00H: GOSUB {VF_CLEAR}
        VFLOCTMP%=13H:GOSUB{VFMOVE}:XBY(0A000H)=15H      ;cursor box on
IF LCH_D%.0=0 THEN print"setd",CALFLOWR5M%,CALNULH%,CALNULL%,CALNULP%
IF LCH_D%.0=0 THEN print"sete",CALFLOW16%,CALFLOW2%,CALPRES1%,CALFLOW15M%,caltemp%
IF LCH_D%.0=0 THEN print"setf",CMASKDAC%,FITDAC%,CVALDAC%,CLDNKDAC%,CHDNKDAC%
IF LCH_D%.0=0 THEN print"setf",MASKDAC%,FITDAC%,VALDAC%,LDNKDAC%,HDNKDAC%
        PUSH 00BEH: GOSUB {LTC_READ}
        SETTEMP%=INT(10*(((LTC_VAR*.001221)/.0021)-273)) ;Temp form ref02
        IF LCH_D%.0=0 THEN PRINT"TEMP",SETTEMP%,LTC_VAR
        IF FLAG%.5=1 THEN {CAL0}          ;skip mainten
        IF FLAG%.0=0 THEN {CAL0}          ;skip after startup
        IF FLAG1%.14=1 THEN {CAL0}        ;skip after startup
        LCH_B%.5=1: XBY(0C900H)=LOW(LCH_B%)      ;cyl out
        XTIME=TIME+3
        GOSUB {INFLATSEAL}       ;*992C
        IF USETMP%=1 THEN USETMP%=0::GOTO{RESTART}
{CAL0}
        XTIME=TIME+10
{CAL1}
        IF XTIME> TIME THEN {CAL1}
{CAL2}
        GOSUB {DACSETOPEN}
        LCH_B%=0289H: FLAG1%.8=1: GOSUB {OUTPUT}
        USETMP1%= 009EH          ;read lowflow
        GOSUB {LTCREADME}

        OFFSETL=USETMP
        IF FLAG%.5=1 THEN {CAL3}
        FACTORL=15/(CALFLOW15M%-CALNULL%)
        FACTORLL=.5/(CALFLOWR5M%-CALNULL%)
        PRINT USING(0),CR,
```

10187380.070202

101[illegible]380.070202

99-3a82

```
        IF LCH_D%.0=0 THEN PRINT"FACTOR L=",FACTORLL,FACTORL,OFFSETL
        IF LCH_D%.0=0 THEN PRINT"FACTOR L=",CALFLOW15M%,CALFLOWR5M%,CALNULL%
{CAL3}
        LCH_B%=4009H: FLAG1%.8=1: GOSUB {OUTPUT}
        USETMP1%=008EH  ;read hiflow
        GOSUB{LTCREADME}
        OFFSETH=USETMP
        IF FLAG%.5=1 THEN {CAL4}
        FACTORHH=16/(CALFLOW16%-CALNULH%)
        FACTORH=2/(CALFLOW2%-CALNULH%)
        IF LCH_D%.0=0 THEN PRINT"FACTOR H=",FACTORHH,FACTORH,OFFSETH
{CAL4}
        LCH_B%=6009H: FLAG1%.8=1: GOSUB {OUTPUT}
        USETMP1%=00AEH          ;read press
        GOSUB{LTCREADME}
        OFFSETP=USETMP
        IF FLAG%.5=1 THEN {CAL5}
        FACTORP=1/(CALPRES1%-CALNULP%)
        IF LCH_D%.0=0 THEN PRINT"FACTOR P=",FACTORP,OFFSETP
{CAL5}
        XBY(0A000H)=16H                  ;cursor box off
;---check seal still inflated   *992C
        IF FLAG%.5=1 THEN {CAL7}
        IF FLAG%.0=0 THEN {CAL7}         ;skip after startup
        IF FLAG1%.14=1 THEN {CAL7}       ;skip after startup
        LCH_D%=XBY(0CD00H)
        LCH_B%.3=0: XBY(0C900H)=LOW(LCH_B%)      ;deflate seal
        IF LCH_D%.7=1 THEN GOSUB {FAILSEAL}
        FLAG1%.14=1
        LCH_A%.7=0: XBY(0E000H)=LOW(LCH_A%)          ;CLEARS
{CAL7}
        IF FLAG%.5=1 THEN {FLOW}
        IF FLAG%.0=1 THEN RETURN
        IF SECUR% <3 RETURN
```

10187_80.070202

99-3a82

```
        GOTO{FLOW}
{LTCREADME}
        USETMP=0
        FOR Z%=1 TO 8
        PUSH LOW(USETMP1%)
        GOSUB{LTC_READ}
        USETMP=USETMP+LTC_VAR
        NEXT Z%
        USETMP=USETMP/ 8
        RETURN
;-----------------------------------------------------
{FLOW}
        GOSUB {DACSETOPEN}
        LCH_B%=2001H: GOSUB{OUTPUT}
        GOSUB {PROMPT}
        $(0)="CHECK FLOWS ?"
        $(1)="MSK  ORF  EXIT":VFLOC%=00H: VFLINE%=1: GOSUB {VF_OUT}
{FLOW1}
        GOSUB {GETKEY}
        IF KEYS%.1=1 THEN {VALMAINT}
        IF KEYS%.2=1 THEN RETURN
        IF KEYS%.0=1 THEN {ADJUST}
        GOTO {FLOW1}
{ADJUST}
        FLAG1%.4=1              ;dacadj steps
        $(0)="MASK FLOW=    /"
        $(1)=$(4):VFLOC%=00H: VFLINE%=1: GOSUB {VF_OUT}
;       DTMP1=MASKFLOW:VFLOCTMP%=0BH:INC%=0:GOSUB{VFWRITE0A}
;       DTMP1=MASKPRES:VFLOCTMP%=10H:INC%=0:GOSUB{VFWRITE0A}
{ADJUST1}
        GOSUB {GETKEY}
        IF KEYS%.3=1 THEN {ADJUST2}
        GOTO {ADJUST1}
{ADJUST2}
```

10127380.070202

```
        LCH_B%.6=1:XBY(0C900H)=LOW(LCH_B%)
        GOSUB {PROMPT}
        GOSUB {DACSETOPEN}
        DACTMP%=MASKDAC%+50H
        TOLP=.2:TOLN=.2:TTOL=.1:GOSUB{DACSETLONG}
        SETTMP=MASKFLOW
{ADJUST3}
        FLAG1%.10=0
        PUSH 08EH, 0AEH: L%=3: GOSUB {LTC_READ1}         ;pres hflow
        USETMP= (LTC_VAR-OFFSETH)*FACTORHH
        CHKTMP=(LTC_VAR1-OFFSETP)*FACTORP
IF LCH_D%.0=0 THEN PRINT"CHK",LTC_VAR,OFFSETP,FACTORP,LTC_VAR1,OFFSETH,FACTORHH
        DTMP1=USETMP:VFLOCTMP%=0BH:INC%=0:GOSUB{VFWRITE0A}
        DTMP1=CHKTMP:VFLOCTMP%=10H:INC%=0:GOSUB{VFWRITE0A}
        GOSUB{DACADJ}
        IF FLAG1%.10=1 THEN {FLOW}
        IF PORT1#.4=0 THEN {ADJUST4}
        GOTO {ADJUST3}
{ADJUST4}
        MASKDAC%=DACTMP%
        IF (PORT1#.AND.0F0H)= 0F0H THEN {ADJUST4}
        GOTO {FLOW}

{VALMAINT}
        GOSUB {PROMPT}
        LCH_B%=0E001H: GOSUB {OUTPUT}
        $(0)="ORIFICE        /"
        $(1)=$(3):VFLOC%=00H: VFLINE%=1: GOSUB {VF_OUT}
{LFLOWSET1}
        GOSUB {GETKEY}
        IF KEYS%.3=1 THEN {LFLOWSET2}
        GOTO {LFLOWSET1}
{LFLOWSET2}
;       $(0)=$(12x):VFLOC%=00H: VFLINE%=0: GOSUB {VF_CLEAR}
```

10122380.070202

99-3a82

```
        VFLOCTMP%=13H:GOSUB{VFMOVE}:XBY(0A000H)=15H      ;cursor box on
        LCH_B%.12=1:LCH_B%.13=0:XBY(0CC00H)=HIGH(LCH_B%)
        DACTMP%=VALDAC%+50H
        GOSUB{DACSETLONG}
        SETTMP=VALPRES:TOLP=.05:TOLN=-.02:TTOL=.3
        XTIME=TIME+5
{LFLOWSET2A}
        IF XTIME> TIME THEN {LFLOWSET2A}
        XBY(0A000H)=16H         ;cursor box off
{LFLOWCK}
        FLAG1%.10=0
        PUSH 0AEH, 09EH: L%=3: GOSUB {LTC_READ1}         ;pres hflow
        USETMP=(LTC_VAR-OFFSETP)*FACTORP
        CHKTMP=(LTC_VAR1-OFFSETL)*FACTORL
IF LCH_D%.0=0 THEN PRINT"CHK",LTC_VAR,OFFSETP,FACTORP,LTC_VAR1,OFFSETL,FACTORL
        DTMP1=USETMP:VFLOCTMP%=0BH:INC%=0:GOSUB{VFWRITE1}
        DTMP1=CHKTMP:VFLOCTMP%=10H:INC%=0:GOSUB{VFWRITE0A}
        GOSUB{DACADJ}
;       IF FLAG1%.10=1 THEN {FLOW}
        IF PORT1#.4=0 THEN GOSUB{PROMPT}: GOTO {LFLOWACPT1}
        GOTO {LFLOWCK}
{LFLOWACPT1}
        FOR Z%=1 TO 50:NEXT Z%
        IF (PORT1#.AND.0F0H)<> 0F0H THEN {LFLOWACPT1}
        GOTO {FLOW}
;****************
{AEROSOL}
        GOSUB {DACSETOPEN}
        LCH_B%=2001H: GOSUB{OUTPUT}
        GOSUB {PROMPT}
        $(0)="AEROSOL CAL ?"
        $(1)=$(7): VFLINE%=1: VFLOC%=00H: GOSUB {VF_CLEAR}
{AEROSOL1}
        GOSUB {GETKEY}
```

10187_80.070202

```
        IF KEYS%.1=1 THEN {AEROSOL2};no
        IF KEYS%.0=1 THEN {HUNDREDSET};yes
        GOTO {AEROSOL1}
{AEROSOL2}
        IF FLAG%.5=1 THEN RETURN
        IF FLAG1%.1=0 THEN GOSUB {MUST_CAL}: GOTO {AEROSOL}
        RETURN
{HUNDREDSET}
        $(0)=$(12):VFLOC%=00H: VFLINE%=0: GOSUB {VF_CLEAR}
;993a8   LCH_B%.6=1:XBY(0C900H)=LOW(LCH_B%) ;smp on
        LSCDACTMP%=LSCDAC%
        DACTMP%=MASKDAC%:GOSUB{DACSETLONG}
        IF CAL_DAC%=00H THEN {HUNDSET0}         ;skip if NOT SET
IF LCH_D%.0=0 THEN PH1."DACS",LSCDAC%,CAL_DAC%
        LSCDAC%=CAL_DAC%
        FLAG%.2=1: GOSUB {DAC3}
        XTIME=TIME+5
        GOSUB{ZEROSET}
{HUNDSET0}
        $(0)="SET CHALLENGE - "
        $(1)=$(4): $(2)=$(9): VFLINE%=2: VFLOC%=00H: GOSUB {VF_CLEAR}
        LCH_B%.6=1:XBY(0C900H)=LOW(LCH_B%) ;smp on
        FOR X%=1 TO 500: NEXT X%
        LCH_B%.2=1:LCH_B%.4=1:XBY(0C900H)=LOW(LCH_B%) ;GEN ON
{HUNDSET1}
        GOSUB {GETKEY}
        IF KEYS%.3=1 THEN {HUNDSETSUB1}
        IF KEYS%.2=1 THEN {AEROSOL};EXIT
        GOTO {HUNDSET1}
{HUNDSETSUB1}
;goto {skip100}
        $(0)=$(12):VFLOC%=00H: VFLINE%=0: GOSUB {VF_CLEAR}
        LSCDAC%=LSCDACTMP%
        FLAG%.2=1: GOSUB {DAC3}: FLAG%.2=0
```

```
        GOSUB {HUNDSETSUB}
        GOTO{HUNDREDOUT};CONT
{HUNDSETSUB}
        $(0)=" * CALIBRATING *": VFLINE%=0: VFLOC%=00H: GOSUB {VF_CLEAR}
        FLAG1%.7=1: GOSUB{LSC_WRITE}
;       $(0)=$(12):VFLOC%=00H: VFLINE%=0: GOSUB {VF_CLEAR}
        GOSUB {DAC}
        XTIME=TIME+8     ;average time
        LOOP%=0:LSCOUT=0
{HUNDSET2A}
        LSC_100=0
        GOSUB {CLICK}
        LOOP%=LOOP%+1
        FOR Z%=1 TO 8
        GOSUB {LSC_READ}
        LSC_100= LSC_100+LSC_VAR
        NEXT Z%
        LSC_100=LSC_100/ 8
        LSCOUT=LSCOUT+ LSC_100
        IF XTIME> TIME THEN {HUNDSET2A}
        LSC_100=LSCOUT/ LOOP%
;       IF (PEN/Y%) < (.3*LSC_LOW_SET) THEN {ERROR_A}
        GOSUB{PROMPT}
        LCH_B%.4=0:LCH_B%.6=0:LCH_B%.2=0:XBY(0C900H)=LOW(LCH_B%)         ;gen oFF
        GOSUB {PROMPT}:GOSUB {PROMPT}
        XTIME=TIME+10
        GOSUB{ZEROSET}  ;Establish 0 for testing
        LSC_0_SET= LSC_0
        GOSUB{PROMPT}:GOSUB {WARNING}
        RETURN
{HUNDREDOUT}
        FLAG1%.1=1      ;aerosol set
;//?    FLAG1%.0=1      ;system once thru
        GOSUB {DACSETOPEN}
```

99-3a82

```
        LCH_B%=2001H: GOSUB{OUTPUT}
        RETURN
;----------
;       Maintenance
;-----------
{MAINTEN}
        GOSUB {PROMPT}
        FLAGTMP%=0
        FOR Z%=1 TO 50:NEXT Z%
        IF (PORT1#.AND.0F0H)= 0F0H THEN {MAINTEN0}
        GOTO {MAINTEN}
{MAINTEN0}
        IF FLAG%.5=1 THEN {MAINTEN0A}
        FLAG%.5=1                                ;Set for Maintenance
        GOSUB {CAL}
{MAINTEN0A}
        GOSUB {PROMPT}
        $(0)="MAINTENANCE"
        $(1)="CAL        EXIT ENTR":VFLOC%=00H: VFLINE%=1: GOSUB {VF_OUT}
        FOR Z%=1 TO 2000: NEXT Z%
{MAINTEN1}
        GOSUB {GETKEY}
        IF KEYS%.3=1 THEN {LSCMAINT}
        IF KEYS%.2=1 THEN FLAG%.5=0:GOTO{RESTART}
        IF KEYS%.1=1 THEN {ATIUSE}
        IF KEYS%.0=1 THEN GOSUB{CAL}:GOTO{MAINTEN}
        GOTO {MAINTEN1}
{LSCMAINT}
        $(0)=" ":$(1)=$(9):$(2)="SMP":VFLOC%=00H:VFLINE%=2:GOSUB{VF_OUT}
        LCH_B%=2001H: GOSUB{OUTPUT}
        DACTMP%=MASKDAC%: GOSUB {DACSET}
        FLAG1%.7=0: GOSUB{LSC_WRITE}
{LSCMAINT1}
        GOSUB{LSCLOOP}
```

10187380.070202

```
        DTMP1=(PEN*.000000298)
        VFLOCTMP%=05H:INC%=0:GOSUB{VFWRITE1}
;;{LSCMAINT1A}
        IF PORT1#.5=0 THEN {MAINTEN}
        IF PORT1#.7=0 THEN {LSCMAINT2}
        GOTO {LSCMAINT1}
{LSCMAINT2}
        IF LCH_B%.6=0 THEN LCH_B%.6=1 ELSE LCH_B%.6=0
        XBY(0C900H)=LOW(LCH_B%)
        GOTO {LSCMAINT1}

{ATIUSE}
        $(0)="CHECK STUFF"
        $(1)=$(9):VFLOC%=00H: VFLINE%=1: GOSUB {VF_CLEAR}
{ATIUSE1}
        LCH_B%.4=0: XBY(0C900H)=LOW(LCH_B%)     ;bleed air
        GOSUB {GETKEY}
        IF KEYS%.3=1 THEN {LSCSET}
        IF KEYS%.2=1 THEN {MAINTEN}
;CYL
        IF KEYS%.1=1 THEN LCH_B%.5=0:LCH_B%.4=1:GOSUB{OUTPUT}
        IF KEYS%.0=1 THEN LCH_B%.5=1:LCH_B%.4=1:GOSUB{OUTPUT}
        GOTO {ATIUSE1}
{LSCSET}
        IF LCH_D%.1=1 THEN {ATIUSE1}
        FOR Z%=1 TO 10000: NEXT Z%
        IF PORT1#.7=0 THEN {LSCSET1}
        IF PORT1#.6=0 THEN {CALSENS}
        GOTO {ATIUSE1}
{LSCSET1}
        $(0)="REF SET"
        $(2)=$(9):$(1)=$(8):VFLOC%=00H: VFLINE%=2: GOSUB {VF_CLEAR}
{LSCSET2}
        GOSUB {GETKEY}
```

10187_80.070202

```
        IF KEYS%.0=1 THEN {INPUTSTUFF}
        IF KEYS%.3=1 THEN {LSCSET3}
        IF KEYS%.2=1 THEN {MAINTEN}
        GOTO {LSCSET2}
{LSCSET3}
        VFLOCTMP%=13H:GOSUB{VFMOVE}:XBY(0A000H)=15H
        LCH_B%=2049H: GOSUB{OUTPUT}
        DACTMP%=MASKDAC%: GOSUB {DACSETLONG}
        FOR X%=1 TO 6
        GOSUB {CLICK}
        FOR Z%=1 TO 3000: NEXT Z%
        NEXT X%
        FLAG2%.15=1
        GOSUB {HUNDSETSUB}
        CAL_DAC%=LSCDAC%
        CAL_100=LSC_100
        PRINT"CAL_100",CAL_100
        FLAG2%.15=0
        LCH_B%=2001H: GOSUB{OUTPUT}
        VFLOCTMP%=13H:GOSUB{VFMOVE}:XBY(0A000H)=15H
        FLAG1%.7=0: GOSUB {LSC_WRITE}
        FOR X%=1 TO 6
        GOSUB {CLICK}
        FOR Z%=1 TO 3000: NEXT Z%
        NEXT X%
        XTIME=TIME+15
        GOSUB {ZEROSET}
        LSC_LOW_SET=LSC_0
        PRINT"CAL_0",LSC_LOW_SET
        XBY(0A000H)=16H
        GOSUB {WARNING}
        GOTO{LSCSET1}
{INPUTSTUFF}
        $(0)="REMOTE"
```

10187_80.070202

```
        $(1)="HMTR      EXIT":VFLOC%=00H: VFLINE%=1: GOSUB {VF_CLEAR}
{INPUTSTUFF1}
        GOSUB {GETKEY}
        IF KEYS%.2=1 THEN {MAINTEN}
        IF KEYS%.0=1 THEN INPUT "HOURMETER=",HOURMETER
        GOTO {INPUTSTUFF1}

;-------------
;       SENSOR CAL POINTS
;-------------
{CALSENS}
        SETSENS%=0
        $(0)="CAL SET"
        $(2)=$(9):$(1)=$(8)
        VFLOC%=00H: VFLINE%=2: GOSUB {VF_CLEAR}
{CALSENS1}
        GOSUB {GETKEY}
        IF KEYS%.3=1 THEN {CALSENS1A}
        IF KEYS%.2=1 THEN {MAINTEN}
        GOTO {CALSENS1}
{CALSENS1A}
        CALTEST=0                       ;must cal all or no run
        CALNULH%=INT(OFFSETH)
        CALNULP%=INT(OFFSETP)
        CALNULL%=INT(OFFSETL)
        CALTEMP%=SETTEMP%
        LCH_B%=2001H :GOSUB{OUTPUT}
        DO
        GOSUB{DACSETOPEN}
        ON SETSENS% GOTO {SENSET},{SENSET1},{SENSET1A},{SENSET2},{SENSET3}
{SENSET}
        LCH_B%.13=1:LCH_B%.6=1:GOSUB{OUTPUT}    ;set for headform smpl
        $(11)="16L @ 6WCv"
        USETMP%=08EH:CHKTMP%=0AEH
```

10187_80.070202

```
        GOTO {CALSENS2}
{SENSET1}
        LCH_B%=0C881H :GOSUB(OUTPUT)
        FLAG1%.8=1
;CYL
        LCH_B%.5=1: LCH_B%.4=1: GOSUB {OUTPUT}  ;cyl out
        $(11)=" 2L @ 2WCp"
        USETMP%=08EH:CHKTMP%=0AEH
        GOTO {CALSENS2}
{SENSET1A}
        LCH_B%=0D001H :GOSUB(OUTPUT)
;       FLAG1%.8=1
;       LCH_B%.4=1:GOSUB(OUTPUT)         ;set for lowdrink
        $(11)="1WCp"
        USETMP%=09EH:CHKTMP%=0AEH
        GOTO {CALSENS2}
{SENSET2}
        LCH_B%=0D001H :GOSUB(OUTPUT)
;       FLAG1%.8=1
;       LCH_B%.4=1:GOSUB(OUTPUT)         ;set for lowdrink
        $(11)="15ml @ 1WCp"
        USETMP%=09EH:CHKTMP%=0AEH
        GOTO {CALSENS2}
{SENSET3}
        $(11)=".5ml @ 6WCp"
        USETMP%=09EH:CHKTMP%=0AEH
{CALSENS2}
        $(0)="CAL > "
        $(0)=$(0)+$(11)
        $(1)="JD    U    JU   ACPT"
        VFLINE%=1: VFLOC%=00H: GOSUB {VF_CLEAR}
{CALSENS3}
        FLAG2%.2=1
        GOSUB {GETKEY}
```

10187380.070202

```
        IF KEYS%.3=1 THEN {CALSENS4}
        IF KEYS%.0=1 THEN DACTMP%=DACMAX%: GOSUB{DACSET}
        GOTO {CALSENS3}
{CALSENS4}
        ON SETSENS% GOTO {SENSAVE},{SENSAVE1},{SENSAVE1A},{SENSAVE2},{SENSAVE3}
{SENSAVE}
        CALFLOW16%=USETMP1%
        CMASKDAC%=DACTMP%
        PH0."16@6",CALFLOW16%,CHKTMP1%,CALNULH%,CALNULP%,CMASKDAC%
        GOTO {CALSENS5}
{SENSAVE1}
        CALFLOW2%=USETMP1%
        CHDNKDAC%=DACTMP%
        PH0."2@2",CALFLOW2%,CHKTMP1%,CALNULH%,CALNULP%,CHDNKDAC%
;CYL
        LCH_B%.5=1: LCH_B%.4=1: GOSUB {OUTPUT}  ;cyl out
        LCH_B%.7=0:LCH_B%.5=0:GOSUB {OUTPUT}    ;hflow/cyl off
        FOR X%=1 TO 750:NEXT X%
        LCH_B%.4=0: XBY(0C900H)=LOW(LCH_B%)     ;bleed air
        GOTO {CALSENS5}
{SENSAVE1A}
        CALPRES1%=CHKTMP1%
        PH0."1WCp",USETMP1%,CALPRES1%,CALNULL%,CALNULP%,CVALDAC%
        GOTO {CALSENS5}
{SENSAVE2}
        CALFLOW15M%=USETMP1%
        CVALDAC%=DACTMP%
        PH0."15@1",CALFLOW15M%,CHKTMP1%,CALNULL%,CALNULP%,CVALDAC%
        GOTO {CALSENS5}
{SENSAVE3}
        CALFLOWR5M%=USETMP1%
        CLDNKDAC%=DACTMP%
        PH0.".5@6",CALFLOWR5M%,CHKTMP1%,CALNULL%,CALNULP%,CLDNKDAC%
{CALSENS5}
```

10187_20.070202

```
        SETSENS%=SETSENS%+1
        UNTIL SETSENS%=5
        CALTEST=1234567890
        LCH_B%=2001H :GOSUB{OUTPUT}
        GOSUB{DACSETOPEN}
        GOTO {MAINTEN}
;-------------
;       MASK
;-------------
{MASKSTART}
        GOSUB {AEROSOL}
{MASK}
        IF FLAG1%.1=0 THEN {MASKSTART}  ;aerosol set
        IF FLAG%.9=1 THEN {MASK00}
        IF CONFIG%.1=1 THEN GOSUB {DATAINPUT}
{MASK00}
        FLAG%.8=0
        LCH_B%=2001H: GOSUB{OUTPUT}
        $(0)="APPLY MASK"
        $(1)="CAL  VIS  ESC  START"
        VFLINE%=1: VFLOC%=00H: GOSUB {VF_CLEAR}
{MASK1}
        GOSUB {GETKEY}
        IF KEYS%.2=1 THEN {CANCELBEGIN0A}       ;EXIT
        IF KEYS%.0=1 THEN {MASKSTART}   ;Cal aerosol
        IF KEYS%.3=1 THEN {MASK1A}      ;CONT
        IF KEYS%.1=1 THEN GOSUB{VISUALDEFECT}:GOTO {MASK00}
        GOTO {MASK1}
{RESUMEMASK}
        $(0)="RESUME TEST"
        $(1)=$(8): VFLINE%=1: VFLOC%=00H: GOSUB {VF_CLEAR}
{RESMASK1}
        GOSUB {GETKEY}
        IF KEYS%.3=1 THEN {MASK1A};CONT
```

```
        GOTO {RESMASK1}
{MASK1A}
        FLAG2%.13=0:FLAGTST%.12=0  ;Clear Coraction set
        PEN=0
        FLAG%.7=0:FLAG%.8=0:FLAG2%.8=0
        $(0)=$(12): VFLINE%=0: VFLOC%=00H: GOSUB {VF_CLEAR}
;abort  $(1)=$(10): VFLINE%=1: VFLOC%=00H: GOSUB {VF_CLEAR}
        DACTMP%=MASKDAC%+70H: GOSUB{DACSETLONG}
        XTIME=TIME+2
        GOSUB {INFLATSEAL}
{MASK1A1}               ;3A6
        IF USETMP%=1 THEN USETMP%=0::GOTO{MASK00}
        TOLP=.4:TOLN=.1:TTOL=.2
        XTIME=TIME+2
        GOSUB {ZEROSET}
        FLAG1%.8=1              ;delay here
        LCH_B%.6=1: GOSUB {OUTPUT}      ;smpl on
        FLAG1%.8=1              ;delay here
        LCH_B%.4=1: LCH_B%.2=1: GOSUB {OUTPUT}  ;gen on
        VFLOCTMP%=13H:GOSUB{VFMOVE}:XBY(0A000H)=15H
        SETTMP=MASKFLOW
{CHECKMASK}
        FLAG1%.10=0
        PUSH 08EH, 0AEH: L%=3: GOSUB {LTC_READ1}        ;pres hflow
        USETMP=(LTC_VAR-OFFSETH)*FACTORHH
        CHKTMP=(LTC_VAR1-OFFSETP)*FACTORP
        GOSUB{DACADJ}
        IF FLAG1%.10=1 THEN DTMP1=8.3:GOTO{PAUSEDA0}
        IF FLAG1%.2=1 THEN {CHECKMASK}
        XBY(0A000H)=16H         ;cursor box off
        IF CHKTMP< MASKPRES-1 THEN DTMP1=CHKTMP:GOTO{PAUSEDA0}
;?      IF USETMP< MASKFLOW-.5 THEN DTMP1=USETMP:GOTO{PAUSEDA0}
        MASKDAC%=DACTMP%
        IF LCH_D%.0=0 THEN PRINT"MASK SET",USING(0),USETMP,CHKTMP,DACTMP%
```

10187380.070202

10187_80.070202

99-3a82

```
{MASKRUNAA}
        LCH_B%.4=1: LCH_B%.2=1:XBY(0C900H)=LOW(LCH_B%)   ;gen on
        IF FLAG%.8=1 THEN {MASKRUNA}
        XTIME=TIME+LOADTIME%
        $(0)="* LOADING *":VFLINE%=0:VFLOC%=00H:GOSUB(VF_CLEAR)
{MASKRUNAB}
        IF TIME< XTIME THEN {MASKRUNAB}
        GOSUB {PROMPT}          ;*3A6
        FOR X%=1 TO 400: NEXT   ;*3A6
        GOSUB {PROMPT}          ;*3A6
        XTIME=TIME+SMPTIME%
{MASKRUNA}
        LCH_A%.15=0
        $(0)="* TESTING *"
        IF FLAG%.8=1 THEN VFLINE%=1:$(1)="PAUSE     REJ":GOTO{MASKRUNB}
        IF FLOWTYPE%=2 THEN $(1)="PASS      REJ": VFLINE%=1 :GOTO{MASKRUNB}
                ;used for flex- "pass" any time finishes test
        VFLINE%=0
{MASKRUNB}
        VFLOC%=00H: GOSUB {VF_CLEAR}
{MASKRUNC}
        IF FLOWTYPE%> 2 THEN TMPTIME=TIME+CYCLETIME%
{MASKRUN}
        PEN=0:
        IF FLAG%.8=0 THEN LOOP%=8 ELSE LOOP%=SCAN%
        FOR Z%=1 TO LOOP%
        GOSUB {LSC_READ}                        ;Read ADC
        DTMP1=((LSC_VAR-LSC_0)/(LSC_100-LSC_0))*100
        IF DTMP1 > PEN THEN PEN=DTMP1
        NEXT Z%
        IF LCH_D%.0=0 THEN PRINT"LSC",LSC_VAR,LSC_0,LSC_100,LSC_0_SET
        IF LSC_VAR > CONMAX THEN {ERRORCON}
        IF FLAG%.8=0 THEN IF SECUR% <3 THEN {MASKRUN0}  ;NO DSPL
        DTMP1=PEN:VFLOCTMP%=10H:INC%=0:GOSUB{VFWRITE1}
```

10187_80.070202

99-3a82

```
{MASKRUN0}
        IF FLAG%.8=1 THEN {MASKRUN0A}
        IF FLOWTYPE%=2 THEN {MASKRUN0A}
        GOTO {MASKRUN1}
{MASKRUN0A}
        IF PORT1#.5=0 THEN GOSUB{PROMPT}:FLAG%.7=1: GOTO{MASKRUN3} ;rejected
        IF PORT1#.7=0 THEN GOSUB{PROMPT}:GOTO{MASKRUN0A1}
        GOTO {MASKRUN1}
{MASKRUN0A1}            ;3A6
        IF FLAG%.8=1 THEN {PAUSE}
        GOTO {MASKRUN3A}         ;user accepeted pass"flowtype=2", pass test
{MASKRUN1}
        IF PEN< PEN_MAX THEN LCH_A%.15=0:GOTO {MASKRUN1A}
        FLAG%.7=1        ;failed
        IF LCH_A%.15=0 THEN GOSUB {PROMPT}
        LCH_A%.15=1
{MASKRUN1AA}
;3A6    IF FLOWTYPE%=2 THEN {MASKRUN1A}
        IF FLAG%.8=0 THEN DTMP1=PEN: GOTO{PAUSEDA}
{MASKRUN1A}
        IF FLAG%.8=1 THEN {MASKRUN}
        IF FLOWTYPE%=2 THEN {MASKRUN}    ;3a6 cont until finish "flex mode"
        IF SMPTIME%=1 THEN {MASKRUN3A}
        IF TIME >XTIME THEN {MASKRUN3A}          ;smptime
        IF FLOWTYPE%<3 THEN {MASKRUN}
        IF TIME < TMPTIME {MASKRUN}
        IF FLAG2%.8=0 THEN FLAG2%.8=1 ELSE FLAG2%.8=0
        IF FLAG2%.8=0 THEN DACTMP%=MASKDAC%:GOSUB{DACSET}:GOTO{MASKRUNC}
        IF FLOWTYPE%=3 THEN DACTMP%=DACMAX%:GOSUB{DACSET}:GOTO{MASKRUN1B}
        LCH_B%.15=1:XBY(0CC00H)=HIGH(LCH_B%)
        TMPTIME= TIME+ CYCLETIME1%-1
{MASKRUN1A1}
        IF TIME< TMPTIME+ CYCLETIME1% THEN {MASKRUN1A1}
        LCH_B%.15=0:XBY(0CC00H)=HIGH(LCH_B%)
```

10187380.070202

```
        FOR X%=1 TO 1200 :NEXT X%
        GOTO {MASKRUN}
{MASKRUN1B}
        TMPTIME= TIME+ CYCLETIME1%
        GOTO {MASKRUN}
{MASKRUN3}
        IF (PORT1#.AND.0F0H)<>0F0H THEN {MASKRUN3}
{MASKRUN3A}
;3A6    IF FLOWTYPE%=2 THEN {MASKRUN4A}
{MASKRUN4}
        LCH_B%.3=0: XBY(0C900H)=LOW(LCH_B%)      ;deflate seal
        FOR X%=1 TO 2000: NEXT X%
        LCH_B%=2001H: GOSUB{OUTPUT}
        IF FLAG%.7=1 THEN FLAG%.7=0: GOTO{ACCFAIL}
        MASKLEAK=PEN
        FLAGTST%.0=1
        GOTO {IPASSED}
{MASKRUN4A}
        IF FLAG%.7=0 THEN {MASKRUN4}
        GOTO {PAUSEDA}
{PAUSE}
        IF (PORT1#.AND.0F0H)<>0F0H THEN {PAUSE}
        GOTO{PAUSEDB}
{PAUSEDA0}
        XBY(0A000H)=16H          ;cursor box off
        FLAG%.6=1
        DACTMP%=MASKDAC%: GOSUB{DACSET}
{PAUSEDA}
        LCH_B%.4=0:LCH_B%.6=0:LCH_B%.2=0:XBY(0C900H)=LOW(LCH_B%)        ;gen oFF
        IF FLAG%.8=0 THEN MASKLEAK=PEN  ;for prnt save test not probe read
        IF FLAG%.6=1 THEN MASKLEAK=100  ;for print WC failure
        FLAGTST%.0=0
        GOSUB{IFAILED}
        FLAG%.6=0
```

10187580.070202

99-3a82

```
{PAUSEDB}
        LCH_B%.4=0:LCH_B%.6=0:LCH_B%.2=0:XBY(0C900H)=LOW(LCH_B%)          ;gen oFF
;3A6    LCH_B%.4=0:LCH_B%.6=0: XBY(0C900H)=LOW(LCH_B%)  ;gen oFF
        $(1)="DEF  PROB  REJ  SEAL"     ;993A4
{PAUSE1A}
        GOSUB {PROMPT}
        $(0)=" * PAUSED *"
        VFLINE%=1: VFLOC%=00H: GOSUB {VF_OUT}
{PAUSE1}
        GOSUB {GETKEY}
        IF KEYS%.0=1 THEN {IFIXED}
        IF KEYS%.2=1 THEN FLAG%.7=1: GOTO{MASKRUN4}
        IF KEYS%.1=1 THEN {PROB}
        IF FLAG2%.13=1 THEN {PAUSE1}     ;coraction was made
        IF LCH_B%.3=0 THEN {PAUSE1}      ;seal is deflated
        IF KEYS%.3=1 THEN {DUMPSEAL}
        GOTO {PAUSE1}
{IFIXED}
        GOSUB {CORACTION}
        DEFECT%=0
        GOTO {DUMPSEAL1}
{DUMPSEAL}
        LCH_B%.3=0: GOSUB{OUTPUT}
        $(1)="DEF        REJ"
        GOTO {DUMPSEAL2}
{DUMPSEAL1}
        $(1)="DEF  RES   REJ"
{DUMPSEAL2}
;;      VFLINE%=1: VFLOC%=00H: GOSUB {VF_OUT}
        GOTO {PAUSE1A}
{PROB}
        IF FLAG2%.13=1 THEN FLAG2%.13=0 :GOTO {RESUMEMASK}
        IF LCH_B%.3=0 THEN {PAUSE1}      ;seal is deflated
        FLAG%.8=1
```

```
        LCH_B%.6=1: GOSUB{OUTPUT}
        GOTO{MASKRUNAA}
;--------------------------
{FAILSEAL}
        $(0)="SEAL FAILED":$(1)=$(3)
        VFLINE%=1: VFLOC%=00H: GOSUB {VF_CLEAR}
        LCH_A%.7=1: XBY(0E000H)=LOW(LCH_A%)          ;SETS ALARM
{FAILSEAL1}
        GOSUB {GETKEY}
        IF KEYS%.3=1 THEN {FAILSEAL2};CONT
        GOTO {FAILSEAL1}
{FAILSEAL2}
        LCH_A%.7=0: XBY(0E000H)=LOW(LCH_A%)          ;CLEAR
        RETURN
;-----------------
;       inflate seal
;------------------
{INFLATSEAL}
        IF XTIME> TIME THEN {INFLATSEAL}
        LCH_B%.10=1: LCH_B%.3=1:GOSUB {OUTPUT}
        LCH_B%.4=1: XBY(0C900H)=LOW(LCH_B%)
        FOR X%=1 TO 250:NEXT X%                   ;might need delay here ?
        XTIME= TIME+7
{INFLATSEAL1}   ;loop til press
        LCH_D%=XBY(0CD00H)
        IF TIME >XTIME THEN {INFLATSEAL2}
        IF LCH_D%.7=1 THEN {INFLATSEAL1}
        FOR X%=1 TO 2000:NEXT X%
        LCH_B%.10=0: XBY(0CC00H)=HIGH(LCH_B%)    ;hold seal
        FOR X%=1 TO 100:NEXT X%                   ;might need delay here ?
        IF FLAG1%.14=1 THEN {INFLATSEAL1B}        ;3A6
        LCH_B%.5=0:XBY(0C900H)=LOW(LCH_B%)        ;cyl in
        XTIME=TIME+3
{INFLATSEAL1A}          ;3A6
```

10187_80.070202

10187_80.070202

99-3a82

```
        IF XTIME> TIME THEN {INFLATSEAL1A}
{INFLATSEAL1B}
        LCH_B%.4=0: LCH_B%.5=0:XBY(0C900H)=LOW(LCH_B%)  ;bleed pump
        FOR X%=1 TO 200:NEXT X%                 ;might need delay here ?
        RETURN
{INFLATSEAL2}
        LCH_B%.4=0: LCH_B%.5=0: XBY(0C900H)=LOW(LCH_B%)
        FOR X%=1 TO 100:NEXT X%
        LCH_B%.10=0: LCH_B%.3=0:GOSUB {OUTPUT}
        XBY(0A000H)=16H          ;cursor box off
        USETMP%=1
        GOTO {FAILSEAL}

;*****************************************
;       Fit function test
;*****************************************
{FITSTART}
        GOSUB {AEROSOL}
{FIT}
        IF CONFIG%.1=0 THEN {FIT00}
        IF FLAG%.9=1 THEN {FIT00}
        GOSUB{DATAINPUT}
{FIT00}
        LCH_B%=2001H: GOSUB{OUTPUT}
        $(0)="READY SUBJECT -": $(2)="CAL"
        IF FLAG%.3=1 THEN $(1)=$(8) ELSE $(1)="        CANCEL START"
        VFLINE%=2: VFLOC%=00H: GOSUB {VF_CLEAR}
        VFLOC%=10H: PRINT USING(#),CR,
        $(11)=STR$(ABS(FITNUM%)):GOSUB {VFWRITE}        ;# of test to screen
{FIT1}
        GOSUB {GETKEY}
        IF KEYS%.3=1 THEN {FIT2}        ;CONT
        IF KEYS%.0=1 THEN {FITSTART}    ;Cal aerosol
        IF FLAG%.3=1 THEN {FIT1};retest only
```

10187580.070202

99-3a82

```
        IF KEYS%.2=1 THEN {CANCELBEGIN} ;EXIT
        GOTO {FIT1}
{FIT2}
;;?add loading turn on gen set flow to 2lpm
        $(0)=$(12): VFLINE%=0: VFLOC%=00H: GOSUB {VF_CLEAR}
        DACTMP%=FITDAC%+70H
        GOSUB{DACSETLONG}
;993A8   GOSUB {ZEROSET}
        LSC_0 = LSC_0_SET        ;Us 0 set in cal
        LCH_B%.6=1: XBY(0C900H)=LOW(LCH_B%)      ;smpl on
        SETTMP=FITFLOW: TOLP=.5: TOLN=0: TTOL=.1
        LCH_B%.4=1: LCH_B%.2=1: XBY(0C900H)=LOW(LCH_B%) ;gen on
        XTIME=TIME+LOADTIME%
        $(0)="* LOADING *":VFLINE%=0:VFLOC%=00H:GOSUB{VF_CLEAR}
        VFLOCTMP%=13H:GOSUB{VFMOVE}:XBY(0A000H)=15H
{CHECKFIT}
        FLAG1%.10=0
        PUSH 08EH, 0AEH: L%=3: GOSUB {LTC_READ1}         ;pres hflow
        USETMP=(LTC_VAR-OFFSETH)*FACTORHH
        CHKTMP=(LTC_VAR1-OFFSETP)*FACTORP
        GOSUB{DACADJ}
        IF LCH_D%.0=0 THEN PRINT"FIT",USETMP,CHKTMP,DACTMP%
        IF FLAG1%.10=1 THEN DTMP1=8: GOTO{FIT9} ;smpl tube cloged
        IF CHKTMP> FITPRES THEN DTMP1=CHKTMP:GOTO{FIT9}
        IF FLAG1%.2=1 THEN {CHECKFIT}
        XBY(0A000H)=16H          ;cursor box off
        FITDAC%=DACTMP%
        IF LCH_D%.0=0 THEN PRINT"FIT SET",USETMP,CHKTMP,FITDAC%
{FIT5}
        IF TIME< XTIME THEN {FIT5}
        XTIME=TIME+SMPTIME%
        GOSUB {PROMPT}
        FOR X%=1 TO 400: NEXT
        GOSUB {PROMPT}
```

```
        $(0)="TEST=":$(1)=$(10):VFLINE%=1: VFLOC%=00H: GOSUB {VF_CLEAR}
        QFACTOR=0
{FIT6}
        FOR X%=1 TO FITNUM%
        GOSUB {PROMPT}
        VFLOC%=07H: PRINT USING(#),CR,
        $(11)=STR$(ABS(X%)):GOSUB {VFWRITE}
        XTIME=TIME+FITSEC%
{FIT6A}
;read and make fit factor for test average over fitsec%.
;Add routine to check press for clog during run;
        PEN=0: LOOP%=0
        DO      ;       FOR Z%=1 TO LOOP%
        GOSUB {LSC_READ}                        ;Read ADC
        IF LSC_VAR > CONMAX THEN {ERRORCON}
        PEN=PEN+LSC_VAR
        IF PORT1#.5=0 THEN GOSUB{PROMPT}:GOTO{FIT9};ABORT F3
        LOOP%=LOOP%+1
        UNTIL TIME> XTIME       ;       NEXT Z%
        PEN=PEN/LOOP%
IF PEN <= LSC_0 THEN FITFACT= 1000000: GOTO{FIT6AA}     ;MAX READING .0001%pen
        FITFACT=(LSC_100-LSC_0)/(PEN-LSC_0)
        IF FITFACT >1000000 THEN FITFACT=1000000        ;MAX READING .0001%pen
{FIT6AA}
        IF LCH_D%.0=0 then PRINT"FITFACT",FITFACT,PEN,LSC_0,LSC_100,loop%
        QFACTOR=QFACTOR+FITFACT
        IF SECUR% <3 THEN {FIT6B}       ;NO DSPL
        DTMP1=FITFACT: VFLOCTMP%=10H: INC%=0: GOSUB{VFWRITE1}
{FIT6B}
        NEXT
{FIT7}
;gen off set for clear
        LCH_B%=2001H :GOSUB{OUTPUT}
        GOSUB {PROMPT}
```

10187380.070202

10187.80.070202

99-3a82

```
        FOR X%=1 TO 400: NEXT
        GOSUB {PROMPT}
        FOR X%=1 TO 400: NEXT
        GOSUB {PROMPT}
;calculate total fit factor average of averages
        QFACTOR=QFACTOR/FITNUM%
        FLAG2%.9=1
        IF LCH_D%.0=0 THEN PRINT"QFACT",QFACTOR,FITNUM%
        DTMP1=QFACTOR
        IF QFACTOR> FIT_MAX THEN {FIT8}
        GOSUB {IFAILED}:FLAG2%.9=0
        GOTO {FAILPAUSE}
{FIT8}
        GOSUB {IPASSED}:FLAG2%.9=0
        GOTO {BEGINNEW}
{FIT9}
        XBY(0A000H)=16H         ;cursor box off
;test aborted reset
        GOSUB {ABORT}
        GOTO {FIT}
;***********************
;       PAUSE AFTER FAILED ??RETEST
;***********************
{FAILPAUSE}
        $(1)="DEF        REJ"
{FAILPAUSE0}
        GOSUB {PROMPT}
        $(0)=" * PAUSED *"
        VFLINE%=1: VFLOC%=00H: GOSUB {VF_CLEAR}
{FAILPAUSE1}
        GOSUB {GETKEY}
        IF KEYS%.0=1 THEN {FAILIFIX}
        IF KEYS%.2=1 THEN {ACCFAIL}
        IF FLAG2%.13=0 THEN {FAILPAUSE1}
```

10187380.070202

```
        IF KEYS%.1=1 THEN FLAG2%.13=0: GOTO {FAILIFIX0}
        GOTO {FAILPAUSE1}
{FAILIFIX}
        FLAG%.3=1               ;Set for retest
        GOSUB {CORACTION}
        DEFECT%=0
;3A7    $(1)="RES        REJ"
        $(1)="DEF  RES   REJ"
        GOTO {FAILPAUSE0}
{FAILIFIX0}
        ON TEST% GOTO {FAILIFIX},{RESUMEMASK},{TUBE},{EXV},{FAILIFIX1},{FIT}
{FAILIFIX1}
        ON TEST1% GOTO {FAILIFIX},{RESUMEMASK},{TUBE},{EXV},{FIT}
        GOTO {BEGINNEW}         ;Not needed ??

;************************
{IPASSED}
        GOSUB {PROMPT}
{IPASSED0}
        $(0)="* PASSED *":VFLINE%=0: VFLOC%=00H: GOSUB {VF_CLEAR}
        IF SECUR% >2 THEN VFLOCTMP%=10H:INC%=0:GOSUB{VFWRITE1}  ;display passed
        XTIME=TIME+2
{IPASSED1}
        IF XTIME> TIME THEN {IPASSED1}
        IF FLAG2%.0=1 THEN RETURN
        GOTO{BEGINNEW}
{IFAILED}
        $(0)="* FAILED *":$(1)=$(3):VFLINE%=1: VFLOC%=00H: GOSUB {VF_CLEAR}
        LCH_A%.7=1: XBY(0E000H)=LOW(LCH_A%)          ;SETS ALARM
        IF SECUR% <3 THEN {IFAILED1}
        VFLOCTMP%=10H:INC%=0:GOSUB{VFWRITE1}    ;display failure value
        IF FLAG%.7=1 THEN $(11)="%":VFLOC%=13H:GOSUB{VFWRITE}
        IF FLAG%.6=1 THEN $(11)="WC":VFLOC%=12H:GOSUB{VFWRITE}
        IF FLAG2%.3=1 THEN $(11)="ml":VFLOC%=12H:GOSUB{VFWRITE}
```

10187580.070202

```
        IF FLAG2%.4=1 THEN $(11)="WC":VFLOC%=12H:GOSUB{VFWRITE}
{IFAILED1}
        GOSUB {GETKEY}
        IF KEYS%.3=1 THEN {IFAILED2};CONT
        GOTO {IFAILED1}
{IFAILED2}
        LCH_A%.7=0: XBY(0E000H)=LOW(LCH_A%)          ;CLEARS
        RETURN
{ACCFAIL}
        $(0)="ACCEPT REJECT ?"
        $(1)="YES  NO       REPAIR":VFLINE%=1:VFLOC%=00H:GOSUB {VF_CLEAR}
        FLAG2%.13=0              ;Clear Coraction was set
{ACCFAIL1}
        GOSUB {GETKEY}
        IF KEYS%.1=1 THEN {ACCFAIL2}
        IF KEYS%.0=1 THEN DEFECT%=255: GOTO {ACCFAIL3}
        IF KEYS%.3=1 THEN DEFECT%=253: GOTO {ACCFAIL3}
        GOTO {ACCFAIL1}
{ACCFAIL2}  ;Return to test where i was
        GOSUB {PROMPT}
        GOTO {FAILPAUSE}
{ACCFAIL3}
        IF TEST%=4 THEN GOSUB{PRNT}
        IF TEST%=6 THEN GOSUB{PRNT}
        TEST1%=0
        GOTO {BEGINNEW}
{VISUALDEFECT}
        FLAGTST%.12=1   ;Set for visual defaect
{CORACTION}
        $(0)="DEF #:"
        $(1)=$(4): $(2)=$(5):VFLOC%=00H: VFLINE%=2: GOSUB {VF_OUT}
        DTMP1=0:VFLOC%=07H:INC%.5=1:GOSUB{VFWRITE2}
        MAX=250:MIN=1:VFLOC%=07H:NUMENTRY%=3:FLAG%.12=1
        GOSUB {KEYIN}
```

```
        IF FLAG%.14=0 THEN DEFECT%=INT(DTMP1) ELSE {CORACTION}
        GOSUB {PRNT}
        IF FLAGTST%.12=1 THEN DEFECT%=0: RETURN
        FLAG2%.13=1             ;Coraction made
        FLAGTST%.10=1           ;Next test is Repeat
        RETURN
;-----------
;       DATA INFO INPUT
;-------------
{DATAINPUT}
        FLAG%.9=1
{MASKINFO}
        $(0)="TYPE:": NUMENTRY%=8
        GOSUB{DSPLINFO}
{MASKINFOSIZ}
        $(0)="SIZE:": NUMENTRY%=2
        GOSUB{DSPLINFO}
{LOTINFO}
        $(0)="LOT :": NUMENTRY%=8
        GOSUB{DSPLINFO}
{SERINFO}
        $(0)="SER#:": NUMENTRY%=8
        GOSUB{DSPLINFO}
{IDINFO}
        $(0)="ID  :": NUMENTRY%=10
{DSPLINFO}
        $(1)=$(4): $(2)=$(5):VFLOC%=00H: VFLINE%=2: GOSUB {VF_CLEAR}
        VFLOC%=06H: FLAG%.12=0
        GOSUB {KEYIN}
        RETURN
;-----------
;       ZERO SET
;-----------
{ZEROSET}
```

10187380.070202

```
        IF TIME< XTIME THEN {ZEROSET}
        FLAG1%.7=0: GOSUB{LSC_WRITE}
        LSC_0=0
        CLOCK0
        FOR Z%=1 TO 16
        GOSUB {LSC_READ}
        LSC_0= LSC_0+LSC_VAR
        NEXT Z%
        CLOCK1
        LSC_0= LSC_0/ 16
IF LCH_D%.0=0 THEN PRINT "ZERO",LSC_0
        RETURN
;------------
;       CANCEL DURING TESTING
;------------
{ABORT}
;;?check aborts for test%
        FOR Z%=1 TO 50:NEXT Z%
        IF (PORT1#.AND.0F0H)<> 0F0H THEN {ABORT}
        IF TEST%=1 THEN {ABORT2}
        IF TEST%=2 THEN LCH_B%=48A1H: GOSUB{OUTPUT}
        IF TEST%=3 THEN LCH_B%=5001H: GOSUB{OUTPUT}
        IF TEST%=5 THEN LCH_B%=0001H: GOSUB{OUTPUT}
        GOTO{ABORT2}
{ABORT1}
        LCH_A%.7=1: XBY(0E000H)=LOW(LCH_A%)      ;Sets ALRM, Fault
        $(0)="CANCEL DURING TEST"
        GOTO {MUST_CAL_A}
{ABORT2}
        LCH_B%.10=0: LCH_B%.3=0: GOSUB{OUTPUT}
;       LCH_B%.10=1: XBY(0CC00H)=HIGH(LCH_B%)
        FOR X%=1 TO 1000: NEXT X%
        LCH_B%=2001H: GOSUB{OUTPUT}
        GOTO {ABORT1}
```

10187380.070202

99-3a82

```
;------------
;       MUST CALIBRATE DIDPLAY
;------------
{MUST_CAL}
        $(0)="MUST CALIBRATE"
{MEMERROR}
        LCH_A%.7=1: XBY(0E000H)=LOW(LCH_A%)                 ;Sets ALRM
{MUST_CAL_A}
        $(1)=$(3):VFLINE%=1: VFLOC%=00H: GOSUB {VF_OUT}
{MUST_CAL_0}
        GOSUB {GETKEY}
        IF KEYS%.3=1 THEN {MUST_CAL_1}
        GOTO {MUST_CAL_0}
{MUST_CAL_1}
        LCH_A%.7=0: XBY(0E000H)=LOW(LCH_A%)          ;Resets ALRM
        RETURN
;---------------------------------------
;       ADJUST SETTING
;---------------------------------------
{DACADJ}        ;for setting valve adjust
        IF USETMP < (SETTMP-TOLN) THEN GOTO{DACDOWN}
        IF USETMP > (SETTMP+TOLP) THEN GOTO{DACUP}
        FLAG1%.2=0
        RETURN
{DACDOWN}
        IF FLAG1%.4=0 THEN DACTMP%=DACTMP%-1 :GOTO{DACDOWN1}
        STEPTMP=(1/((USETMP)/SETTMP))
        IF STEPTMP < 1.3 THEN STEP%=1 ELSE STEP%=INT(STEPTMP)*8
        DACTMP%=DACTMP%-STEP%
{DACDOWN1}
        FLAG1%.2=1
        XBY(0CA00H)=HIGH(DACTMP%)
        XBY(0CB00H)=LOW(DACTMP%)
        IF USETMP >= (SETTMP-TTOL) THEN FOR X%=1 TO 1000: NEXT X%
```

10187380.070202

```
        RETURN
{DACUP}
        IF LCH_D%.0=0 THEN PH1."**UP**",DACTMP%
        DACTMP%=DACTMP%+1
        FLAG1%.2=1
{DACSET}
        XBY(0CA00H)=HIGH(DACTMP%)
        XBY(0CB00H)=LOW(DACTMP%)
        RETURN
{DACSETLONG}
        XBY(0CA00H)=HIGH(DACTMP%)
        XBY(0CB00H)=LOW(DACTMP%)
        XTIME=TIME+3
{DACSETLONG1}
        IF TIME< XTIME THEN {DACSETLONG1}
        RETURN
{DACSETOPEN}
        if lch_d%.0=0 then print"OPEN DAC"
        DACTMP%=DACMAX%
        GOTO {DACSET}
{OUTPUT}
        XBY(0CC00H)=HIGH(LCH_B%)
        XBY(0C900H)=LOW(LCH_B%)
        IF FLAG1%.8=1 THEN XTIME=TIME+4 ELSE XTIME=TIME+1
{OUTPUT1}
        IF XTIME> TIME THEN {OUTPUT1}
        FLAG1%.8=0
        RETURN
;-----------------
;       Dac Setting
;-----------------
{DAC0}
        FOR Z%=1 TO 350: NEXT Z%        ;Hold for small settle time
        IF FLAG2%.11=0 THEN FLAG2%.11=1 ELSE FLAG2%.11=0
```

10187380.070202

99-3a82

```
        IF FLAG2%.11=0 THEN RETURN
{DAC}
        GOSUB {LSCLOOP}
{DAC1}
        IF PEN <= 0 THEN {DAC5}
        IF PEN > CONMAX THEN {DAC5}
        IF FLAG2%.15=1 THEN {DAC1AA}
        IF PEN > 18119393 THEN {DACA}   ;5.4 volts
        GOTO {DAC1A}
{DAC1AA}
        IF PEN > 23823646 THEN {DACA}   ;7.1 Volts
{DAC1A}
        LSCDAC%=LSCDAC%+ INT(1+((27348993-PEN)/2348993))
        IF LSCDAC% >=0FFH THEN {ERRORE1}
        ;Est. move for DAC 2348993(.7volt) approx output for a 1H move HIside
        XTIME= TIME+ INT(1+((27348993-PEN)/2348993))
        GOTO {DAC4}
{DACA}
        IF PEN < 27682406 THEN {DAC0}   ;8.25 volts
        LSCDAC%= LSCDAC%- 1
{DAC3}
        XTIME= TIME+ 15
{DAC4}
        XBY(06000H)=LOW(LSCDAC%)
        VFLOCTMP%=13H:GOSUB(VFMOVE}:XBY(0A000H)=15H     ;cursor box on
{DAC4B}
        IF TIME < XTIME THEN {DAC4B}
        IF FLAG%.2=1 THEN XBY(0A000H)=16H: RETURN
;       IF LCH_A#.5=1 THEN RETURN
        XBY(0A000H)=16H ;cursor box off
        GOTO {DAC}
{DAC5}
        LSCDAC%= 038H                             ;MinDAC set 220V@tube
        IF FLAG2%.12=0 THEN FLAG2%.12=1 ELSE FLAG2%.12=0
```

```
        IF FLAG2%.12=0 THEN {ERRORE1}
        GOTO {DAC3}
{LSCLOOP}
        PEN=0
        FOR Z%=1 TO 5
        GOSUB {LSC_READ}                        ;Read ADC
        PEN=PEN+LSC_VAR
        IF FLAG%.13=1 THEN {LSCLOOP1}
;;      IF LSC_VAR < (.3*LOW_SET) THEN {ERRORE2}
{LSCLOOP1}
        NEXT Z%
        PEN=PEN/5
        RETURN
;----------------------------------------------------------------------
;       Function Key routine-
;----------------------------------------------------------------------
{GETKEY}
        Y%=1500
        KEYS%=0000H
{KEY1}
        IF PORT1#.7=0 THEN KEYS%=01H: GOTO {KEY3}       ;F1
        IF PORT1#.6=0 THEN KEYS%=02H: GOTO {KEY2}       ;F2
        IF PORT1#.5=0 THEN KEYS%=04H: GOTO {KEY2}       ;F3
        IF PORT1#.4=0 THEN KEYS%=08H: GOTO {KEY3}       ;F4
        IF FLAG2%.2=1 THEN {KEY_CALFLOW}
        IF FLAG%.2=1 THEN {KEY_LSC}
        GOTO {GETKEY}
{KEY2}
        IF FLAG2%.2=1 THEN {KEY6}
        IF INC% =0 THEN {KEY3}
{KEY3}
        LCH_A%.7=1: XBY(0E000H)=LOW(LCH_A%)          ;SETS ALARM
        FOR Z%=1 TO 300 :NEXT Z%
        LCH_A%.7=0: XBY(0E000H)=LOW(LCH_A%)          ;CLEARS
```

10187380.070202

10187380.070202

```
{KEY3A}
        FOR Z%=1 TO 50:NEXT Z%
        IF (PORT1#.AND.0F0H)= 0F0H THEN {KEY4}
        GOTO {KEY3A}
{KEY4}
        FLAG%.2=0:FLAG2%.2=0
        RETURN
{KEY_LSC}
        LSC_LOW=0
        CLOCK0
        FOR Z%=1 TO 5
        GOSUB {LSC_READ}                ;Read ADC
        LSC_LOW= LSC_LOW+ LSC_VAR
        NEXT Z%
        CLOCK1
        DTMP1=(((LSC_LOW/5)-LSC_0)/(CAL_100-LSC_0))*100
        $(11)="     ":VFLOC%=0FH:GOSUB{VFWRITE}
        VFLOC%=0FH:INC%.5=1:GOSUB{VFWRITE2}
        GOTO {KEY1}
{KEY6}
        IF KEYS%.1=1 THEN DACTMP%=DACTMP%-1H
        IF KEYS%.2=1 THEN DACTMP%=DACTMP%-25H
        GOSUB {DACSET}
{KEY_CALFLOW}
        FLAG1%.10=0
        USETMP1%=0:CHKTMP1%=0
        FOR Z%=1 TO 5
        PUSH USETMP%, CHKTMP%: L%=3: GOSUB {LTC_READ1}  ;pres hflow
        USETMP1%=USETMP1%+INT(LTC_VAR)
        CHKTMP1%=CHKTMP1%+INT(LTC_VAR1)
        NEXT Z%
        USETMP1%=USETMP1%/5: CHKTMP1%=CHKTMP1%/5
;PHO."LOOP",USETMP1%,CHKTMP1%,DACTMP%
        GOTO {KEY1}
```

99-3a82

```
;**********
;       beat
;************
{HOUR}
        HOURMETER=HOURMETER+.1
        IF TIME > 65000 THEN TIME=0
        ONTIME TIME+360,{HOUR}
        RETI

;--------------------------------------------------------------------
;                       Reads LTC1290
;
;               Read/ Write LTC1290 12 bit ADC
;       Data is output when at the input of a new word.
;       *NOTE* Output wor` is from previous input word.
;
;       This config. is for a 12 bit output word and input words (8 bits) are
;       Chan 0  -8EH-   hi flow
;       Chan 1  -CEH-   AGND
;       Chan 2  -9EH-   low flow
;       Chan 3  -DEH-   AGND
;       Chan 4  -AEH-   pres
;       Chan 5  -EEH-   AGND, Analog ground
;       Chan 6  -BEH-
;       Chan 7  -FEH-   AGND
;
;-----------------------------------------------------------------------------
{LTC_READ}
        L%=1                                    ;Set for 2 loops
{LTC_READ1}
        PORT1#.3=0                              ;SCLK set low
        LCH_B%.0=0: XBY(0C900H)=LOW(LCH_B%)          ;Enable CE for 1290, active low
$ASM
                CALL    IFIX            ;Gets config from FPS R1=low byte
```

10187380.070202

99-3a82

```
        MOV     A, R1           ;This is the config output word
        MOV     R3, #08H        ;loop hi byte
        NOP
LOOP:
        MOV     C, P1.1         ;read first data bit to carry
        RLC     A               ;rotate bit into acc
        MOV     P1.2, C         ;output bit to Din
        SETB    P1.3            ;sclk hi
        CLR     P1.3            ;sclk low
        DJNZ    R3, LOOP        ;next bit
        MOV     R2, A           ;Move MSB's to R2
        MOV     C, P1.1         ;read 3rd bit in
        CLR     A
        RLC     A               ;rotate bit into acc
        SETB    P1.3            ;sclk hi
        CLR     P1.3            ;sclk low
        MOV     C, P1.1         ;read 2nd bit
        RLC     A
        SETB    P1.3
        CLR     P1.3
        MOV     C, P1.1         ;raed 1st bit
        RLC     A
        SETB    P1.3
        CLR     P1.3
        MOV     C, P1.1         ;read 0(LSB) bit
        RRC     A               ;top nib
        RRC     A               ;top nib
        RRC     A               ;top nib
        RRC     A               ;top nib
        MOV     R0, A           ;Move LSB's to R0
        SETB    P1.3
        CLR     P1.3
        CALL    TWO_EY                  ;Integer to FP stack R2=hi R0=low
$BASIC
```

10187_80.070202

99-3a82

```
        LCH_B%.0=1: XBY(0C900H)=LOW(LCH_B%)          ;Disable CE for 1290, active low
        POP LTC_VAR
        IF L%=3 THEN L%=1: GOTO {LTC_READ1}     ;Dump first read
        LTC_VAR=LTC_VAR/16                      ;Remove low nibble
        IF LTC_VAR >= 4095 THEN {LTC_READ3}     ;Is 5 Volts
{LTC_READ2}
        IF L%=1 THEN L%=2: LTC_VAR1=LTC_VAR: PUSH 0EEH: GOTO {LTC_READ1};2nd loop with =GND
        RETURN
{LTC_READ3}                                     ;*1002C
        IF LCH_D%.0=0 THEN PRINT"LTC-VAR OUT",LTC_VAR,L%
        FLAG1%.10=1                     ;is ltc error
        GOTO {LTC_READ2}
;----------------------------------------------------------------------
;       LSC ADC routine
;----------------------------------------------------------------------
;               READ FROM  7712
;-------------------------------------
{LSC_READ}
        IF PORT3#.5=1 THEN {LSC_READ}                   ;Wait for conversion
        PORT1#.0=1                                      ;Set as input
        PORT1#.3=0                                      ;sclk low
        LCH_A%.1=0: LCH_A%.0=1: XBY(0E000H)=LOW(LCH_A%)      ;enable raed *RTS
$ASM
        MOV     R0, #03H
RLOOP:
        MOV     R2, #08H        ;set loop counter
RLOOP1:                         ;shift in hi byte
        MOV     C, P1.0         ;data bit into carry
        RLC     A               ;rotate into acc
        SETB    P1.3
        CLR     P1.3
        DJNZ    R2, RLOOP1
        PUSH    ACC             ;push to stack
        DJNZ    R0, RLOOP
```

```
        POP     ACC
        MOV     R0, A
        POP     ACC
        MOV     R2, A
        CALL    TWO_EY
        POP     ACC
        MOV     R0, A
        MOV     R2, #00H
        CALL    TWO_EY

$BASIC
        LCH_A%.1=1: XBY(0E000H)=LOW(LCH_A%)                     ;disable read *RTS
        POP HI, LOW
        IF FLAG1%.15=1 THEN {DUMBY}             ;Added for 7712 fix
        ADC_SET=(HI*65536)+LOW
        IF FLAG1%.7=1 THEN {LSC_READ1}
        IF ADC_SET>16580608 THEN FLAG1%.7=1: GOTO{LSC_READ2}    ;CH2 /4
        LSC_VAR=ADC_SET/ 16                             ;Scale for Gain= 16
        RETURN
{LSC_READ1}
        IF ADC_SET<125000 THEN FLAG1%.7=0: GOTO{LSC_READ2}      ;CH1 Gain= 16
        LSC_VAR=ADC_SET* 4                              ;Scale for /4 input
        RETURN
{LSC_READ2}
        GOSUB {LSC_WRITE}
        GOTO {LSC_READ}

;--------------------------------------
;               WRITE TO 7712
;--------------------------------------
{LSC_WRITE}
        PORT1#.0=0
        PORT1#.3=0                                      ;set sclk low
        IF FLAG1%.7=0 THEN PUSH 0030H,9516H ELSE PUSH 0022H,9516H
```

10187380.070202

99-3a82

```
        LCH_A%.0=0: LCH_A%.1=1: XBY(0E000H)=LOW(LCH_A%)      ;enable write *TFS
$ASM
        CALL     IFIX             ;pop hi and mid byte r3=hi r1=mid
        MOV      A, R1            :low byte
        PUSH     ACC
        MOV      A, R3            :mid byte
        PUSH     ACC
        CALL     IFIX
        MOV      A, R1            ;hi byte
        PUSH     ACC
        MOV      R1, #03H
WLOOP:
        MOV      R3, #08H
        POP      ACC
WLOOP1:                           ;shift out hi byte
        RLC      A
        MOV      P1.0, C
        SETB     P1.3
        CLR      P1.3
        DJNZ     R3, WLOOP1
        DJNZ     R1, WLOOP
        CLR      P1.0             ;clear sdata line
$BASIC
        LCH_A%.0=1: XBY(0E000H)=LOW(LCH_A%)            ;Disable write *TFS
        FLAG1%.15=1               ;Added for 7712 fix
        GOTO {LSC_READ}           ;Added for 7712 fix
{DUMBY}                           ;Added for 7712 fix
        FLAG1%.15=0               ;Added for 7712 fix
        RETURN

;--------------------------------
;       Print out
;--------------------------------
{PRNT}
```

10187380.070202

99-3a82

```
        PRINT"||PRN||"  ;start of DATA print
        STOP%=0
        IF FLAGTST%.10 -1 THEN $(11)="Y," ELSE $(11)="N,"
{PRNT0}
        GOSUB {TIMEGET}
;date
        PRINT USING(####),CR,
        $(1)=STR$(ABS(DATE%))
        IF LEN($(1)) =3 THEN $(1)="0"+$(1)
        $(2)=LEFT$($(1),2)+"/"+RIGHT$($(1),2)
        PRINT USING(##),CR,
        $(1)=STR$(ABS(YEAR%))
        IF LEN($(1)) =1 THEN $(1)="0"+$(1)
        $(2)=$(2)+"/"+$(1)+","

;time
        PRINT USING(####),CR,
        $(1)=STR$(ABS(DTIME%))
        IF LEN($(1)) =3 THEN $(1)="0"+$(1)
        $(13)=$(11)+$(2)+$(1)+","

;Defect code
        IF DEFECT% <> 0 THEN {PRNT1A}
        IF FLAGTST%.10= 1 THEN DEFECT%=254:  GOTO{PRNT1A}
        DEFECT%=180              ;Pass no failures
{PRNT1A}
        PRINT USING(###),CR,: $(11)=STR$(ABS(DEFECT%))+","
{PRNT1B}
        $(13)=$(13)+$(11)
{PRNT2}
        $(14)=""
        IF DEFECT%=999 THEN PRINT"",CR,:GOTO {PRNT4}    ;Terminate link
        IF FLAGTST%.12=1 THEN PRINT"",CR,:GOTO {PRNT4}
        IF FLAGTST%.13=1 THEN PRINT"",CR,:GOTO {PRNT4}
```

```
        IF TEST%=1 THEN STOP%=1: GOTO {PRNTMASK}
        IF TEST%=2 THEN PRINT"",CR,:GOTO {PRNT3B}
        IF TEST%=3 THEN PRINT"",CR,:GOTO {PRNTVAL}
        IF TEST%=5 THEN PRINT"",CR,:GOTO {PRNT3D}        ;****  FUTURE **********
{PRNT3}
        ON TEST1% GOTO {PRNTMASK},{PRNT3A},{PRNT3B},{PRNT3C},{PRNT3D}
{PRNT3A}        ;from mask test
        STOP%=1: GOTO {PRNTMASK}
{PRNT3B}        ;From drink
        IF FLAG2%.5=1 THEN STOP%=4: GOTO {PRNTMASK}       ;Train test
        IF FLAG2%.10=1 THEN STOP%=2: GOTO {PRNTMASK}      ;Flow test
        STOP%=3: GOTO {PRNTMASK}                          ;Seat test
{PRNT3C}        ;From valve
        GOTO {PRNTMASK}
{PRNT3D}        ;From fit

        PRINT"** FUTURE VALUE **"
        RETURN          ;****  FUTURE ***********8
{PRNTMASK}
        IF TEST%=2 THEN {PRNTDFLOW}
;Mask value
        IF MASKLEAK >=10 THEN PRINT USING (###.#),CR,: GOTO {PRNTMASKA}
        IF MASKLEAK >=.1 THEN PRINT USING (#.##),CR,: GOTO {PRNTMASKA}
        IF MASKLEAK >=.01 THEN PRINT USING (#.###),CR,:GOTO {PRNTMASKA}
        PRINT USING (#.####),CR,
{PRNTMASKA}
        $(11)=STR$(ABS(MASKLEAK))+","
        $(14)=$(11)

;Mask P/F
        IF FLAGTST%.0=1 THEN $(11)="P" ELSE $(11)="F"
        IF STOP%=1 THEN $(14)=$(14)+$(11): GOTO {PRNT4}
        $(14)=$(14)+$(11)+","
```

10187280.070202

```
{PRNTDFLOW}
;Drink flow P/F
        IF FLAGTST%.1=1 THEN $(11)="P" ELSE $(11)="F"
        IF TEST%=2 THEN $(14)=",,"       ;Move to flow colum
        IF STOP%=2 THEN $(14)=$(14)+$(11): GOTO {PRNT4}
        $(14)=$(14)+$(11)+","

{PRNTDSEAT}
;Drink seat P/F
        IF FLAGTST%.2=1 THEN $(11)="P" ELSE $(11)="F"
        IF STOP%=3 THEN $(14)=$(14)+$(11): GOTO {PRNT4}
        $(14)=$(14)+$(11)+","

{PRNTDTRAIN}
;Drink train P/F
        IF FLAGTST%.11=0 THEN $(11)="-": GOTO {PRNTDTRAIN1}
        IF FLAGTST%.3=1 THEN $(11)="P" ELSE $(11)="F"
{PRNTDTRAIN1}
        IF STOP%=4 THEN $(14)=$(14)+$(11): GOTO {PRNT4}
        $(14)=$(14)+$(11)+","

{PRNTVAL}
;Valve P/F
        IF FLAGTST%.4=1 THEN $(11)="P" ELSE $(11)="F"
        IF TEST%=3 THEN $(14)=",,,,,"    ;Move to flow colum
        $(14)=$(14)+$(11)
{PRNT4}
        IF FLAGTST%.12=1 THEN $(11)="VIS,":GOTO {PRNT5}
        IF FLAGTST%.13=1 THEN $(11)="ESC,":GOTO {PRNT5}
        IF TEST%=1 THEN $(11)="MASK,":GOTO {PRNT5}
        IF TEST%=2 THEN $(11)="DRINK,":GOTO {PRNT5}
        IF TEST%=3 THEN $(11)="VALVE,":GOTO {PRNT5}
        IF TEST%=4 THEN $(11)="M ALL,":GOTO {PRNT5}
        IF TEST%=5 THEN $(11)="FIT,":GOTO {PRNT5}
```

10187_80.070202

```
        IF TEST%=6 THEN $(11)="ALL,":GOTO {PRNT5}
{PRNT5}
        PRINT $(11),$(13),$(14)
        PRINT"||END||"  ;end of DATA print
        RETURN
;----------------------------------------------------------------------
;       Prompt and Warning routines-
;----------------------------------------------------------------------
{CLICK}
        Y%=150
        GOTO {BELL}
{PROMPT}
        Y%=400
        GOTO {BELL}
{WARNING}
        Y%=1200
        GOTO {BELL}
{KEYCLICK}
        Y%=1
{BELL}
        LCH_A%.7=1: XBY(0E000H)=LOW(LCH_A%)          ;SETS ALARM
        FOR Z%=1 TO Y%: NEXT Z%
        LCH_A%.7=0: XBY(0E000H)=LOW(LCH_A%)          ;CLEARS
        RETURN
;----------------------------------------------------------------------
;       Setup routine-
;----------------------------------------------------------------------
{SETUP}
        $(0)="OPTIONS  99M" :$(1)=$(3)
        IF SECUR% <3 THEN $(2)=$(9):GOTO {SETUP0}
        $(2)="DEFAULT   EXIT"
{SETUP0}
        VFLINE%=2: VFLOC%=00H: GOSUB {VF_OUT}
{SETUP_1}
```

10187380.070202

```
        GOSUB {GETKEY}
        IF KEYS%.0=1 THEN {SETUP_1A}
        IF KEYS%.2=1 THEN RETURN
        IF KEYS%.3=1 THEN GOTO {SDTIME}          ;Next screen
        GOTO {SETUP_1}
{SETUP_1A}
        IF SECUR% <3 THEN {SETUP_1}        ;Return not cant be here
        RES_ACT=0                          ;Clear for 101A readings
        $(0)="LOAD DEFAULTS ?"
        $(1)=$(7)
        VFLINE%=1: VFLOC%=00H: GOSUB {VF_OUT}
{SETUP_1AA}
        GOSUB {GETKEY}
        IF KEYS%.0=1 THEN {SETUP_1AB}
        IF KEYS%.1=1 THEN {SETUP}
        GOTO {SETUP_1AA}
{SETUP_1AB}
        GOSUB {DEFAULT}: GOTO{SETUP}
{SETUPA}
        $(1)=$(9)
        VFLINE%=1: VFLOC%=00H: GOSUB {VF_OUT}
{SETUPB}
        GOSUB {GETKEY}
        IF KEYS%.2=1 THEN RETURN
        GOTO {SETUPB}
{SDTIME}
        $(0)=" ":$(1)="SET             ACPT"
        VFLINE%=1: VFLOC%=00H: GOSUB {VF_CLEAR}
        GOSUB {TIMEGET}
        FLAG2%.14=0:GOSUB{TIMEDSPL}
{CONDATE1}
        GOSUB {GETKEY}
        IF KEYS%.3=1 THEN {LOGDATA}
        IF KEYS%.0=1 THEN {CONDATE2}
```

```
        GOTO {CONDATE1}
{CONDATE2}
        $(0)="  /  /     :"
        GOSUB {CONFIGSCRNA}
        XBY(07F8H)=80H  ;write dtim
        MIN=1:MAX=12:VFLOC%=00H:GOSUB{CONDATA2A}
        XBY(07FEH)=USETMP1%      ;month
        XBY(0A000H)=2FH          ; "/"
        MIN=1:MAX=31:VFLOC%=03H:GOSUB{CONDATA2A}
        XBY(07FDH)=USETMP1%      ;day
        XBY(0A000H)=2FH
        MIN=1:MAX=99:VFLOC%=06H:GOSUB{CONDATA2A}
        XBY(07FFH)=USETMP1%      ;year
        MIN=1:MAX=24:VFLOC%=09H:GOSUB{CONDATA2A}
        XBY(07FBH)=USETMP1%      ;hour
        XBY(0A000H)=3AH          ; ";"
        MIN=0:MAX=59:VFLOC%=0CH:GOSUB{CONDATA2A}
        XBY(07FAH)=USETMP1%      ;min
        XBY(07F8H)=00H
        GOTO {SDTIME}
{CONDATA2A}
        NUMENTRY%=2:FLAG%.12=1:FLAG%.13=0
        GOSUB {KEYIN}
        USETMP1%=INT(DTMP1)
        USETMP1%=(INT(USETMP1%/10)*16)+(USETMP1%-((INT(USETMP1%/10))*10))
        RETURN

{LOGDATA}
        $(0)="Data Log ="
        $(2)=$(7): $(1)=$(4)
        VFLINE%=2: VFLOC%=00H: GOSUB {VF_CLEAR}
{SPENA}
        IF CONFIG%.1=1 THEN $(11)="YES" ELSE $(11)="NO "
        VFLOC%=10H: GOSUB {VFWRITE}
```

10187_80.070202

99-3a82

```
{SPENB}
        GOSUB {GETKEY}
        IF KEYS%.0=1 THEN CONFIG%.1=1: GOTO {SPENA}
        IF KEYS%.1=1 THEN CONFIG%.1=0: GOTO {SPENA}
        IF KEYS%.3=1 THEN {SPENC}
        GOTO {SPENB}
{SPENC}
        $(0)="PC Xfer"
        $(2)=$(7): $(1)=$(4)
        VFLINE%=2: VFLOC%=00H: GOSUB {VF_CLEAR}
        CONFIG%.3=0
{CONXFER}
        IF CONFIG%.3=1 THEN $(11)="YES" ELSE $(11)="NO "
        VFLOC%=10H: GOSUB {VFWRITE}
{CONXFER1}
        GOSUB {GETKEY}
        IF KEYS%.0=1 THEN CONFIG%.3=1: GOTO {CONXFER}
        IF KEYS%.1=1 THEN CONFIG%.3=0: GOTO {CONXFER}
        IF KEYS%.3=1 THEN {CONXFER2}
        GOTO {CONXFER1}
{CONXFER2}
        IF CONFIG%.3=0 THEN {REFRESH}
        $(0)="Ready Data XFer"
        $(2)=$(9):$(1)=$(3)
        VFLINE%=2: VFLOC%=00H: GOSUB {VF_OUT}
{CONXFER3}
        GOSUB {GETKEY}
        IF KEYS%.2=1 THEN {REFRESH}
        IF KEYS%.3=1 THEN {CONXFER4}
        GOTO {CONXFER3}
{CONXFER4}
        $(0)="Data Will Be Cleared"
        $(2)=$(9):$(1)=$(3)
        VFLINE%=2: VFLOC%=00H: GOSUB {VF_OUT}
```

10187_80.070202

```
{CONXFER5}
        GOSUB {GETKEY}
        IF KEYS%.2=1 THEN {CONMASK}
        IF KEYS%.3=1 THEN {CONXFER6}
        GOTO {CONXFER3}
{CONXFER6}
        $(0)=" * Data XFering *"
        VFLINE%=0: VFLOC%=00H: GOSUB {VF_CLEAR}
        FOR X%=1 TO 10000; NEXT X%

{REFRESH}
        $(0)="Screen Refresh = "
        GOSUB {CONFIGSCRN}
        DTMP1=SCAN%:VFLOC%=11H:INC%.5=1:GOSUB{VFWRITE2}
        IF SECUR% <3 THEN GOSUB {CONFIGSCRN2}: GOTO {CONMASK}
        MAX=20:MIN=1:VFLOC%=12H:NUMENTRY%=2:FLAG%.12=1:FLAG%.13=0
        GOSUB {KEYIN}
        IF FLAG%.14=0 THEN SCAN%=INT(DTMP1) ELSE FLAG%.14=0

{CONMASK}
        $(0)="Mask %Leak >"
        GOSUB {CONFIGSCRN}
        DTMP1=PEN_MAX:VFLOCTMP%=12H:INC%=0:GOSUB{VFWRITE1}
        IF SECUR% <3 THEN GOSUB {CONFIGSCRN2}: GOTO {CONLOAD}
        MAX=99.9:MIN=.0001:VFLOC%=0EH:NUMENTRY%=5:FLAG%.12=1:FLAG%.13=1
        GOSUB {KEYIN}
        IF FLAG%.14=0 THEN PEN_MAX=DTMP1 ELSE FLAG%.14=0

{CONLOAD}
        $(0)="Load Time ="
        GOSUB {CONFIGSCRN}
        DTMP1=LOADTIME%:VFLOC%=0FH:INC%.5=1:GOSUB{VFWRITE2}
        IF SECUR% <3 THEN GOSUB {CONFIGSCRN2}: GOTO {CONFLOW}
        MAX=120:MIN=1:VFLOC%=0FH:NUMENTRY%=3:FLAG%.12=1:FLAG%.13=0
```

10187.80.070202

99-3a82

```
        GOSUB {KEYIN}
        IF FLAG%.14=0 THEN LOADTIME%=INT(DTMP1) ELSE FLAG%.14=0

{CONFLOW}
        $(0)="Mask Test Type ="
        GOSUB {CONFIGSCRN}
        DTMP1=FLOWTYPE%:VFLOC%=11H:INC%.5=1:GOSUB{VFWRITE2}
        IF SECUR% <3 THEN GOSUB {CONFIGSCRN2}: GOTO {CONSMP}
        MAX=4:MIN=1:VFLOC%=12H:NUMENTRY%=1:FLAG%.12=1
        GOSUB {KEYIN}
        IF FLAG%.14=0 THEN FLOWTYPE%=INT(DTMP1) ELSE FLAG%.14=0

        IF FLOWTYPE% =2 THEN {CONFIT}    ;in flex continuous cycle
{CONSMP}
        $(0)="Sample Time ="
        GOSUB {CONFIGSCRN}
        DTMP1=SMPTIME%:VFLOC%=0FH:INC%.5=1:GOSUB{VFWRITE2}
        IF SECUR% <3 THEN GOSUB {CONFIGSCRN2}: GOTO {CONSMP1}
        MAX=360:MIN=1:VFLOC%=0FH:NUMENTRY%=3:FLAG%.12=1:FLAG%.13=0
        GOSUB {KEYIN}
        IF FLAG%.14=0 THEN SMPTIME%=INT(DTMP1) ELSE FLAG%.14=0
{CONSMP1}
        IF FLOWTYPE% <=2 THEN {CONFIT}
{CONSMP2}
        $(0)="Mask Cycle:     ,"          ;smpl on, off
        GOSUB {CONFIGSCRN}
        DTMP1=CYCLETIME%:VFLOC%=0CH:INC%.5=1:GOSUB{VFWRITE2}
        IF SECUR% <3 THEN {CONSMP3}
        MAX=60:MIN=1:NUMENTRY%=2:FLAG%.12=1
        GOSUB {KEYIN}
        IF FLAG%.14=0 THEN CYCLETIME%=INT(DTMP1) ELSE FLAG%.14=0
{CONSMP3}
        DTMP1=CYCLETIME1%:VFLOC%=11H:INC%.5=1:GOSUB{VFWRITE2}
        IF SECUR% <3 THEN GOSUB {CONFIGSCRN2}: GOTO {CONFIT}
```

10187_80.070202

99-3a82

```
        MAX=60:MIN=1:NUMENTRY%=2:FLAG%.12=1
        GOSUB {KEYIN}
        IF FLAG%.14=0 THEN CYCLETIME1%=INT(DTMP1) ELSE FLAG%.14=0

{CONFIT}
        $(0)="Fit Test:    ,"     ;#,sec,avg
        GOSUB {CONFIGSCRN}
        DTMP1=FITNUM%:VFLOC%=0AH:INC%.5=1:GOSUB{VFWRITE2}
        IF SECUR% <3 THEN {CONFIT1}
        MAX=9:MIN=1:NUMENTRY%=1:FLAG%.12=1
        GOSUB {KEYIN}
        IF FLAG%.14=0 THEN FITNUM%=INT(DTMP1) ELSE FLAG%.14=0
{CONFIT1}
        DTMP1=FITSEC%:VFLOC%=0DH:INC%.5=1:GOSUB{VFWRITE2}
        IF SECUR% <3 THEN GOSUB {CONFIGSCRN2}: GOTO {CONFACT}
        MAX=300:MIN=1:NUMENTRY%=3:FLAG%.12=1
        GOSUB {KEYIN}
        IF FLAG%.14=0 THEN FITSEC%=INT(DTMP1) ELSE FLAG%.14=0
{CONFACT}
        $(0)="Fit Factor <"
        GOSUB {CONFIGSCRN}
        DTMP1=FIT_MAX:VFLOC%=0DH:INC%=0:GOSUB{VFWRITE2}
        IF SECUR% <3 THEN GOSUB {CONFIGSCRN2}: GOTO {SETUP}
        MAX=99999:MIN=100:NUMENTRY%=5:FLAG%.12=1
        GOSUB {KEYIN}
        IF FLAG%.14=0 THEN FIT_MAX=DTMP1 ELSE FLAG%.14=0

        GOTO {SETUP}
;-----------
{CONFIGSCRN}
        IF SECUR% <3 THEN $(1)=$(3):VFLINE%=1: GOTO {CONFIGSCRN1}
{CONFIGSCRNA}
        $(1)=$(4): $(2)=$(5):VFLINE%=2
{CONFIGSCRN1}
```

10187380.070202

```
        VFLOC%=00H: GOSUB {VF_OUT}
        RETURN
{CONFIGSCRN2}
        GOSUB {GETKEY}
        IF KEYS%.3=1 THEN RETURN
        GOTO {CONFIGSCRN2}

;********
; KEY BOARD ENTRY
;*********
{KEYIN}
        VFLOCTMP%=VFLOC%: KEYNUMMULTI%=0
        GOSUB {VFMOVE}
        XBY(0A000H)=17H
        $(13)=""
        FOR D%=NUMENTRY% TO 1 STEP -1
{KEYBRD}
        KBRD%=0FFH
        KBRD1%=0FFH
{KEYBRD1}
        KBRD%=XBY(08000H)
        IF PORT1#.4=0 THEN {KEYOUT0A}
        IF PORT1#.5=0 THEN {KEYOUT1}
        IF KBRD%=0FFH THEN {KEYBRD1}
        GOSUB{KEYCLICK}
        KBRD1%=KBRD%
        FOR X%=1 TO 8
        KBRD%=XBY(08000H)
        NEXT X%
        IF KBRD%<>KBRD1% THEN {KEYBRD}
{KEYBRD2}
        FOR X%=1 TO 8
        KBRD%=XBY(08000H)
        NEXT X%
```

```
        IF KBRD%<>0FFH THEN {KEYBRD2}
; ckeck for valid key
        IF KBRD1%=7CH THEN {KEYBRD}      ;ignör | key BLANK KEY
        IF FLAG%.12=0 THEN {KEYBRD3}     ;all keys vaid ALPHA input
        IF KBRD1%> 39H THEN {KEYBRD}     ;only taking numbers
        IF FLAG%.13=0 THEN IF KBRD1%=2EH THEN {KEYBRD} ELSE {KEYBRD3}
        IF KBRD1%<>2EH THEN {KEYBRD3}
        IF KEYNUMMULTI%> 0 THEN {KEYBRD}
        KEYNUMMULTI%=D%
        XBY(0A000H)=LOW(KBRD1%)
        IF D%=NUMENTRY% THEN {KEYCLEAR1}
        GOTO {KEYOUT0}
{KEYBRD3}
        XBY(0A000H)=LOW(KBRD1%)
        IF D%=NUMENTRY% THEN {KEYCLEAR1}
        GOTO {KEYOUT}
{KEYCLEAR1}
        FOR X%=NUMENTRY% TO 1 STEP -1
        XBY(0A000H)=20H                  ;Move VF curser
        NEXT X%
        VFLOCTMP%=VFLOC%+1
        GOSUB{VFMOVE}
        IF KBRD1%=2EH THEN {KEYOUT0}
        GOTO {KEYOUT}
{KEYCLEAR}
        VFLOCTMP%=VFLOC%
        GOSUB{VFMOVE}
        FOR X%=NUMENTRY%+1 TO 1 STEP -1
        XBY(0A000H)=20H                  ;Move VF curser
        NEXT X%
        GOTO {KEYIN}
{KEYOUT}
        $(13)=$(13)+CHR$(LOW(KBRD1%))
{KEYOUT0}
```

1018,380.070202

10187_80.070202

99-3a82

```
        NEXT D%
{KEYOUT0A}
        IF KEYNUMMULTI%>0 THEN KEYNUMMULTI1%=D%
        XBY(0A000H)=16H
{KEYOUT1}
        GOSUB {GETKEY}
        IF KEYS%.3=1 THEN {KEYOUT2}
        IF KEYS%.2=1 THEN {KEYCLEAR}
        GOTO {KEYOUT1}                  ;3a6 was keyout
{KEYOUT2}
        IF D%=NUMENTRY% THEN FLAG%.14=1:RETURN
        FLAG%.14=0                             ;????
        IF FLAG%.12=0 THEN RETURN              ;INPUT STRING $(13)
        IF KEYNUMMULTI%=0 THEN DTMP1=VAL($(13)): GOTO{KEYOUT3}
        KEYNUMMULTI%=(KEYNUMMULTI%-KEYNUMMULTI1%)-1
        IF KEYNUMMULTI%=1 THEN DTMP1=(VAL($(13)))/10: GOTO{KEYOUT3}
        IF KEYNUMMULTI%=2 THEN DTMP1=(VAL($(13)))/100: GOTO{KEYOUT3}
        IF KEYNUMMULTI%=3 THEN DTMP1=(VAL($(13)))/1000: GOTO{KEYOUT3}
        DTMP1=(VAL($(13)))/10000
{KEYOUT3}
        IF DTMP1< MIN THEN {KEYCLEAR}
        IF DTMP1> MAX THEN {KEYCLEAR}
        FLAG%.12=0: FLAG%.13=0
        RETURN
;------------------
;       Write VF display
;------------------
{VF_CLEAR}
        XBY(0A000H)=0EH                 ;CLEAR VF DISPLAY
        FOR K%=1 TO 200: NEXT K%
{VF_OUT}
        CLOCK0
        XBY(0A000H)=1BH                 ;Move VF curser
        FOR K%=1 TO 60: NEXT K%
```

10187_80 .070202

```
        XBY(0A000H)=48H                 ;Move VF curser
        FOR K%=1 TO 60: NEXT K%
        XBY(0A000H)=LOW(VFLOC%)         ;curser loc.
        FOR I%=0 TO VFLINE%
        IF I%= 2 THEN VFLOC%= VFLOC%+ 14H: $(11)=$(2): GOTO {VFWRITE}
        FOR J%=1 TO LEN($(I%))
        XBY(0A000H)=ASC($(I%),J%)
        NEXT J%
{VF_OUTA}
        IF J% >20 THEN {VF_OUTB}        ;clear remainder of the line
        J%= J%+1: XBY(0A000H)=20H
        GOTO {VF_OUTA}
{VF_OUTB}
        NEXT I%
        CLOCK1
        LASTSTRING%=0   ;New line new no value
        RETURN
{VFWRITE0}
        IF INC%.4=1 THEN {VFWRITE0A}
        IF INC%.2=1 THEN {VFWRITE1}
        IF DTMP1 >=1000 THEN VFLOC%=VFLOCTMP%-4H: GOTO {VFWRITE2}
        IF DTMP1 >=100 THEN VFLOC%=VFLOCTMP%-3H: GOTO {VFWRITE2}
        IF DTMP1 >=10 THEN VFLOC%=VFLOCTMP%-2H: GOTO {VFWRITE2}
        VFLOC%=VFLOCTMP%-1H
        GOTO {VFWRITE2}
{VFWRITE0A}
        IF ((DTMP1*10)-INT(DMP1*10)) >=.5 THEN DTMP1=DTMP1+.1
        PRINT USING(##.#),CR,
        IF DTMP1 >=10 THEN VFLOC%=VFLOCTMP%-2H: GOTO {VFWRITE2}
        VFLOC%=VFLOCTMP%-1H
        GOTO {VFWRITE2}
{VFWRITE1}
        VFLOC%=VFLOCTMP%-3H
IF DTMP1 >=1000000 THEN PRINT USING (#######),CR,:VFLOC%=VFLOC%-3H:GOTO{VFWRITE2}
```

10187380.070202

99-3a82

```
IF DTMP1 >=100000 THEN PRINT USING (######),CR,:VFLOC%=VFLOC%-2H:GOTO{VFWRITE2}
IF DTMP1 >=10000 THEN PRINT USING (#####),CR,:VFLOC%=VFLOC%-1H:GOTO{VFWRITE2}
        IF DTMP1 >=1000 THEN PRINT USING (####),CR,:GOTO{VFWRITE2}
IF DTMP1 >=100 THEN PRINT USING (###.#),CR,:VFLOC%=VFLOC%-1H:GOTO{VFWRITE2}
        IF DTMP1 >=10 THEN PRINT USING (##.#),CR,: GOTO {VFWRITE2}
        IF DTMP1 >=.1 THEN PRINT USING (#.##),CR,: GOTO {VFWRITE2}
IF DTMP1 >=.01 THEN PRINT USING (#.###),CR,:VFLOC%=VFLOC%-1H:GOTO{VFWRITE2}
        PRINT USING (#.####),CR,:VFLOC%=VFLOC%-2H
{VFWRITE2}
        IF INC%.5=1 THEN PRINT USING(#####),CR,
        $(13)=""
        $(11)=STR$(ABS(DTMP1))
        IF LASTSTRING%<= LEN($(11)) THEN {VFWRITE3}
        VFLOC%=VFLOC%-(LASTSTRING%-(LEN($(11))))
        FOR K%=1 TO (LASTSTRING%-(LEN($(11))))
        $(13)=$(13)+" "
        NEXT K%
{VFWRITE3}
        LASTSTRING%=LEN($(11))
        $(11)=$(13)+$(11)
{VFWRITE}
        CLOCK0
        FOR K%=1 TO 60: NEXT K%
        XBY(0A000H)=1BH                 ;Move VF curser
        FOR K%=1 TO 60: NEXT K%
        XBY(0A000H)=48H                 ;Move VF curser
        FOR K%=1 TO 60: NEXT K%
        XBY(0A000H)=LOW(VFLOC%)         ;curser loc.
        FOR J%=1 TO LEN($(11))
        XBY(0A000H)=ASC($(11),J%)
        NEXT J%
        CLOCK1
        INC%=00H
        RETURN
```

10187480.070202

```
{VFMOVE}
        FOR K%=1 TO 60: NEXT K%
        XBY(0A000H)=1BH                 ;Move VF curser
        FOR K%=1 TO 60: NEXT K%
        XBY(0A000H)=48H                 ;Move RF curser
        FOR K%=1 TO 60: NEXT K%
        XBY(0A000H)=LOW(VFLOCTMP%)              ;curser loc.
        FOR K%=1 TO 60: NEXT K%
        RETURN
;********
{TIMEDSPL}
        IF FLAG2%.14=1 THEN VFLOC%=14H ELSE VFLOC%=00H
        $(11)="  /  /     :"
        GOSUB {VFWRITE}
{TIMEDSPL1}
        PRINT USING(####),CR,
        $(1)=STR$(ABS(DATE%))
        IF LEN($(1)) =3 THEN $(1)="0"+$(1)
        $(2)=$(1)
{TIMEDSPL2}
        PRINT USING(##),CR,
        $(1)=STR$(ABS(YEAR%))
        IF LEN($(1)) =1 THEN $(1)="0"+$(1)
        $(2)=$(2)+$(1)
{TIMEDSPL3}
        PRINT USING(####),CR,
        $(1)=STR$(ABS(DTIME%))
        IF LEN($(1)) =3 THEN $(1)="0"+$(1)
        $(2)=$(2)+$(1)
{TIMEDSPL4}
        FOR Z%=0 TO 4
        $(11)=MID$($(2),((Z%*2)+1),2)
        IF FLAG2%.14=1 THEN VFLOC%=(Z%*3)+14H ELSE VFLOC%=Z%*3
        GOSUB {VFWRITE}
```

```
        NEXT Z%
        RETURN
{TIMEGET}
        USETMP1%=0
        XBY(07F8H)=40H
        CHKTMP1%=XBY(07FEH)      ;month
        GOSUB {TIMEGET1}
        CHKTMP1%=XBY(07FDH)      ;day
        GOSUB {TIMEGET1}
        DATE%=USETMP1%: USETMP1%=0
        CHKTMP1%=XBY(07FFH)      ;year
        GOSUB {TIMEGET1}
        YEAR%=USETMP1%: USETMP1%=0
        CHKTMP1%=XBY(07FBH)      ;hour
        GOSUB {TIMEGET1}
        CHKTMP1%=XBY(07FAH)      ;min
        GOSUB {TIMEGET1}
        DTIME%=USETMP1%: USETMP1%=0
        XBY(07F8H)=00H
        RETURN
{TIMEGET1}
USETMP1%=(USETMP1%*100)+((((0F0H.AND.CHKTMP1%)/16)*10)+(0FH.AND.CHKTMP1%))
        RETURN
;--------------------------------
;       DEFAULTS
;--------------------------------
{DEFAULT0A}
        HOURMETER=0
        CAL_DAC%=00H
        FLAG%.15=1
        $(0)="MEMORY ERROR"
        GOSUB {MEMERROR}
{DEFAULT}
        $(0)="**ALL VALUES RESET**"
```

10187380.070202

```
                                                99-3a82
        IF FLAG%.15=1 THEN VFLINE%=1 ELSE VFLINE%=2
        $(1)=$(3): $(2)="REBOOT   EXIT"
        VFLOC%=00H: GOSUB {VF_OUT}
{DEFAULTA}
        GOSUB {GETKEY}
        IF KEYS%.0=1 THEN {RESTART}
        IF KEYS%.3=1 THEN {DEFAULTC}
        IF FLAG%.15=1 THEN {DEFAULTA}
        IF KEYS%.2=1 THEN RETURN
        GOTO {DEFAULTA}
{DEFAULTC}
;       CONFIG%=4867H   ;****************CHECK
        LSCDAC%=060H    ;062H
        PEN_MAX=.003
        FLOWTYPE%=1
        FITNUM%=5
        SCAN%=7
        CYCLETIME%=5:CYCLETIME1%=5
        FITSEC%=60
        FIT_MAX=3000
        LOADTIME%=60:SMPTIME%=1
        DEFTEST=1234567890
        IF FLAG%.15=0 THEN RETURN
{DEFAULTCAL}
        MASKFLOW=16
        MASKPRES=6
        CALTEST=0               ;No flow calibration
        CALTEMP%=250    ;25degC  see factory charts for following
        CALFLOW16%=3439:CALFLOW2%=1146:CALPRES1%=3276:CALFLOW15M%=1986
        CALFLOWR5M%=860:CALNULH%=819:CALNULL%=819:CALNULP%=819
CMASKDAC%=INT(DACMAX%/1.5):FITDAC%=DACMAX%:CVALDAC%=INT(DACMAX%/1.5)
CLDNKDAC%=INT(DACMAX%/1.5):CHDNKDAC%=INT(DACMAX%/1.5)
if lch_d%.0=0 then print"setd",CALFLOWR5M%,CALNULH%,CALNULL%,CALNULP%
if lch_d%.0=0 then print"sete",CALFLOW16%,CALFLOW2%,CALPRES1%,CALFLOW15M%,caltemp%
```

10187380.070202

99-3a82

```
IF LCH_D%.0-0 THEN print"setf",CMASKDAC%,FITDAC%,CVALDAC%,CLDNKDAC%,CHDNKDAC%
        RETURN
;--------------------------------------
{ERRORLTC}
        $(0)="LTC ERROR"
{ERROR1}
        $(0)="SYSTEM ERROR"
        VFLINE%=0: VFLOC%=00H: GOSUB {VF_CLEAR}
        LCH_A%.7=1:XBY(0E000H)=LOW(LCH_A%)
        END
{ERRORCON}
        $(0)="HI AEROSOL"
        GOSUB{DACSETOPEN}
        LCH_B%=2001H: GOSUB{OUTPUT}
        GOTO{ERROR0}
{ERRORE1}
        $(0)="ERROR AEROSOL"
{ERROR0}
        $(1)=$(3): VFLINE%=1: VFLOC%=00H: GOSUB {VF_CLEAR}
        LSCDAC%=050H: XBY(06000H)=LOW(LSCDAC%)
{ERRORE1A}
        GOSUB {GETKEY}
        IF KEYS%.3=1 THEN {ERROR2};CONT
        GOTO {ERRORE1A}
{ERROR2}
        IF FLAG1%.10=1 THEN {RESTART}
        GOTO {AEROSOL}
```

I claim:

1. An apparatus for testing a protective mask, comprising:

(a) a testing unit for testing a protective mask;

(b) a control system for operating the testing unit to perform at least first and second tests on the protective mask, said first test being a drink tube flow test and the second test being one of a drink tube valve seat test and a drink train leakage test;

(c) said control system having a first detection device for detecting a first parameter during said first test performed on the protective mask, said first parameter being pressure;

(d) said control system further having a second detection device for detecting a second parameter during said second test performed on the protective mask, said second parameter being fluid flow; and, (e) said control system having at least one monitor for monitoring said first and second parameters to determine whether the protective mask passed said first and second tests.

2. An apparatus as set forth in claim 1, wherein:

(a) said testing unit is portable.

3. An apparatus as set forth in claim 1, wherein:

(a) said second test is a drink tube valve seat test.

4. An apparatus as set forth in claim 1, wherein:

(a) said second test is a drink train leakage test.

5. An apparatus as set forth in claim 1, wherein:

(a) said control system further operating said testing unit to perform a third test, said third test being a mask leakage test.

6. An apparatus as set forth in claim 5, wherein:

(a) said control system further including a third detection device for detecting a third parameter during said third test performed on the protective mask.

7. An apparatus as set forth in claim 6, wherein:

(a) said third detection device is a photometer for detecting challenge concentration.

8. An apparatus for testing a protective mask, comprising:

(a) a testing unit for testing a protective mask;

(b) a control system for operating the testing unit to perform at least first, second and third tests on the protective mask, said first test being a mask leakage test, said second test being an outlet valve test and said third test being one of a drink tube valve seat test, a drink tube flow test and a drink train leakage test; and, (c) said testing unit including a headform assembly, said headform assembly having a first portion on which a protective mask is removably mounted for testing, a second portion to which at least a portion of a drink tube is removably connected for testing and a third portion to which an outlet valve of a protective mask is connected for testing.

9. An apparatus as set forth in claim 8, wherein;

(a) said testing unit is portable.

10. An apparatus as set forth in claim 8, wherein:

(a) said third test is a drink tube valve seat test.

11. An apparatus as set forth in claim 8, wherein:

(a) said third test is a drink tube flow test.

12. An apparatus as set forth in claim 8, wherein:

(a) said third test is a drink train leakage test.

13. An a apparatus as set forth in claim 8, wherein:

(a) said testing unit further having at least one detection device for detecting first, second and third parameters during said first, second and third tests, respectively, performed on the protective mask.

14. An apparatus as set forth in claim 13, wherein:

(a) said first parameter is different from at least one of said second parameter and said third parameter.

15. An apparatus as set forth in claim 14, wherein:

(a) said first parameter is challenge concentration.

16. An apparatus as set forth claim 15, wherein:

(a) said second parameter is fluid flow.

17. An apparatus as set forth in claim 16, wherein:

(a) said third parameter is one of pressure and fluid flow.

* * * * *

UNITED STATES PATENT AND TRADEMARK OFFICE

CERTIFICATE OF CORRECTION

PATENT NO. : 6,848,297 B2
APPLICATION NO. : 10/187380
DATED : February 1, 2005
INVENTOR(S) : Greg Alan Tilley It is certified that error appears in the above-identified patent and that said Letters Patent is hereby corrected as shown below:

Col. 160, Claim 16, line 35, "forth claim" should be --forth in claim--

Signed and Sealed this

Seventh Day of November, 2006

JON W. DUDAS

*Director of the United States Patent and Trademark Office*